US010321407B2

(12) United States Patent
Sato et al.

(10) Patent No.: US 10,321,407 B2
(45) Date of Patent: Jun. 11, 2019

(54) COMMUNICATION CONTROL DEVICE, COMMUNICATION CONTROL METHOD, AND INFORMATION PROCESSING DEVICE WITH MODE SWITCHING CONTROL

(71) Applicant: SONY CORPORATION, Tokyo (JP)

(72) Inventors: Masanori Sato, Tokyo (JP); Katsutoshi Itoh, Tokyo (JP); Hideyuki Suzuki, Tokyo (JP); Shinji Takae, Tokyo (JP)

(73) Assignee: SONY CORPORATION, Tokyo (JP)

( * ) Notice: Subject to any disclaimer, the term of this patent is extended or adjusted under 35 U.S.C. 154(b) by 100 days.

(21) Appl. No.: 15/027,342

(22) PCT Filed: Oct. 16, 2014

(86) PCT No.: PCT/JP2014/077596
§ 371 (c)(1),
(2) Date: Apr. 5, 2016

(87) PCT Pub. No.: WO2015/079821
PCT Pub. Date: Jun. 4, 2015

(65) Prior Publication Data
US 2016/0255589 A1 Sep. 1, 2016

(30) Foreign Application Priority Data
Nov. 27, 2013 (JP) ................. 2013-245376

(51) Int. Cl.
*H04W 52/02* (2009.01)
*H04W 4/80* (2018.01)
(Continued)

(52) U.S. Cl.
CPC ......... *H04W 52/0261* (2013.01); *H04W 4/80* (2018.02); *H04W 48/16* (2013.01);
(Continued)

(58) Field of Classification Search
CPC ..... H04W 84/12; H04W 52/20; H04W 4/008; H04W 48/16; H04W 88/06;
(Continued)

(56) References Cited

U.S. PATENT DOCUMENTS

2004/0097260 A1* 5/2004 Stenton ................. H04W 48/16
455/552.1
2006/0056348 A1 3/2006 Marinier et al.
(Continued)

FOREIGN PATENT DOCUMENTS

JP 2004-363700 A 12/2004
JP 2010-50905 A 3/2010
(Continued)

OTHER PUBLICATIONS

International Search Report dated Nov. 11, 2014, in PCT/JP2014/077596 Filed Oct. 16, 2014.

*Primary Examiner* — Ricardo H Castaneyra
(74) *Attorney, Agent, or Firm* — XSensus LLP

(57) ABSTRACT

There is provided a communication control device including an acquisition unit configured to acquire a result of determination of whether a predetermined condition for connection of a wireless communication terminal to a wireless communication network that is different from a mobile communication network is satisfied, and a control unit configured to control a mobile communication terminal that communicates via the mobile communication network to switch an operation mode from a first mode to a second mode when the predetermined condition is satisfied. The operation mode is an operation mode for communication performed in a first wireless communication scheme that the wireless communication terminal and the mobile communication terminal support. The first mode is a mode in which power consumption is smaller than in the second mode. The second mode is a mode in which the mobile communication
(Continued)

terminal is capable of transmitting or receiving data in the first wireless communication scheme.

20 Claims, 38 Drawing Sheets

(51) Int. Cl.
*H04W 48/16* (2009.01)
*H04W 52/20* (2009.01)
*H04W 52/26* (2009.01)
*H04W 88/06* (2009.01)
*H04M 1/725* (2006.01)
*H04W 84/12* (2009.01)

(52) U.S. Cl.
CPC ....... *H04W 52/0241* (2013.01); *H04W 52/20* (2013.01); *H04W 52/265* (2013.01); *H04M 1/72569* (2013.01); *H04W 84/12* (2013.01); *H04W 88/06* (2013.01); *Y02D 70/00* (2018.01); *Y02D 70/1222* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/21* (2018.01)

(58) Field of Classification Search
CPC ............. H04W 52/265; H04W 36/30; H04W 36/0016; H04W 36/0005; H04W 36/18; H04W 88/08; H04W 72/0406; H04W 84/047; H04W 84/005; H04W 76/14; H04W 36/32; H04W 36/08; H04W 88/04; H04W 52/0241; H04W 52/0261; H04W 4/80; Y02D 70/00; Y02D 70/1262; Y02D 70/164; Y02D 70/1264; Y02D 70/144; Y02D 70/142; Y02D 70/1222; Y02D 70/21; H04B 7/15; H04B 7/14; H04B 7/15507

See application file for complete search history.

(56) References Cited

U.S. PATENT DOCUMENTS

| | | | |
|---|---|---|---|
| 2007/0287473 A1* | 12/2007 | Dupray | H04W 4/02 455/456.1 |
| 2009/0104911 A1* | 4/2009 | Watanabe | H04W 36/30 455/436 |
| 2010/0118762 A1 | 5/2010 | Hashimoto et al. | |
| 2010/0120439 A1 | 5/2010 | Hashimoto et al. | |
| 2010/0167743 A1* | 7/2010 | Palanki | H04B 7/155 455/436 |
| 2010/0202409 A1 | 8/2010 | Marinier et al. | |
| 2012/0014353 A1 | 1/2012 | Marinier et al. | |
| 2013/0303171 A1* | 11/2013 | Jang | H04W 36/30 455/436 |
| 2014/0206346 A1* | 7/2014 | Kiukkonen | H04W 52/0229 455/426.1 |

FOREIGN PATENT DOCUMENTS

| | | |
|---|---|---|
| JP | 2010-114743 A | 5/2010 |
| JP | 2010-114744 A | 5/2010 |
| JP | 2012-10378 A | 1/2012 |
| JP | 2013-191993 A | 9/2013 |
| JP | 2013-197756 A | 9/2013 |

\* cited by examiner

FIG.35

| AREA ID | POSITION INFORMATION | DENSITY INFORMATION |
|---|---|---|
| AREA A | WITHIN 100-METER RADIUS FROM COORDINATES (X1, Y1) | HIGH |
| AREA B | WITHIN 200-METER RADIUS FROM COORDINATES (X2, Y2) | INTERMEDIATE |
| AREA C | WITHIN 50-METER RADIUS FROM COORDINATES (X3, Y3) | LOW |

COMMUNICATION CONTROL DEVICE, COMMUNICATION CONTROL METHOD, AND INFORMATION PROCESSING DEVICE WITH MODE SWITCHING CONTROL

TECHNICAL FIELD

The present disclosure relates to a communication control device, a communication control method, and an information processing device.

BACKGROUND ART

In recent years, apparatuses with a communication function using a wireless local area network (WLAN) have become widespread. As examples of the apparatuses, beginning with smartphones that also have a mobile communication function in mobile communication services, various kinds of apparatuses such as personal computers (PCs), tablet terminals, portable game devices, digital cameras, and printers are exemplified.

In general, an apparatus with a WLAN communication function is connected to a WLAN to perform transmission and reception of data by way of the WLAN. In other words, the apparatus performs transmission and reception of data by way of an access point of the WLAN. In addition, as an example of communication not by way of a WLAN (or an access point), the apparatus is, for example, connected to a mobile communication terminal and performs transmission and reception of data by way of the mobile communication terminal and a mobile communication network. That is, the apparatus performs transmission and reception of data through tethering. With regard to tethering, various technologies have been proposed.

For example, Patent Literature 1 discloses a technology for enabling a device that is a relay destination to continue communication even when an amount of electric charge of a device that performs relaying using tethering decreases.

CITATION LIST

Patent Literature

Patent Literature 1: JP 2013-197756A

SUMMARY OF INVENTION

Technical Problem

Communication performed by way of a WLAN (or an access point) described above can generally be performed only in a limited area (i.e., a communication area of a WLAN), and thus when an apparatus with a WLAN communication function moves out of the area, it is not possible to perform communication by way of the WLAN. For this reason, prompt switching from communication performed by way of a WLAN to communication using tethering is desirable.

For example, a mobile communication terminal maintaining its operation mode in a normal mode for WLAN communication is considered for such prompt switching by such an apparatus. When the mobile communication terminal maintains the operation mode in the normal mode, however, power consumption can increase. On the other hand, for example, when the mobile communication terminal sets the operation mode of WLAN communication to a stop mode or a power saving mode, the apparatus is not capable of promptly switching its communication from communication performed by way of WLAN communication to communication using tethering.

Therefore, it is desirable to provide a mechanism in which communication can be promptly switched while power consumption of a mobile communication terminal is suppressed.

Solution to Problem

According to the present disclosure, there is provided a communication control device including: an acquisition unit configured to acquire a result of determination of whether a predetermined condition for connection of a wireless communication terminal to a wireless communication network that is different from a mobile communication network is satisfied; and a control unit configured to control a mobile communication terminal that communicates via the mobile communication network to switch an operation mode from a first mode to a second mode when the predetermined condition is satisfied. The operation mode is an operation mode for communication performed in a first wireless communication scheme that the wireless communication terminal and the mobile communication terminal support. The first mode is a mode in which power consumption is smaller than in the second mode. The second mode is a mode in which the mobile communication terminal is capable of transmitting or receiving data in the first wireless communication scheme.

According to the present disclosure, there is provided a communication control method including: acquiring a result of determination of whether a predetermined condition for connection of a wireless communication terminal to a wireless communication network that is different from a mobile communication network is satisfied; and controlling, by a processor, a mobile communication terminal that communicates via the mobile communication network to switch an operation mode from a first mode to a second mode when the predetermined condition is satisfied. The operation mode is an operation mode for communication performed in a first wireless communication scheme that the wireless communication terminal and the mobile communication terminal support. The first mode is a mode in which power consumption is smaller than in the second mode. The second mode is a mode in which the mobile communication terminal is capable of transmitting or receiving data in the first wireless communication scheme.

According to the present disclosure, there is provided an information processing device including: a memory that stores a program; and one or more processors that are capable of executing the program. The program causes execution of acquiring a result of determination of whether a predetermined condition for connection of a wireless communication terminal to a wireless communication network that is different from a mobile communication network is satisfied, and controlling a mobile communication terminal that communicates via the mobile communication network to switch an operation mode from a first mode to a second mode when the predetermined condition is satisfied. The operation mode is an operation mode for communication performed in a first wireless communication scheme that the wireless communication terminal and the mobile communication terminal support. The first mode is a mode in which power consumption is smaller than in the second mode. The second mode is a mode in which the mobile communication terminal is capable of transmitting or receiving data in the first wireless communication scheme.

Advantageous Effects of Invention

According to the present disclosure described above, it is possible to promptly switch communication while power consumption of a mobile communication terminal is suppressed. Note that the effect described above is not necessarily limitative, and along with the effect or instead of the effect, any effect disclosed in the present specification or other effects understood from the present specification may be exhibited.

BRIEF DESCRIPTION OF DRAWINGS

FIG. 35 is an explanatory diagram for describing an example of density information.

DESCRIPTION OF EMBODIMENT(S)

Figure 1:
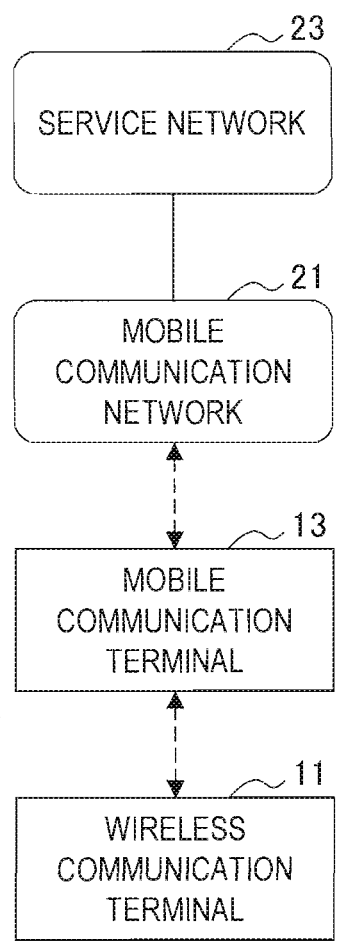
FIG. 1 is an explanatory diagram for describing an example of communication using tethering.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Introduction
2. First Embodiment
2.1. Configuration of a communication system
2.2. Configuration of a communication node
2.3. Process flow
2.4. Modified examples
3. Second Embodiment
3.1. Configuration of a communication system
3.2. Configuration of a communication node
3.3. Process flow
3.4. Modified example
4. Third Embodiment
4.1. Configuration of a communication system
4.2. Configuration of a wireless communication terminal
4.3. Process flow
4.4. Modified example
5. Fourth Embodiment
5.1. Configuration of a communication system
5.2. Configuration of a mobile communication terminal
5.3. Process flow
5.4. Modified example
6. Application examples
6.1. Application examples with regard to a communication node of a mobile communication network
6.2. Application examples with regard to a communication node of a wireless communication network
6.3. Application examples with regard to a mobile communication terminal
6.4. Application examples with regard to a wireless communication terminal
7. Reference example
7.1. Configuration of a communication system
7.2. Configuration of a mobile communication terminal
7.3. Process flow
7.4. Application example of a mobile communication terminal
8. Conclusion

1. Introduction

First, communication using tethering and communication by way of a WLAN will be described with reference to FIGS. 1 and 2.

Communication Using Tethering

A wireless communication terminal that performs WLAN communication performs, for example, communication using tethering. In other words, the wireless communication terminal is connected to a mobile communication terminal to perform communication by way of the mobile communication terminal and a mobile communication network. A specific example of this subject will be described below with reference to FIG. 1.

FIG. 1 is an explanatory diagram for describing an example of communication using tethering. Referring to FIG. 1, a wireless communication terminal 11, a mobile communication terminal 13, a mobile communication network 21, and a service network 23 are shown. The wireless communication terminal 11 is, for example, a device that performs WLAN communication, and is a tablet terminal as an example. The mobile communication terminal 13 is a device that performs mobile communication on the mobile communication network 21, and is a smartphone as an example. The mobile communication network 21 is a network that conforms with a communication standard, for example, Long Term Evolution (LTE), LTE-Advanced, or the like. The service network 23 is a public network, for example, the Internet. The mobile communication terminal 13, for example, is connected to the mobile communication network 21 to perform transmission and reception of data by way of the mobile communication network 21. In addition, the mobile communication network 21 is connected to the service network 23, and thus the mobile communication terminal 13 can perform transmission and reception of data by way of the mobile communication network 21 and the service network 23. Furthermore, the wireless communication terminal 11 is connected to the mobile communication terminal 13, and performs transmission and reception of data by way of the mobile communication terminal 13 and the mobile communication network 21 (and the service network 23). In other words, the mobile communication terminal 13 has a function of performing relaying between the wireless communication terminal 11 and the mobile communication network 21. In this manner, the wireless communication terminal 11 performs communication using tethering, and the mobile communication terminal 13 has the tethering function.

Communication by Way of a WLAN

A wireless communication terminal that performs WLAN communication, for example, is connected to a WLAN. In other words, the wireless communication terminal described above is connected to an access point of the WLAN. Thus, the wireless communication terminal performs transmission and reception of data by way of the WLAN (or the access point). A specific example of this subject will be described below with reference to FIG. 2.

Figure 2:
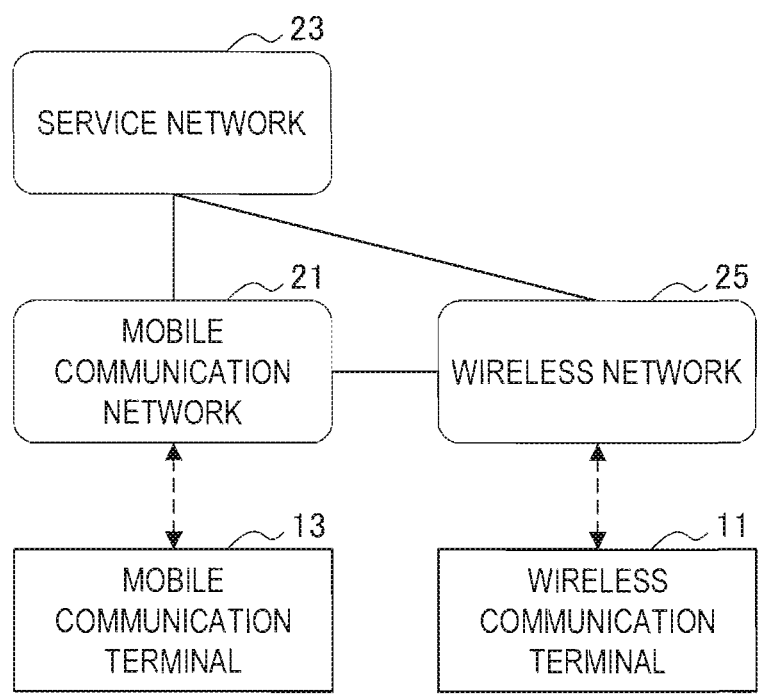
FIG. 2 is an explanatory diagram for describing an example of communication by way of a WLAN.

FIG. 2 is an explanatory diagram for describing an example of communication by way of a WLAN. Referring to FIG. 2, the wireless communication terminal 11, the mobile communication terminal 13, the mobile communication network 21, the service network 23, and a wireless network 25 are shown. The wireless network 25 is, for example, a WLAN. The wireless communication terminal 11 is connected to the wireless network 25 to perform transmission and reception of data by way of the wireless network 25. In addition, for example, the wireless network 25 is connected to the mobile communication network 21, and thus the wireless communication terminal 11 can perform transmission and reception of data by way of the wireless network 25 and the mobile communication network 21 (and the service network 23). Alternatively, the wireless network 25 is connected to the service network 23, and thus the wireless communication terminal 11 may perform transmission and reception of data by way of the wireless network 25 and the service network 23.

It is generally possible to perform communication by way of a WLAN only in a limited area (in other words, a communication area of a WLAN) as described above.

2. First Embodiment

A first embodiment of the present disclosure will be described with reference to FIGS. 3 to 8. In the first embodiment, a communication node of a mobile communication network performs control relating to an embodiment of the present disclosure. In other words, a communication control device that performs the control relating to an embodiment of the present disclosure is a device which constitutes the communication node of the mobile communication network.

2.1. Configuration of a Communication System

Figure 3:
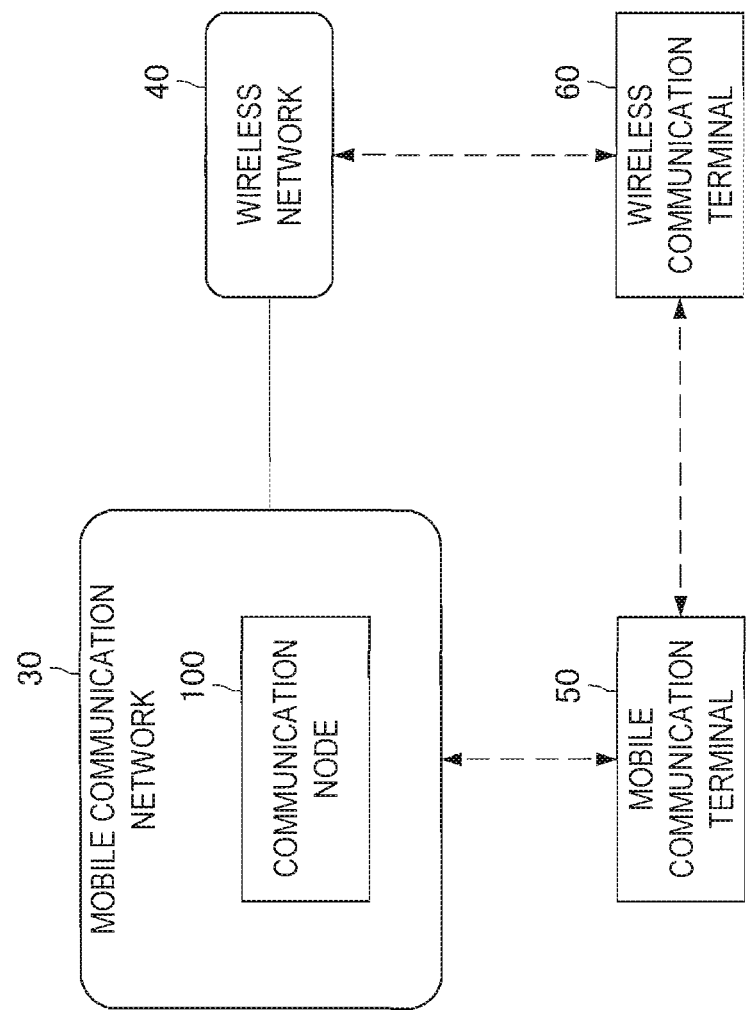
FIG. 3 is an explanatory diagram showing an example of a schematic configuration of a communication system according to a first embodiment of the present disclosure.

First, a schematic configuration of a communication system according to the first embodiment of the present disclosure will be described with reference to FIG. 3. FIG. 3 is an explanatory diagram showing an example of the schematic configuration of the communication system according to the first embodiment of the present disclosure. Referring to FIG. 3, the communication system includes a mobile communication network 30, a wireless communication network 40, a mobile communication terminal 50, and a wireless communication terminal 60. In addition, in the first embodiment, in particular, the communication system includes a communication node 100 of the mobile communication network 30.

(Mobile Communication Network 30)

The mobile communication network 30 is a network for mobile communication. The mobile communication network 30 is, for example, a network that conforms with any communication standard of Third Generation Partnership Project (3GPP). As an example, the mobile communication network 30 is a network that conforms with Long Term Evolution (LTE) or LTE-Advanced. The mobile communication network 30 is operated by, for example, a mobile communication service provider. Note that the mobile communication network 30 can also be called a cellular network. In addition, mobile communication can also be called cellular-type communication.

The mobile communication network 30 includes a radio access network (RAN) and a core network (CN).

(Wireless Communication Network 40)

The wireless communication network 40 is a network that is different from the mobile communication network. The wireless communication network 40 is, for example, a WLAN.

(Mobile Communication Terminal 50)

The mobile communication terminal 50 performs communication via a mobile communication network 30. In other words, the mobile communication terminal 50 performs mobile communication in a service area of the mobile communication network 30. Specifically, when the mobile communication terminal 50 is positioned within the cell of the mobile communication network 30, for example, the terminal communicates with a base station of the cell.

In addition, the mobile communication terminal 50 supports a first wireless communication scheme, and thereby performs communication in the first wireless communication scheme. The first wireless communication scheme is, for example, a communication scheme for a WLAN. As an example, the first wireless communication scheme is a standardized scheme such as IEEE 802.11a, 11b, 11g, 11n, 11ac, and 11ad. The mobile communication terminal 50 communicates directly with, for example, the wireless communication terminal 60 in the first wireless communication scheme. In addition, for example, the mobile communication terminal 50 communicates with an access point of the wireless communication network 40 (for example, a WLAN) in the first wireless communication scheme.

In addition, the mobile communication terminal 50 supports, for example, a second wireless communication scheme, and thereby performs communication in the second wireless communication scheme. The second wireless communication scheme is, for example, a communication scheme of short-range wireless communication. As an example, the second wireless communication scheme is Bluetooth (registered trademark). The mobile communication terminal 50 communicates directly with, for example, the wireless communication terminal 60 in the second wireless communication scheme.

Furthermore, the mobile communication terminal 50 has a tethering function. In other words, the mobile communication terminal 50 has a function of performing relay between the mobile communication network 30 and another terminal device. Specifically, for example, the mobile communication terminal 50 transmits data received from the wireless communication terminal 60 in the first wireless communication scheme via the mobile communication network 30, and transmits data destined for the wireless communication terminal 60 which has been received via the mobile communication network 30 to the wireless communication terminal 60 in the first wireless communication scheme.

Note that the mobile communication terminal 50 includes a mobile communication unit which communicates via the mobile communication network 30 and a first wireless communication unit which communicates in the first wireless communication scheme. In addition, the mobile communication terminal 50 also includes, for example, a second wireless communication unit which communicates in the second wireless communication scheme.

(Wireless Communication Terminal 60)

The wireless communication terminal 60 communicates via the wireless communication network 40. In other words, the wireless communication terminal 60 performs wireless communication in a service area of the wireless communication network 40. Specifically, when the wireless communication terminal 60 is positioned within the service area of the wireless communication network 40, for example, the terminal communicates with an access point of the wireless communication network 40.

In addition, the wireless communication terminal 60 supports the first wireless communication scheme (for example, the communication scheme for a WLAN), and thereby performs communication in the first wireless communication scheme. For example, the wireless communication terminal 60 communicates with an access point of the wireless communication network 40 (for example, a WLAN) in the first wireless communication scheme as described above. In addition, the wireless communication terminal 60 communicates directly with, for example, the mobile communication terminal 50 in the first wireless communication scheme.

In addition, the wireless communication terminal 60 also supports, for example, the second wireless communication scheme (for example, Bluetooth), and thereby performs communication in the second wireless communication scheme. The wireless communication terminal 60 communicates directly with, for example, the mobile communication terminal 50 in the second wireless communication scheme.

Note that the wireless communication terminal 60 includes a first wireless communication unit which communicates in the first wireless communication scheme. In addition, for example, the wireless communication terminal 60 also includes a second wireless communication unit which communicates in a written second wireless communication scheme.

(Communication Node 100)

In the first embodiment, the communication node 100 of the mobile communication network 30 can promptly switch communication while suppressing power consumption of the mobile communication terminal 50.

Note that the communication node 100 may be a base station within the wireless access network, or may be a core network node within the core network.

2.2. Configuration of a Communication Node

Figure 4:
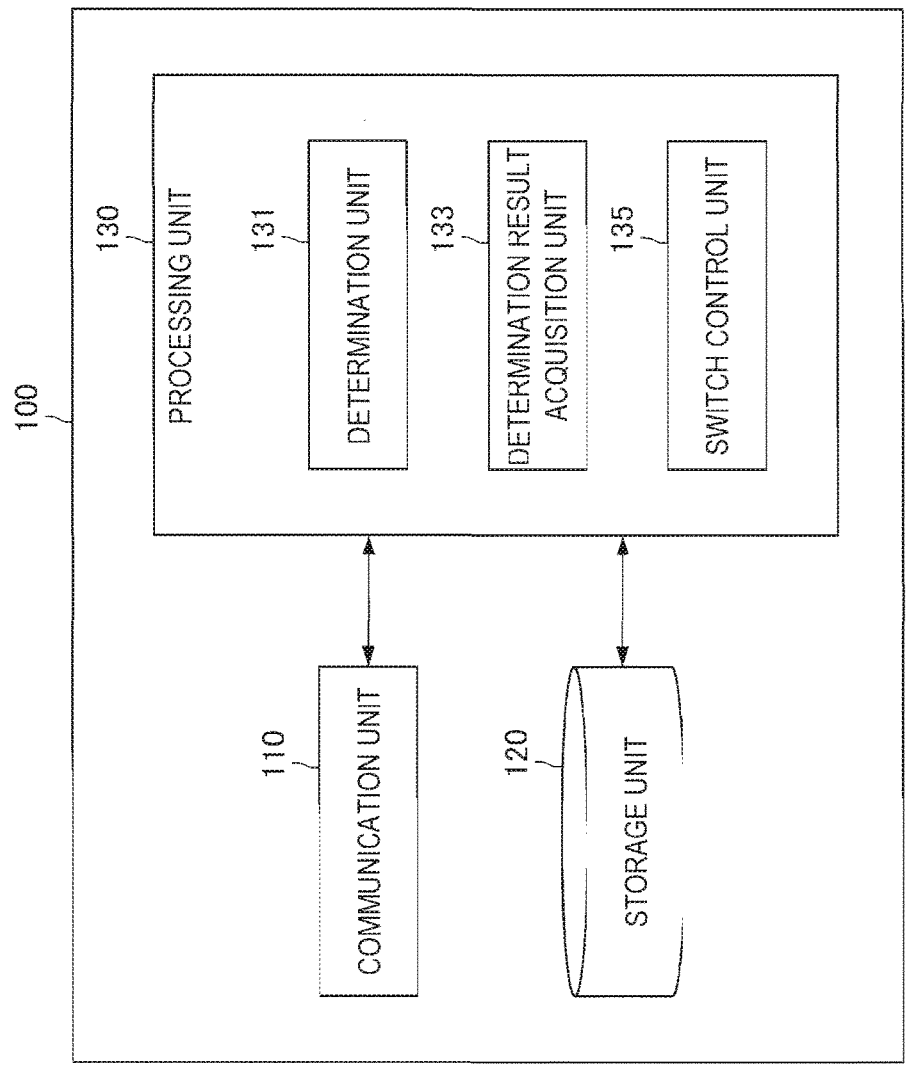
FIG. 4 is a block diagram showing an example of a configuration of a communication node according to the first embodiment.

An example of a configuration of the communication node 100 according to the first embodiment will be described with reference to FIG. 4. FIG. 4 is a block diagram showing the example of the configuration of the communication node 100 according to the first embodiment. Referring to FIG. 4, the communication node 100 includes a communication unit 110, a storage unit 120, and a processing unit 130.

(Communication Unit 110)

The communication unit 110 communicates with another node. For example, the communication unit 110 communicates with the mobile communication terminal 50 via the mobile communication network 30. In addition, the communication unit 110 communicates with, for example, the wireless communication terminal 60 via the mobile communication network 30 and the wireless communication network 40.

(Storage Unit 120)

The storage unit 120 temporarily or permanently stores a program and data for operations of the communication node 100.

(Processing Unit 130)

The processing unit 130 provides various functions of the communication node 100. The processing unit 130 includes a determination unit 131, a determination result acquisition unit 133, and a switch control unit 135.

(Determination Unit 131)

The determination unit 131 determines whether a predetermined condition for connection of the wireless communication terminal 60 to the wireless communication network 40 is satisfied.

As an example, the predetermined condition includes one or more OR conditions. Thus, if the one or more OR conditions are satisfied, the predetermined condition is satisfied.

Connection State

The predetermined condition is a condition determined based on, for example, a connection state of the wireless communication terminal 60 with respect to the wireless communication network 40.

More specifically, the predetermined condition is a condition determined based on, for example, whether or not connection of the wireless communication terminal 60 to the wireless communication network 40 is disconnected. In this case, the predetermined condition is satisfied if, for example, the connection of the wireless communication terminal 60 to the wireless communication network 40 is disconnected. As an example, one of the one or more OR conditions is that the connection of the wireless communication terminal 60 to the wireless communication network 40 be disconnected.

Accordingly, communication can be switched when, for example, connection of the wireless communication terminal 60 to the wireless communication network 40 is disconnected.

Note that information indicating the connection state is provided by, for example, a communication node of the wireless communication network 40 (for example, an access point).

Communication Quality

The predetermined condition is a condition determined based on, for example, communication quality of communication of the wireless communication terminal 60 on the wireless communication network 40.

More specifically, the predetermined condition is a condition determined based on, for example, whether or not communication quality of communication of the wireless communication terminal 60 on the wireless communication network 40 is lower than predetermined quality. In this case, the predetermined condition is satisfied if, for example, the communication quality is lower than the predetermined quality.

Accordingly, it is possible, for example, to switch communication according to deterioration of the communication quality of the wireless communication terminal 60 on the wireless communication network 40. In other words, communication can be switched when the connection of the wireless communication terminal 60 to the wireless communication network 40 is likely to be disconnected.

As a first example, the communication quality includes reception intensity of a signal that the wireless communication terminal 60 transmits on the wireless communication network 40. In other words, the communication quality includes reception intensity of a transmission signal of the wireless communication terminal 60 that an access point of the wireless communication network 40 receives. In this case, the predetermined condition is satisfied if, for example, the reception intensity is lower than a predetermined threshold value. As an example thereof, one of the one or more OR conditions is that the reception intensity be lower than the predetermined threshold value.

As a second example, the communication quality includes an error rate of communication of the wireless communication terminal 60 on the wireless communication network 40. In this case, the predetermined condition is satisfied if, for example, the error rate is higher than a predetermined threshold value. As an example thereof, one of the one or more OR conditions is that the error rate be higher than the predetermined threshold value.

As a third example, the communication quality includes the number of re-transmissions of the wireless communication terminal 60 in communication on the wireless communication network 40. In this case, the predetermined condition is satisfied if, for example, the number of re-transmissions is greater than a predetermined threshold value. As an example thereof, one of the one or more OR conditions is that the number of re-transmissions be greater than the predetermined threshold value.

Note that the communication quality is measured by, for example, the communication node of the wireless communication network 40 (for example, the access point), and information indicating the communication quality is provided by the communication node.

Movement Situation

The mobile communication terminal 50 is associated with, for example, the wireless communication terminal 60, and the predetermined condition is a condition determined based on a movement situation of the mobile communication terminal 50.

More specifically, for example, information indicating that the mobile communication terminal 50 and the wireless communication terminal 60 are associated with each other is provided in advance. Then, the predetermined condition is a condition determined based on whether or not the mobile communication terminal 50 is moving. In this case, the predetermined condition is satisfied if, for example, the mobile communication terminal 50 is moving. As an example thereof, one of the one or more OR conditions is that the mobile communication terminal 50 be moving.

Accordingly, it is possible to switch communication according to, for example, movement of the mobile communication terminal 50. In other words, communication can be switched when connection of the wireless communication terminal 60 to the wireless communication network 40 is likely to be disconnected.

Note that a movement situation of the mobile communication terminal 50 can be ascertained from, for example, a change of a position of the mobile communication terminal 50. For example, the mobile communication terminal 50 provides position information (for example, position information of the Global Positioning System (GPS)). Alternatively, a position of the mobile communication terminal 50 on the mobile communication network 30 may be deduced and position information indicating the position may be provided. As a specific example, the position may be deduced based on reception intensity of a transmission signal from the mobile communication terminal 50 at a plurality of base station, or the position may be deduced based on a timing advance (TA) value, a measured value of angle of arrival (AoA), and the like.

As described above, the determination unit 131 performs the determination (i.e., determination of whether a predetermined condition for connection of the wireless communication terminal 60 to the wireless communication network 40 is satisfied). Then, the determination unit 131 provides the result of the determination to the determination result acquisition unit 133. If the predetermined condition is satisfied, for example, the determination unit 131 provides the result of the determination of the predetermined condition (i.e., the result indicating that the predetermined condition is satisfied) to the determination result acquisition unit 133. Note that, if the predetermined condition is not satisfied, the determination unit 131 may provide the result of the determination of the predetermined condition (i.e., the result indicating that the predetermined condition is not satisfied) to the determination result acquisition unit 133 or may not provide the result to the determination result acquisition unit 133.

(Determination Result Acquisition Unit 133)

The determination result acquisition unit 133 acquires the result of determination (i.e., determination of whether a predetermined condition for the connection of the wireless communication terminal 60 to the wireless communication network 40 is satisfied).

The determination unit 131 provides, for example, the result of the determination of the predetermined condition to the determination result acquisition unit 133. Then, the determination result acquisition unit 133 acquires the result.

(Switch Control Unit 135)

Switch of an Operation Mode of the Mobile Communication Terminal 50

When the predetermined condition is satisfied, the switch control unit 135 controls the mobile communication terminal 50 which communicates via the mobile communication network 30 to switch its operation mode from a first mode to a second mode (hereinafter referred to as "mode switch control").

The operation mode is an operation mode for communication in the first wireless communication scheme supported by the wireless communication terminal 60 and the mobile communication terminal 50. As described above, the first wireless communication scheme is, for example, a wireless communication scheme for a WLAN, and the operation mode is an operation mode for WLAN communication. In other words, when the predetermined condition is satisfied, the operation mode for WLAN communication is switched.

The first mode is a mode in which power consumption is smaller than in the second mode, and the second mode is a mode in which the mobile communication terminal 50 can transmit or receive data in the first wireless communication scheme. The first mode is, for example, a stop mode in which communication is not performed, or a power saving mode in which communication is performed while saving power (for example, intermittent transmission or intermittent reception). In addition, the second mode is a normal mode in which normal communication is possible in the first wireless communication scheme. Consequently, when the predetermined condition is satisfied, the operation mode is switched from the stop mode or the power saving mode to the normal mode.

Specific Control

The mode switch control is triggered by, for example, transmitting a message requesting switch of the operation mode from the first mode to the second mode (hereinafter referred to as a "mode switch message") to the mobile communication terminal 50. In other words, the switch control unit 135 triggers the transmission of the mode switch message to the mobile communication terminal 50.

As an example, the communication node 100 transmits the mode switch message. In this case, the switch control unit 135 triggers the transmission of the mode switch message by the communication node 100 (the processing unit 130). Then, the communication node 100 (the processing unit 130) transmits the mode switch message to the mobile communication terminal 50. As a result, the mobile communication terminal 50 switches the operation mode from the first mode to the second mode.

Note that the mode switch message is a message that is, for example, transmitted to the mobile communication terminal 50 via the mobile communication network 30. The communication node 100, for example, transmits the mode switch message to the mobile communication terminal 50 via the mobile communication network 30.

As described above, the operation mode of the mobile communication terminal 50 is switched from the first mode (for example, the stop mode or the power saving mode) to the second mode (for example, the normal mode). Accordingly, communication can be promptly switched while power consumption of the mobile communication terminal 50 is suppressed.

Specifically, for example, when connection of the wireless communication terminal 60 to the wireless communication network 40 is disconnected or when the connection is likely to be disconnected, the operation mode of the mobile communication terminal 50 for communication in the first wireless communication scheme becomes the normal mode. Thus, the wireless communication terminal 60 can promptly switch its communication to communication using tethering. In addition, when connection of the wireless communication terminal 60 to the wireless communication network 40 is not disconnected or when the connection is not likely to be disconnected, the operation mode of the mobile communication terminal 50 for communication in the first wireless communication scheme may be the stop mode or the power saving mode. Thus, while power consumption of the mobile communication terminal 50 is suppressed, the communication of the wireless communication terminal 60 can be promptly switched from communication performed via the wireless communication network 40 to communication using tethering.

Switch of Communication of the Wireless Communication Terminal 60

Furthermore, when the predetermined condition is satisfied, for example, the switch control unit 135 further controls the wireless communication terminal 60 to switch communication from the first communication performed via the wireless communication network 40 to second communication performed via the mobile communication terminal 50 and the mobile communication network 30 (hereinafter referred to as "communication switch control"). In other words, the communication switch control is control to cause the wireless communication terminal 60 to switch communication from communication performed via the wireless communication network 40 (first communication) to communication using tethering (second communication).

Specific Control

The communication switch control is, for example, triggering transmission of a message requesting switch of communication from the first communication to the second communication (hereinafter referred to as "communication switch message") to the wireless communication terminal 60. In other words, the switch control unit 135 triggers transmission of the communication switch message to the wireless communication terminal 60.

As an example, the communication node 100 transmits the communication switch message. In this case, the switch control unit 135 triggers the transmission of the communication switch message by the communication node 100 (the processing unit 130). Then, the communication node 100 (the processing unit 130) transmits the communication switch message to the wireless communication terminal 60. As a result, the wireless communication terminal 60 switches communication from communication performed via the wireless network 40 to communication using tethering.

Note that the communication switch message is, for example, a message transmitted to the wireless communication terminal 60 via the wireless communication network 40. The communication node 100, for example, transmits the communication switch message to the wireless communication terminal 60 via the wireless communication network 40.

As described above, communication of the wireless communication terminal 60 is switched from communication performed via a WLAN to communication using tethering. Accordingly, the communication of the wireless communication terminal 60 can be reliably switched.

2.3. Process Flow

Next, a communication control process according to the first embodiment will be described with reference to FIGS. 5 and 6.

(Communication Control Process)

Figure 5:
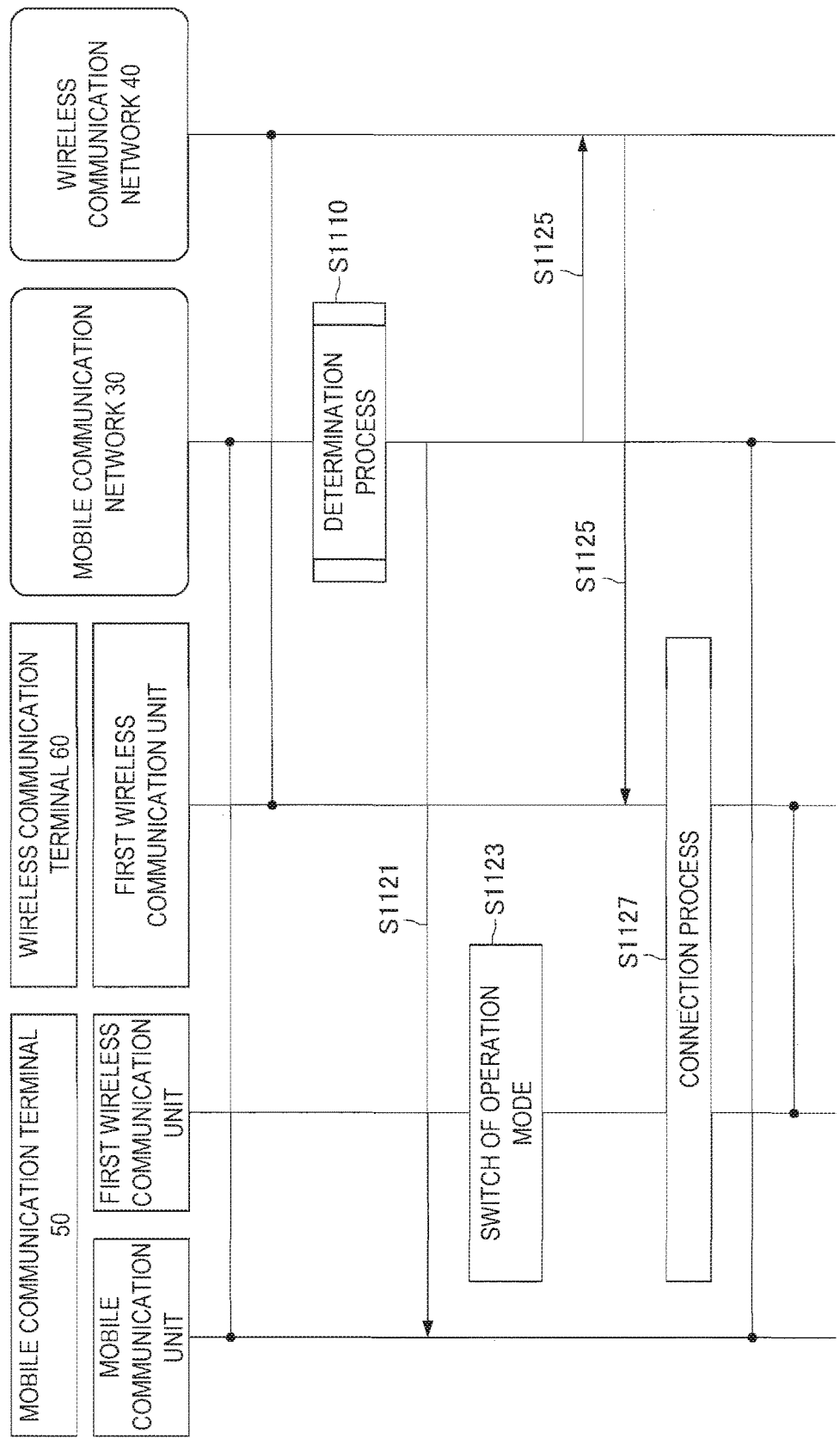
FIG. 5 is a sequence diagram showing an example of a schematic flow of a communication control process according to the first embodiment.

FIG. 5 is a sequence diagram showing an example of a schematic flow of the communication control process according to the first embodiment.

As a premise, the mobile communication terminal 50 is connected to the mobile communication network 30. In addition, the wireless communication terminal 60 is connected to the wireless communication network 40.

First, the communication node 100 of the mobile communication network 30 performs a determination process (S1110). In other words, the communication node 100 determines whether a predetermined condition for connection of the wireless communication terminal 60 to the wireless communication network 40 is satisfied. Then, for example, the predetermined condition is determined to be satisfied. Note that the communication node 100 can acquire information necessary for the determination process from a communication node of the wireless communication network 40 and/or the mobile communication terminal 50, or can generate the information by itself.

Then, the communication node 100 transmits a mode switch message to the mobile communication terminal 50 via the mobile communication network 30 (S1121). The mode switch message is a message requesting switch of the operation mode for communication in the first wireless communication scheme (for example, WLAN communication). Then, the mobile communication terminal 50 switches the operation mode for the communication in the first wireless communication scheme from the first mode (for example, the stop mode or the power saving mode) to the second mode (for example, the normal mode) (S1123).

In addition, the communication node 100 transmits a communication switch message to the wireless communication terminal 60 via the wireless communication network 40 (S1125). The communication switch message is a message requesting switch of communication from the first communication (for example, communication performed via the wireless communication network 40) to the second communication (i.e., communication using tethering). Then, the mobile communication terminal 50 and the wireless communication terminal 60 perform a connection process to be directly connected to each other in communication of the first wireless communication scheme in order to switch communication to the second communication (S1127). As a result, the mobile communication terminal 50 and the wireless communication terminal 60 are connected to each other in the communication of the first wireless communication scheme. In addition, since the mobile communication terminal 50 is connected to the mobile communication network 30 as described above, the terminal can perform communication using tethering.

(Determination Process)

Figure 6:
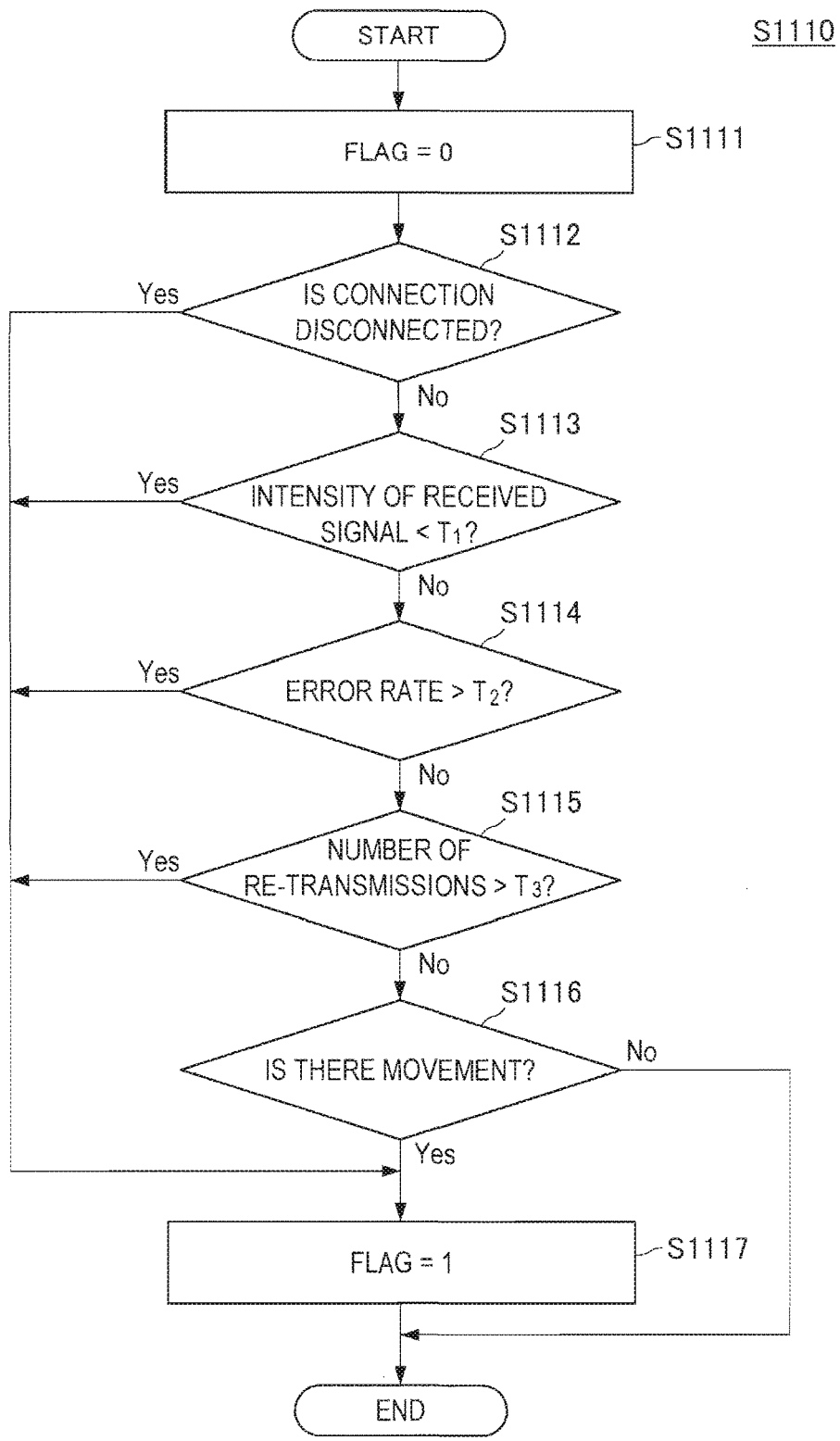
FIG. 6 is a flowchart showing an example of a schematic flow of a determination process according to the first embodiment.

FIG. 6 is a flowchart showing an example of a schematic flow of the determination process according to the first embodiment. The determination process is the process of Step S1110 of FIG. 5.

First, a flag indicating the result of determination is initialized to 0 (S111).

Then, the determination unit 131 determines whether connection of the wireless communication terminal 60 to the wireless communication network 40 is disconnected (S1112). If the connection is disconnected (YES in S1112), the flag is changed to 1 (S1117). Then, the process ends.

In addition, the determination unit 131 determines whether reception intensity of a signal that the wireless communication terminal 60 transmits on the wireless communication network 40 is lower than a threshold value $T_1$ (S1113). If the reception intensity is lower than the threshold value $T_1$ (YES in S1113), the flag is changed to 1 (S1117). Then, the process ends.

In addition, the determination unit 131 determines whether an error rate of the communication of the wireless communication terminal 60 on the wireless communication network 40 is higher than a threshold value $T_2$ (S1114). If the error rate is higher than the threshold value $T_2$ (YES in S1114), the flag is changed to 1 (S1117). Then, the process ends.

In addition, the determination unit 131 determines whether the number of re-transmissions of the wireless communication terminal 60 in the communication on the wireless communication network 40 is greater than a threshold value $T_3$ (S1115). If the number of re-transmissions is greater than the threshold value $T_3$ (YES in S1115), the flag is changed to 1 (S1117). Then, the process ends.

In addition, the determination unit 131 determines whether the mobile communication terminal 50 is moving (S1116). If the mobile communication terminal 50 is moving (YES in S1116), the flag is changed to 1 (S1117). Then, the process ends.

In addition, if all results of the determinations are negative, the process ends with the flag being 0.

Note that, when the flag is 1, it indicates that the predetermined condition for the connection of the wireless communication terminal 60 to the wireless communication network 40 is satisfied, and when it is 0, it indicates that the predetermined condition is not satisfied.

2.4. Modified Examples

Next, modified examples of the first embodiment will be described with reference to FIGS. 7 and 8. In the modified examples, the mode switch message or the communication switch message is transmitted in the second wireless communication scheme (for example, a communication scheme of short-range wireless communication) that the mobile communication terminal 50 and the wireless communication terminal 60 support.

(Communication Node 100: Switch Control Unit 135)

Switch of the Operation Mode of the Mobile Communication Terminal 50

Specific Control

As a first example among the modified examples of the first embodiment, a mode switch message is a message transmitted from the wireless communication terminal 60 to the mobile communication terminal 50 in the second wireless communication scheme (for example, a communication scheme of short-range wireless communication).

As an example, the communication node 100 transmits a mode switch message and a communication switch message to the wireless communication terminal 60. Then, the wireless communication terminal 60 transmits the mode switch message to the mobile communication terminal 50 in the second wireless communication scheme.

Switch of Communication of the Wireless Communication Terminal 60

Specific Control

As a second example among the modified examples of the first embodiment, the communication switch message may be a message transmitted from the mobile communication terminal 50 to the wireless communication terminal 60 in the second wireless communication scheme (for example, a communication scheme of short-range wireless communication).

As an example, the communication node 100 transmits a mode switch message and a communication switch message to the mobile communication terminal 50. Then, the mobile communication terminal 50 transmits the communication switch message to the wireless communication terminal 60 in the second wireless communication scheme.

Process Flow: Communication Control Process (First Example)

Figure 7:
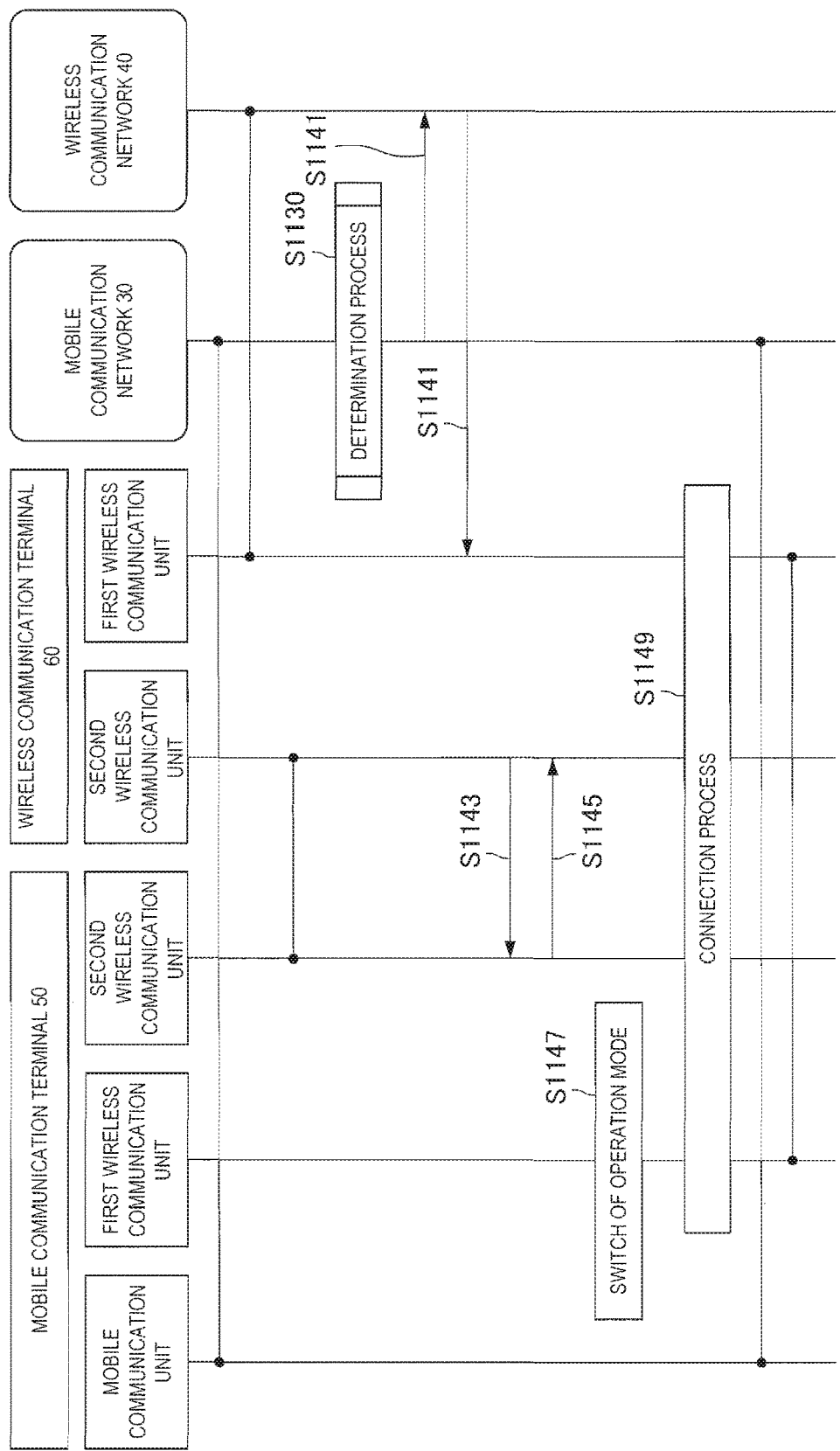
FIG. 7 is a sequence diagram showing a first example of a schematic flow of a communication control process according to a modified example of the first embodiment.

FIG. 7 is a sequence diagram showing a first example of a schematic flow of a communication control process according to the modified example of the first embodiment.

As a premise, the mobile communication terminal 50 is connected to the mobile communication network 30. In addition, the wireless communication terminal 60 is connected to the wireless communication network 40. In addition, the mobile communication terminal 50 and the wireless communication terminal 60 are connected to each other in the second communication scheme.

First, the communication node 100 of the mobile communication network 30 performs a determination process (S1130). The determination process is, for example, the same process as the determination process (S1110) described with reference to FIG. 6.

The communication node 100 thereafter transmits a mode switch message and a communication switch message to the wireless communication terminal 60 via the wireless communication network 40 (S1141).

Then, the wireless communication terminal 60 transmits the mode switch message to the mobile communication terminal 50 in the second wireless communication scheme (for example, Bluetooth) (S1143). Then, the mobile communication terminal 50 responds thereto (S1145). Then, the mobile communication terminal 50 switches the operation mode for communication performed in the first wireless communication scheme from the first mode (for example, the stop mode or the power saving mode) to the second mode (for example, the normal mode) (S1147).

The mobile communication terminal 50 and the wireless communication terminal 60 thereafter perform a connection process for direct connection in the first wireless communication scheme (S1149) in order to switch communication to the second communication (i.e., communication using tethering). As a result, the mobile communication terminal 50 and the wireless communication terminal 60 are connected to each other in communication of the first wireless communication scheme. In addition, since the mobile communication terminal 50 is connected to the mobile communication network 30 as described above, communication is possible using tethering.

Note that, instead of the communication node 100 transmitting a mode switch message, the wireless communication terminal 60 may transmit a mode switch message to the mobile communication terminal 50 according to reception of a message (for example, a communication switch message) from the communication node 100.

Process Flow: Communication Control Process (First Example)

Figure 8:
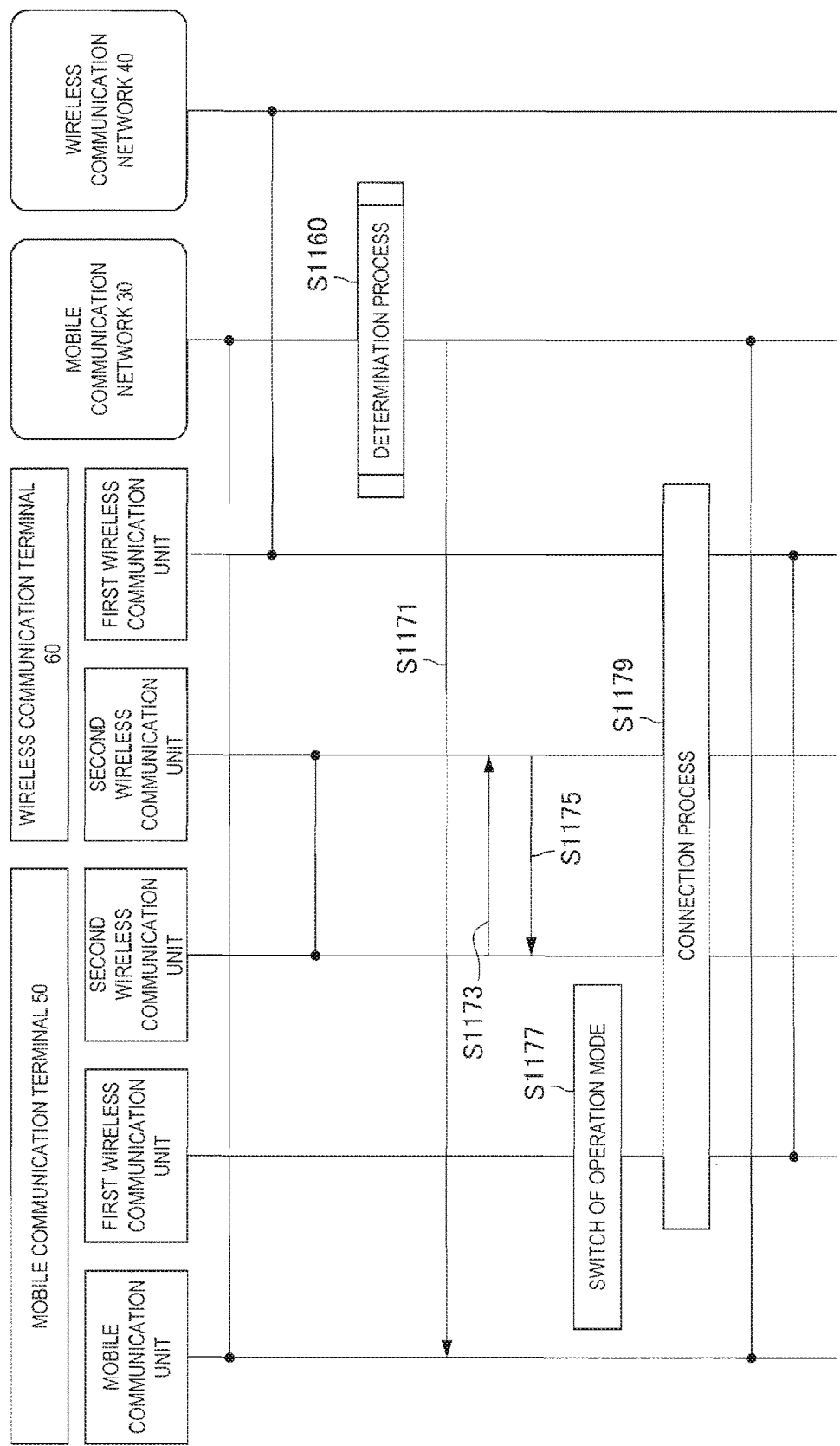
FIG. 8 is a sequence diagram showing a second example of a schematic flow of a communication control process according to a modified example of the first embodiment.

FIG. 8 is a sequence diagram showing a second example of a schematic flow of a communication control process according to the modified example of the first embodiment.

As a premise, the mobile communication terminal 50 is connected to the mobile communication network 30. In addition, the wireless communication terminal 60 is connected to the wireless communication network 40. In addition, the mobile communication terminal 50 and the wireless communication terminal 60 are connected to each other in the second communication scheme.

First, the communication node 100 of the mobile communication network 30 performs a determination process (S1160). The determination process is, for example, the same process as the determination process (S1110) described with reference to FIG. 6.

The communication node 100 thereafter transmits a mode switch message and a communication switch message to the mobile communication terminal 50 via the mobile communication network 30 (S1171).

Then, the mobile communication terminal 50 transmits the communication switch message to the wireless communication terminal 60 in the second wireless communication scheme (for example, Bluetooth) (S1173). Then, the wireless communication terminal 60 responds thereto (S1175).

In addition, the mobile communication terminal 50 switches the operation mode for communication performed in the first wireless communication scheme from the first mode (for example, the stop mode or the power saving mode) to the second mode (for example, the normal mode) (S1177).

The mobile communication terminal 50 and the wireless communication terminal 60 thereafter perform a connection process for direct connection in the first wireless communication scheme (S1149) in order to switch communication to the second communication (i.e., communication using tethering). As a result, the mobile communication terminal 50 and the wireless communication terminal 60 are connected to each other in communication of the first wireless communication scheme. In addition, since the mobile communication terminal 50 is connected to the mobile communication network 30 as described above, communication is possible using tethering.

Note that, instead of the communication node 100 transmitting the communication switch message, the mobile communication terminal 50 may transmit a communication switch message to the wireless communication terminal 60 according to reception of a message (for example, a mode switch message) from the communication node 100.

3. Second Embodiment

A second embodiment of the present disclosure will be described with reference to FIGS. 9 to 13. In the second embodiment, a communication node of a wireless communication network performs control relating to an embodiment of the present disclosure. In other words, a communication control device that performs the control relating to an embodiment of the present disclosure is a device which constitutes the communication node of the wireless communication network.

3.1. Configuration of a Communication System

Figure 9:
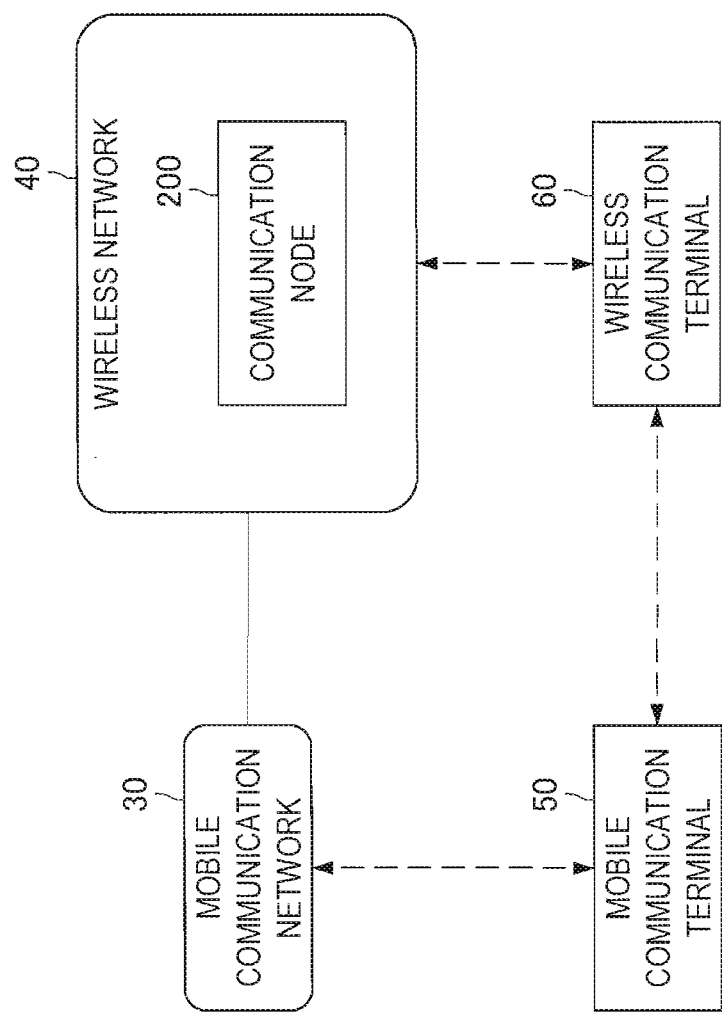
FIG. 9 is an explanatory diagram showing an example of a schematic configuration of a communication system according to a second embodiment of the present disclosure.

First, a schematic configuration of a communication system according to the second embodiment of the present disclosure will be described with reference to FIG. 9. FIG. 9 is an explanatory diagram showing an example of the schematic configuration of the communication system according to the second embodiment of the present disclosure. Referring to FIG. 9, the communication system includes a mobile communication network 30, a wireless communication network 40, a mobile communication terminal 50, and a wireless communication terminal 60. In addition, in the second embodiment, in particular, the communication system includes a communication node 200 of the wireless communication network 40.

Note that description with regard to the mobile communication network 30, the wireless communication network 40, the mobile communication terminal 50, and the wireless communication terminal 60 is the same as description of the elements of the first embodiment. Thus, overlapping description will be omitted.

(Communication Node 200)

In the second embodiment, the communication node 200 of the wireless communication network 40 can promptly switch communication while suppressing power consumption of the mobile communication terminal 50.

Note that the communication node 200 may be an access point of the wireless communication network 40, or another control node of the wireless communication network 40.

3.2. Configuration of a Communication Node

Figure 10:
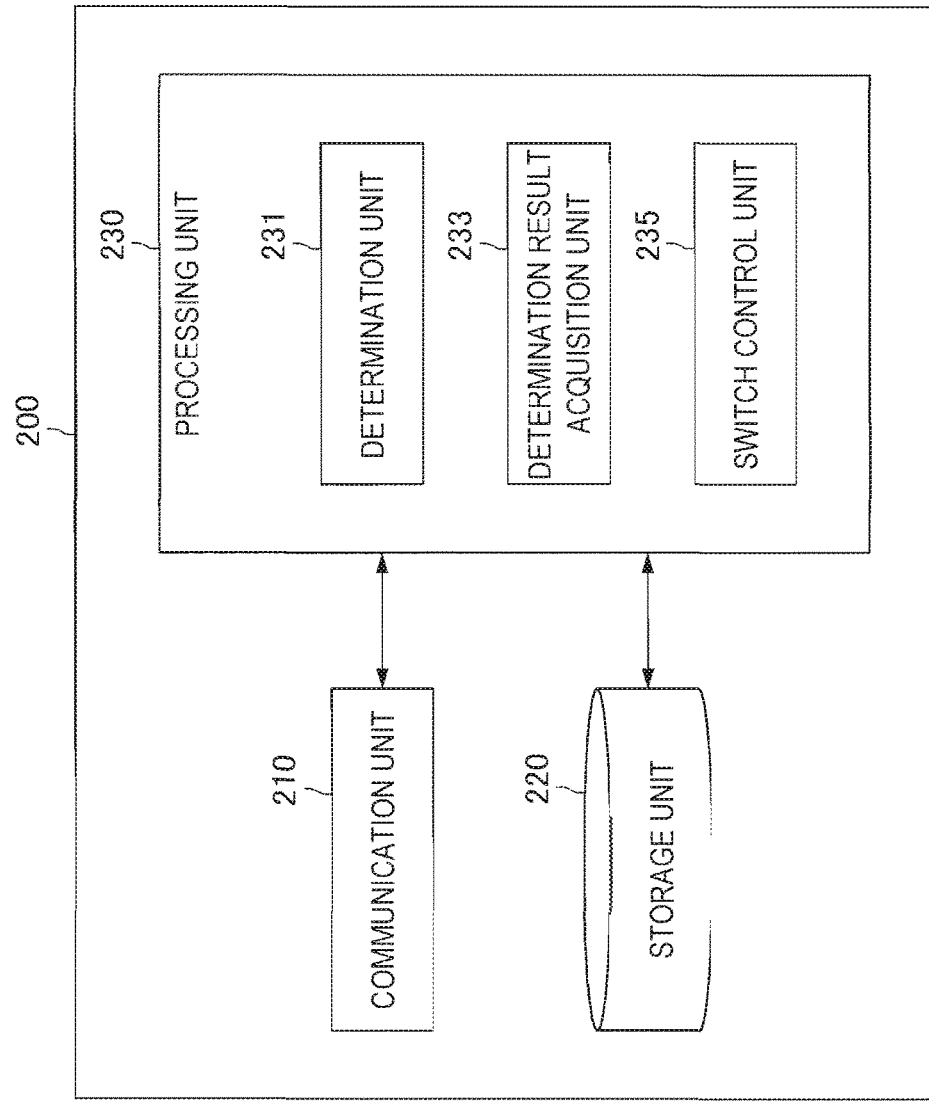
FIG. 10 is a block diagram showing an example of a configuration of a communication node according to the second embodiment.

An example of a configuration of the communication node 200 according to the second embodiment will be described with reference to FIG. 10. FIG. 10 is a block diagram showing the example of the configuration of the communication node 200 according to the second embodiment. Referring to FIG. 10, the communication node 200 includes a communication unit 210, a storage unit 220, and a processing unit 230.

(Communication Unit 210)

The communication unit 210 communicates with another node. For example, the communication unit 210 communicates with the mobile communication terminal 50 via the mobile communication network 30. In addition, the communication unit 210 communicates with, for example, the wireless communication terminal 60 via the wireless communication network 40.

(Storage Unit 220)

The storage unit 220 temporarily or permanently stores a program and data for operations of the communication node 200.

(Processing Unit 230)

The processing unit 230 provides various functions of the communication node 200. The processing unit 230 includes a determination unit 231, a determination result acquisition unit 233, and a switch control unit 235.

Here, according to the second embodiment, the determination unit 231 and the determination result acquisition unit 233 are functionally the same as the determination unit 131 and the determination result acquisition unit 133 according to the first embodiment. Thus, only the switch control unit 235 will be described here.

(Switch Control Unit 235)

Switch of an Operation Mode of the Mobile Communication Terminal 50

When the predetermined condition is satisfied, the switch control unit 235 controls the mobile communication terminal 50 which communicates via the mobile communication network 30 to switch its operation mode from a first mode to a second mode (i.e., mode switch control).

Note that, as described in the first embodiment, the operation mode is an operation mode for communication performed in the first wireless communication scheme (for example, WLAN communication). In addition, the first mode is a mode in which power consumption is smaller than in the second mode (for example, the stop mode or the power saving mode), and the second mode is a mode in which the mobile communication terminal 50 can transmit or receive data in the first wireless communication scheme (for example, the normal mode).

Specific Control

The mode switch control is triggered by, for example, transmitting a message requesting switch of the operation mode from the first mode to the second mode (i.e., mode switch message) to the mobile communication terminal 50. In other words, the switch control unit 235 triggers the transmission of the mode switch message to the mobile communication terminal 50.

As an example, any communication node of the mobile communication network 30 (for example, a base station or a core network node) transmits the mode switch message. In this case, the switch control unit 235 triggers the transmission of the mode switch message by the communication node. Specifically, for example, the switch control unit 235 requests switch of the operation mode from the communication node via the communication unit 210. Then, the communication node approves switch of communication of the wireless communication terminal 60 (i.e., switch to communication using tethering) performed after switch of the operation mode, and transmits the mode switch message to the mobile communication terminal 50. As a result, the mobile communication terminal 50 switches the operation mode from the first mode to the second mode.

Note that the mode switch message is a message that is, for example, transmitted to the mobile communication terminal 50 via the mobile communication network 30.

As described above, the operation mode of the mobile communication terminal 50 is switched from the first mode (for example, the stop mode or the power saving mode) to the second mode (for example, the normal mode). Accordingly, communication can be promptly switched while power consumption of the mobile communication terminal 50 is suppressed. This point is as described in the first embodiment.

Note that, instead of the communication node of the mobile communication network 30 transmitting the mode switch message, the communication node 200 may transmit the message to the mobile communication terminal 50 via the mobile communication network 30.

Switch of Communication of the Wireless Communication Terminal 60

Furthermore, when the predetermined condition is satisfied, for example, the switch control unit 235 further controls the wireless communication terminal 60 to switch communication from the first communication performed via the wireless communication network 40 to second communication performed via the mobile communication terminal 50 and the mobile communication network 30 (i.e., communication switch control). In other words, the communication switch control is control to cause the wireless communication terminal 60 to switch communication from communication performed via the wireless communication network 40 (first communication) to communication using tethering (second communication).

Specific Control

The communication switch control is, for example, triggering transmission of a message requesting switch of communication from the first communication to the second communication (i.e., communication switch message) to the wireless communication terminal 60. In other words, the switch control unit 235 triggers transmission of the communication switch message to the wireless communication terminal 60.

As an example, the communication node 200 transmits the communication switch message. In this case, the switch control unit 235 triggers the transmission of the communication switch message by the communication node 200 (the processing unit 230). Then, the communication node 200 (the processing unit 230) transmits the communication switch message to the wireless communication terminal 60.

Note that the communication switch message is, for example, a message transmitted to the wireless communication terminal 60 via the wireless communication network 40. The communication node 100, for example, transmits the communication switch message to the wireless communication terminal 60 via the wireless communication network 40.

As described above, communication of the wireless communication terminal 60 is switched from communication performed via a WLAN to communication using tethering. Accordingly, the communication of the wireless communication terminal 60 can be reliably switched.

3.3. Process Flow

Next, a communication control process according to the second embodiment will be described with reference to FIG. 11.

(Communication Control Process)

Figure 11:
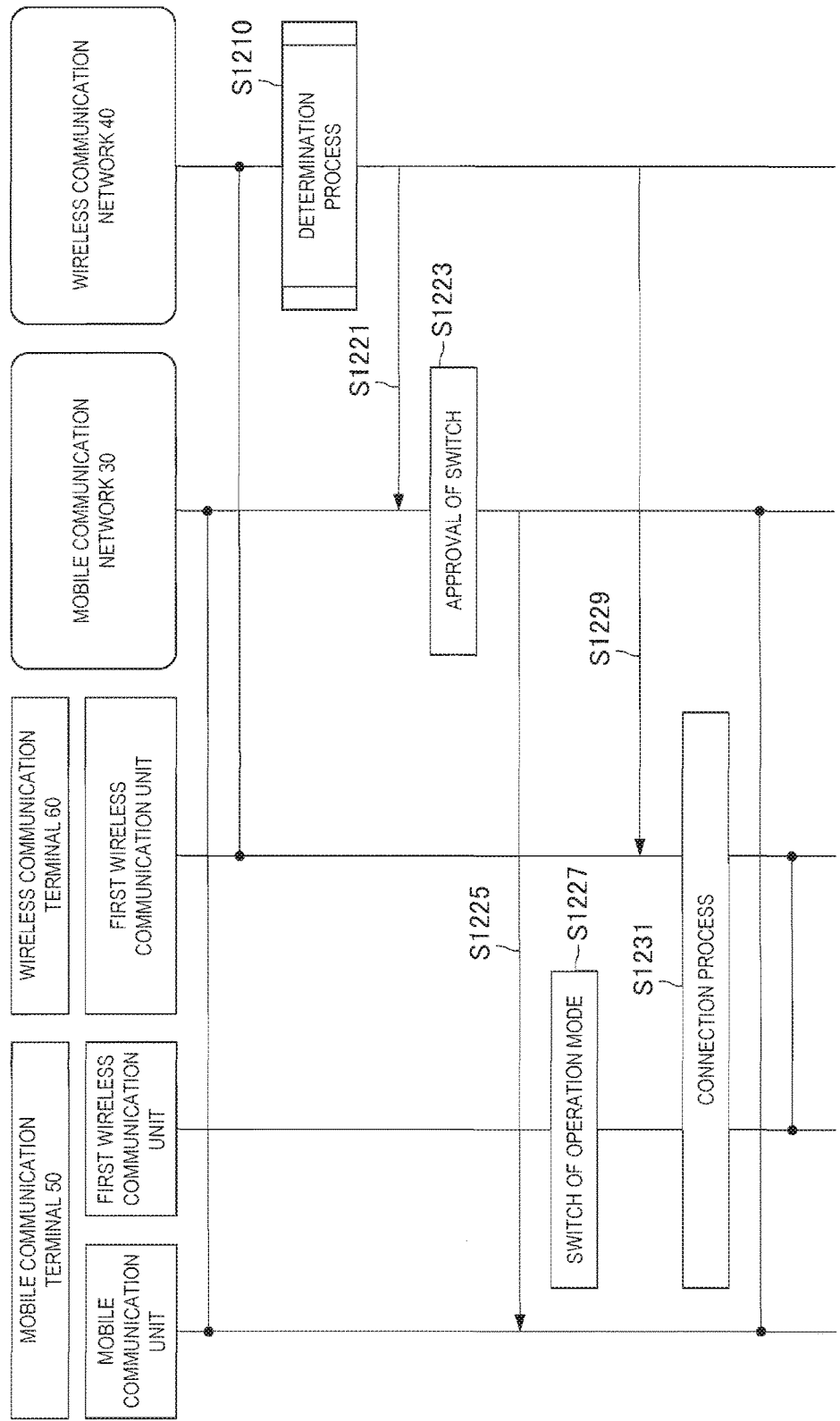
FIG. 11 is a sequence diagram showing an example of a schematic flow of a communication control process according to the second embodiment.

FIG. 11 is a sequence diagram showing an example of a schematic flow of the communication control process according to the second embodiment.

As a premise, the mobile communication terminal 50 is connected to the mobile communication network 30. In addition, the wireless communication terminal 60 is connected to the wireless communication network 40.

First, the communication node 200 of the wireless communication network 40 performs a determination process (S1210). In other words, the communication node 200 determines whether a predetermined condition for connection of the wireless communication terminal 60 to the wireless communication network 40 is satisfied. Then, for example, the predetermined condition is determined to be satisfied. Note that the communication node 200 can generate information necessary for the determination process by itself, or can acquire the information from the communication node of the mobile communication network 30 and/or the mobile communication terminal 50. In addition, the determination process is, for example, the same process as the determination process (S1110) described with reference to FIG. 6.

The communication node 200 thereafter requests switch of the operation mode of the mobile communication terminal 50 from the communication node of the mobile communication network 30 (S1221). Then, the communication node of the mobile communication network 30 approves switch of communication of the wireless communication terminal 60 (i.e., switch to communication using tethering) performed after the switch of the operation mode (S1223). Then, the communication node transmits a mode switch message to the mobile communication terminal 50 (S1225). The mode switch message is a message requesting switch of the operation mode for communication in the first wireless communication scheme (for example, WLAN communication). Then, the mobile communication terminal 50 switches the operation mode for the communication in the first wireless communication scheme from the first mode (for example, the stop mode or the power saving mode) to the second mode (for example, the normal mode) (S1227).

In addition, the communication node 200 transmits a communication switch message to the wireless communication terminal 60 via the wireless communication network 40 (S1229). The communication switch message is a message requesting switch of communication from the first communication (for example, communication performed via the wireless communication network 40) to the second communication (i.e., communication using tethering). Then, the mobile communication terminal 50 and the wireless communication terminal 60 perform a connection process to be directly connected to each other in communication of the first wireless communication scheme in order to switch communication to the second communication (S1231). As a result, the mobile communication terminal 50 and the wireless communication terminal 60 are connected to each other in the communication of the first wireless communication scheme. In addition, since the mobile communication terminal 50 is connected to the mobile communication network 30 as described above, the terminal can perform communication using tethering.

3.4. Modified Examples

Next, modified examples of the second embodiment will be described with reference to FIGS. 12 and 13. In the modified examples, the mode switch message or the communication switch message is transmitted in the second wireless communication scheme (for example, a communication scheme of short-range wireless communication) that the mobile communication terminal 50 and the wireless communication terminal 60 support.

(Communication Node 200: Switch Control Unit 235)

Switch of the Operation Mode of the Mobile Communication Terminal 50

Specific Control

As a first example among the modified examples of the second embodiment, a mode switch message is a message transmitted from the wireless communication terminal 60 to the mobile communication terminal 50 in the second wireless communication scheme (for example, a communication scheme of short-range wireless communication).

As an example, the communication node 200 transmits a mode switch message and a communication switch message to the wireless communication terminal 60. Then, the wireless communication terminal 60 transmits the mode switch message to the mobile communication terminal 50 in the second wireless communication scheme. As a result, the mobile communication terminal 50 switches its operation mode from the first mode to the second mode.

Switch of Communication of the Wireless Communication Terminal 60

Specific Control

As a second example among the modified examples of the second embodiment, the communication switch message may be a message transmitted from the mobile communication terminal 50 to the wireless communication terminal 60 in the second wireless communication scheme (for example, a communication scheme of short-range wireless communication).

As an example, any communication node of the mobile communication network 30 (for example, a base station or a core network node) transmits the mode switch message and the communication switch message. In this case, the switch control unit 235 triggers the transmission of the mode switch message and the communication switch message by the communication node. Specifically, for example, the switch control unit 235 requests switch of the operation mode from the communication node of the mobile communication network 30 via the communication unit 210. Then, the communication node approves switch of communication of the wireless communication terminal 60 performed after switch of the operation mode (i.e., switch to communication using tethering), and transmits the mode switch message and the communication switch message to the mobile communication terminal 50. Then, the mobile communication terminal 50 transmits the communication switch message to the wireless communication terminal 60 in the second wireless communication scheme. As a result, the wireless communication terminal 60 switches communication from communication performed via the wireless network 40 to communication using tethering.

Process Flow: Communication Control Process (First Example)

Figure 12:
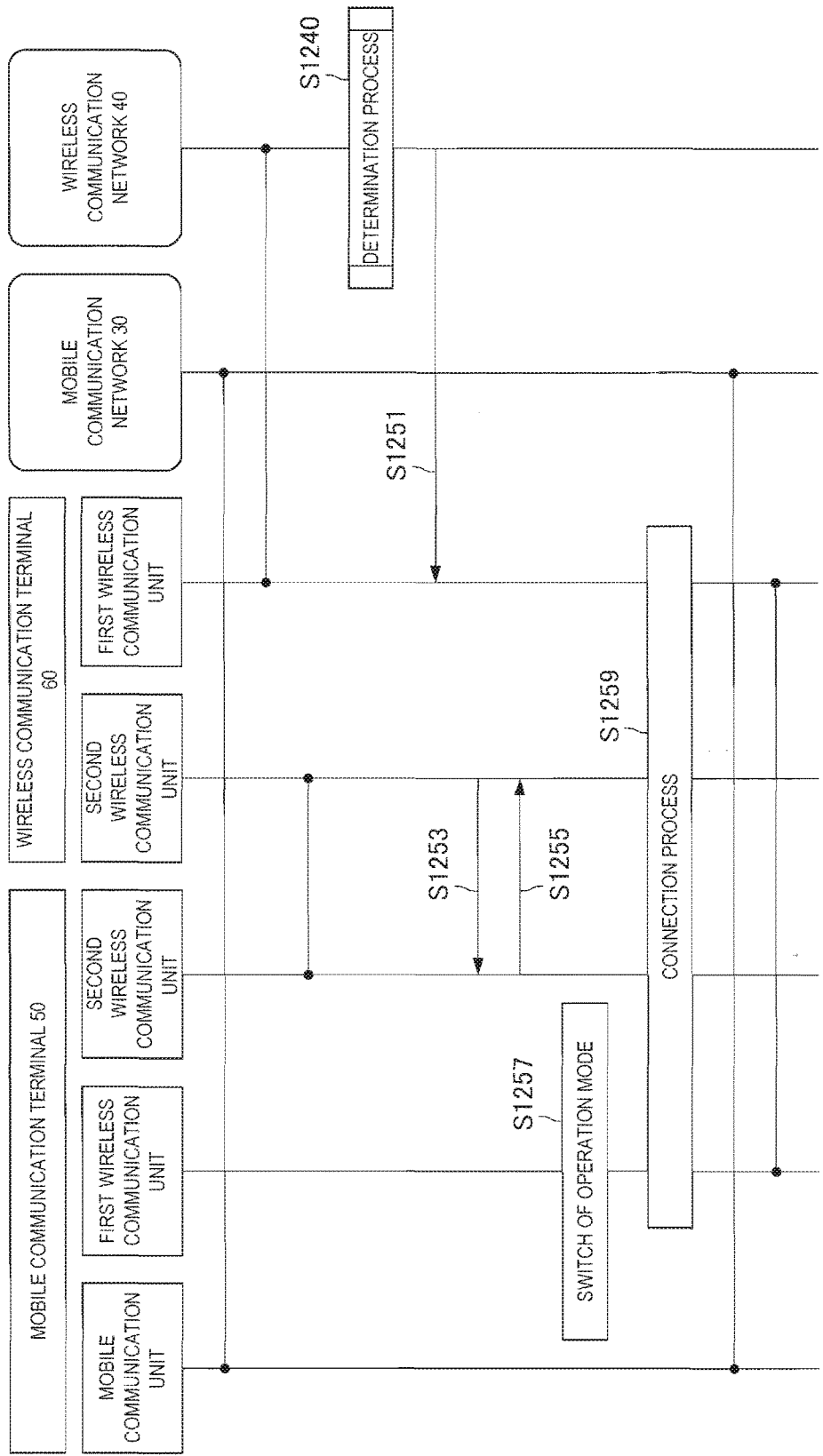
FIG. 12 is a sequence diagram showing a first example of a schematic flow of a communication control process according to a modified example of the second embodiment.

FIG. 12 is a sequence diagram showing a first example of a schematic flow of a communication control process according to the modified example of the second embodiment.

As a premise, the mobile communication terminal 50 is connected to the mobile communication network 30. In addition, the wireless communication terminal 60 is connected to the wireless communication network 40. In addition, the mobile communication terminal 50 and the wireless communication terminal 60 are connected to each other in the second communication scheme.

First, the communication node 200 of the wireless communication network 40 performs a determination process (S1240). The determination process is, for example, the same process as the determination process (S1110) described with reference to FIG. 6.

The communication node 200 thereafter transmits a mode switch message and a communication switch message to the wireless communication terminal 60 via the wireless communication network 40 (S1251).

Then, the wireless communication terminal 60 transmits the mode switch message to the mobile communication terminal 50 in the second wireless communication scheme (for example, Bluetooth) (S1253). Then, the mobile communication terminal 50 responds thereto (S1255). Then, the mobile communication terminal 50 switches the operation mode for communication performed in the first wireless communication scheme from the first mode (for example, the stop mode or the power saving mode) to the second mode (for example, the normal mode) (S1257).

The mobile communication terminal 50 and the wireless communication terminal 60 thereafter perform a connection process for direct connection in the first wireless communication scheme (S1259) in order to switch communication to the second communication (i.e., communication using tethering). As a result, the mobile communication terminal 50 and the wireless communication terminal 60 are connected to each other in communication of the first wireless communication scheme. In addition, since the mobile communication terminal 50 is connected to the mobile communication network 30 as described above, communication is possible using tethering.

Process Flow: Communication Control Process (Second Example)

Figure 13:
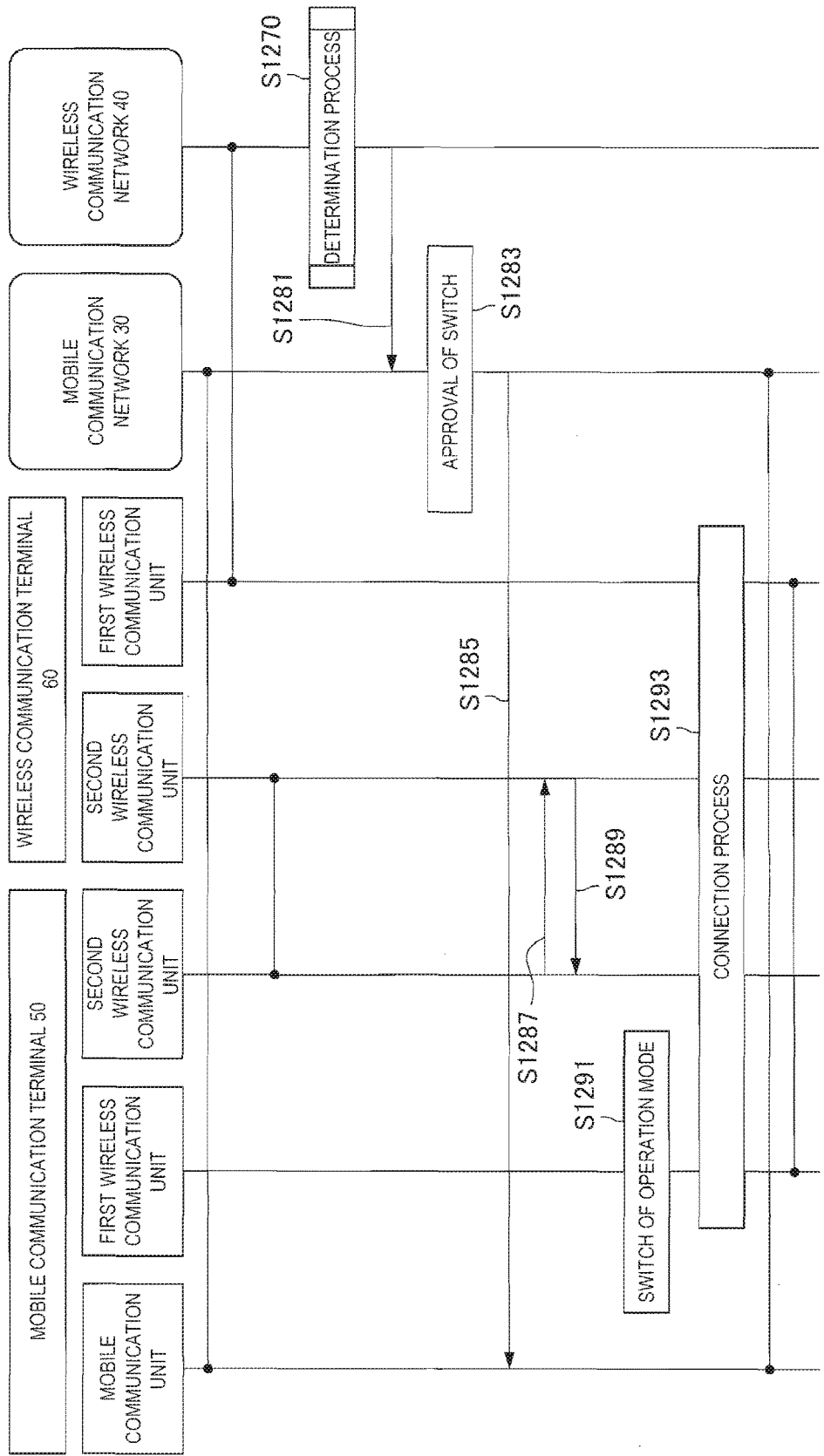
FIG. 13 is a sequence diagram showing a second example of a schematic flow of a communication control process according to a modified example of the second embodiment.

FIG. 13 is a sequence diagram showing a second example of a schematic flow of a communication control process according to the modified example of the second embodiment.

As a premise, the mobile communication terminal 50 is connected to the mobile communication network 30. In addition, the wireless communication terminal 60 is connected to the wireless communication network 40. In addition, the mobile communication terminal 50 and the wireless communication terminal 60 are connected to each other in the second communication scheme.

First, the communication node 200 of the wireless communication network 40 performs a determination process (S1270). The determination process is, for example, the same process as the determination process (S1110) described with reference to FIG. 6.

The communication node 200 thereafter requests switch of the operation mode of the mobile communication terminal 50 from the communication node of the mobile communication network 30 (S1281). Then, the communication node of the mobile communication network 30 approves switch of communication of the wireless communication terminal 60 (i.e., switch to communication using tethering)

performed after the switch of the operation mode (S1283). Then, the communication node transmits a mode switch message and a communication switch message to the mobile communication terminal 50 (S1285).

Then, the mobile communication terminal 50 transmits the communication switch message to the mobile communication terminal 50 in the second wireless communication scheme (for example, Bluetooth) (S1287). Then, the wireless communication terminal 60 responds thereto (S1289).

In addition, the mobile communication terminal 50 switches the operation mode for communication performed in the first wireless communication scheme from the first mode (for example, the stop mode or the power saving mode) to the second mode (for example, the normal mode) (S1291).

The mobile communication terminal 50 and the wireless communication terminal 60 thereafter perform a connection process for direct connection in the first wireless communication scheme (S1293) in order to switch communication to the second communication (i.e., communication using tethering). As a result, the mobile communication terminal 50 and the wireless communication terminal 60 are connected to each other in communication of the first wireless communication scheme. In addition, since the mobile communication terminal 50 is connected to the mobile communication network 30 as described above, communication is possible using tethering.

4. Third Embodiment

A third embodiment of the present disclosure will be described with reference to FIGS. 14 to 19. In the third embodiment, a wireless communication terminal performs control according to an embodiment of the present disclosure. In other words, a communication control device that performs the control according to an embodiment of the present disclosure is a wireless communication terminal.

4.1. Configuration of a Communication System

Figure 14:
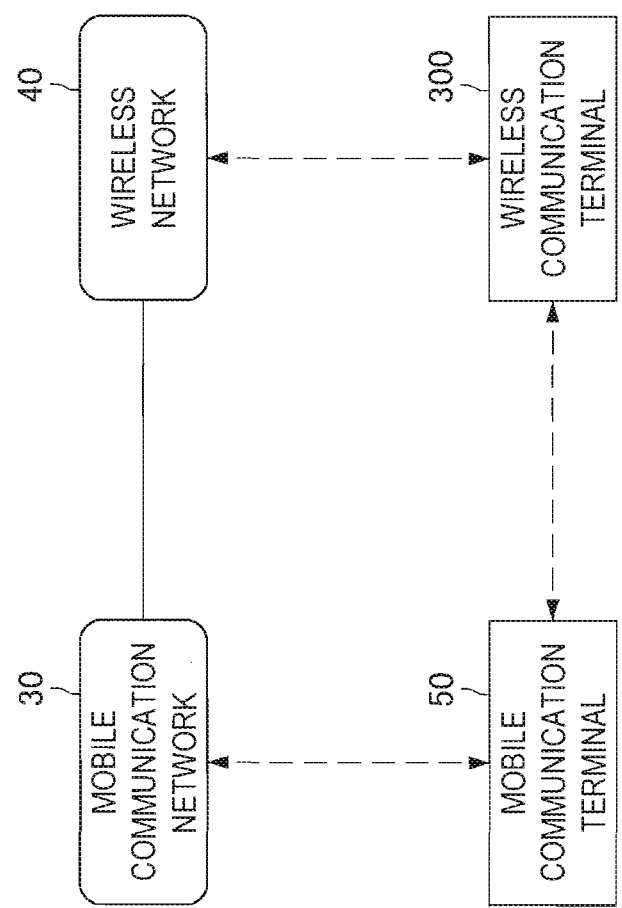
FIG. 14 is an explanatory diagram showing an example of a schematic configuration of a communication system according to a third embodiment.

First, a schematic configuration of a communication system according to the third embodiment of the present disclosure will be described with reference to FIG. 14. FIG. 14 is an explanatory diagram showing an example of the schematic configuration of the communication system according to the third embodiment of the present disclosure. Referring to FIG. 14, the communication system includes a mobile communication network 30, a wireless communication network 40, a mobile communication terminal 50, and a wireless communication terminal 300.

Note that description with regard to the mobile communication network 30, the wireless communication network 40, and the mobile communication terminal 50 is the same as description of the elements of the first embodiment. Thus, overlapping description will be omitted.

(Wireless Communication Terminal 300)

The wireless communication terminal 300 communicates via the wireless communication network 40. In other words, the wireless communication terminal 60 performs wireless communication in a service area of the wireless communication network 40. Specifically, when the wireless communication terminal 300 is positioned within the service area of the wireless communication network 40, for example, the terminal communicates with an access point of the wireless communication network 40.

In addition, the wireless communication terminal 300 supports the first wireless communication scheme (for example, a communication scheme for a WLAN) and communicates in the first wireless communication scheme. Furthermore, the wireless communication terminal 300 also supports, for example, the second wireless communication scheme (for example, Bluetooth) and communicates in the second wireless communication scheme.

In the third embodiment, in particular, the wireless communication terminal 300 can promptly switch communication while suppressing power consumption of the mobile communication terminal 50.

4.2. Configuration of a Wireless Communication Terminal

Figure 15:
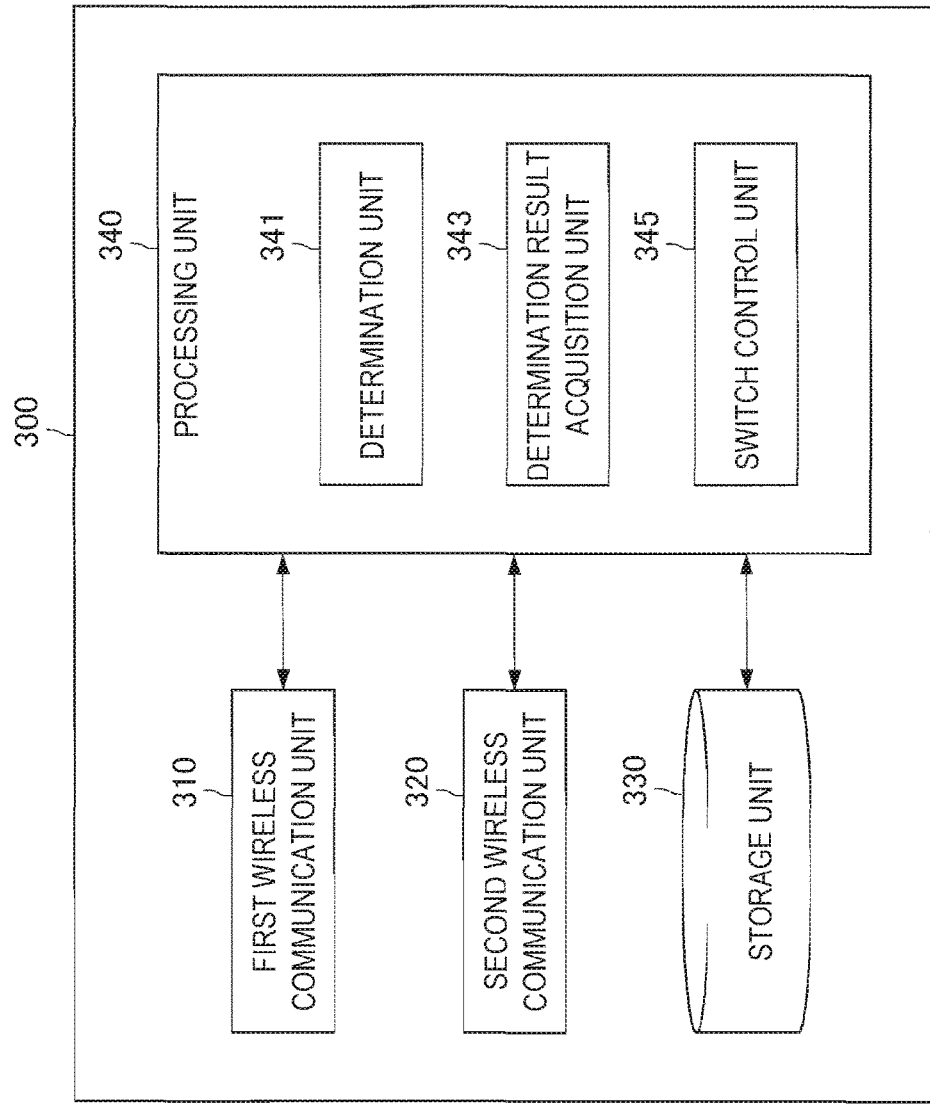
FIG. 15 is a block diagram showing an example of a configuration of a wireless communication terminal according to the third embodiment.

An example of a configuration of the wireless communication terminal 300 according to the third embodiment will be described with reference to FIG. 15. FIG. 15 is a block diagram showing the example of the configuration of the wireless communication terminal 300 according to the third embodiment. Referring to FIG. 15, the wireless communication terminal 300 includes a first wireless communication unit 310, a second wireless communication unit 320, a storage unit 330, and a processing unit 340.

(First Wireless Communication Unit 310)

The first wireless communication unit 310 communicates in the first wireless communication scheme. For example, the first wireless communication unit 310 communicates with an access point of the wireless communication network 40 (for example, a WLAN) in the first wireless communication scheme. In addition, the first wireless communication unit 310 communicates directly with, for example, the mobile communication terminal 50 in the first wireless communication scheme.

(Second Wireless Communication Unit 320)

The second wireless communication unit 320 communicates in the second wireless communication scheme. For example, the second wireless communication unit 320 communicates directly with the mobile communication terminal 50 in the second wireless communication scheme.

(Storage Unit 330)

The storage unit 330 temporarily or permanently stores a program and data for operations of the wireless communication terminal 300.

(Processing Unit 340)

The processing unit 340 provides various functions of the wireless communication terminal 300. The processing unit 340 includes a determination unit 341, a determination result acquisition unit 343, and a switch control unit 345.

(Determination Unit 341)

The determination unit 341 determines whether a predetermined condition for connection of the wireless communication terminal 300 to the wireless communication network 40 is satisfied.

As an example, the predetermined condition includes one or more OR conditions. Thus, if the one or more OR conditions are satisfied, the predetermined condition is satisfied.

Communication Quality

The predetermined condition is a condition determined based on, for example, communication quality of communication of the wireless communication terminal 300 on the wireless communication network 40.

More specifically, the predetermined condition is a condition determined based on, for example, whether or not communication quality of communication of the wireless communication terminal 300 on the wireless communication network 40 is lower than predetermined quality. In this case, the predetermined condition is satisfied if, for example, the communication quality is lower than the predetermined quality.

Accordingly, it is possible, for example, to switch communication according to deterioration of the communication quality of the wireless communication terminal 300 on the wireless communication network 40. In other words, communication can be switched when the connection of the wireless communication terminal 300 to the wireless communication network 40 is likely to be disconnected.

As a first example, the communication quality includes reception intensity of a signal that the wireless communication terminal 300 receives on the wireless communication network 40. In this case, the predetermined condition is satisfied if, for example, the reception intensity is lower than a predetermined threshold value. As an example, one of the one or more OR conditions is that the reception intensity be lower than the predetermined threshold value.

As a second example, the communication quality includes an error rate of communication of the wireless communication terminal 300 on the wireless communication network 40. In this case, the predetermined condition is satisfied if, for example, the error rate is higher than a predetermined threshold value. As an example thereof, one of the one or more OR conditions is that the error rate be higher than the predetermined threshold value.

As a third example, the communication quality includes the number of re-transmissions of the wireless communication terminal 300 in communication on the wireless communication network 40. In this case, the predetermined condition is satisfied if, for example, the number of re-transmissions is greater than a predetermined threshold value. As an example thereof, one of the one or more OR conditions is that the number of re-transmissions be greater than the predetermined threshold value.

Note that the communication quality is measured by, for example, the wireless communication terminal 300.

As described above, the determination unit 341 performs the determination (i.e., determination of whether a predetermined condition for connection of the wireless communication terminal 300 to the wireless communication network 40 is satisfied). Then, the determination unit 341 provides the result of the determination to the determination result acquisition unit 343. If the predetermined condition is satisfied, for example, the determination unit 341 provides the result of the determination of the predetermined condition (i.e., the result indicating that the predetermined condition is satisfied) to the determination result acquisition unit 343. Note that, if the predetermined condition is not satisfied, the determination unit 341 may provide the result of the determination of the predetermined condition (i.e., the result indicating that the predetermined condition is not satisfied) to the determination result acquisition unit 343 or may not provide the result to the determination result acquisition unit 343.

(Determination Result Acquisition Unit 343)

The determination result acquisition unit 343 acquires the result of determination (i.e., determination of whether a predetermined condition for the connection of the wireless communication terminal 300 to the wireless communication network 40 is satisfied).

The determination unit 341 provides, for example, the result of the determination of the predetermined condition to the determination result acquisition unit 343. Then, the determination result acquisition unit 343 acquires the result.

(Switch Control Unit 345)

Switch of an Operation Mode of the Mobile Communication Terminal 50

When the predetermined condition is satisfied, the switch control unit 345 controls the mobile communication terminal 50 which communicates via the mobile communication network 30 to switch its operation mode from a first mode to a second mode (i.e., mode switch control).

Note that, as described in the first embodiment, the operation mode is an operation mode for communication performed in the first wireless communication scheme (for example, WLAN communication). In addition, the first mode is a mode in which power consumption is smaller than in the second mode (for example, the stop mode or the power saving mode), and the second mode is a mode in which the mobile communication terminal 50 can transmit or receive data in the first wireless communication scheme (for example, the normal mode).

Specific Control

The mode switch control is triggered by, for example, transmitting a message requesting switch of the operation mode from the first mode to the second mode (i.e., mode switch message) to the mobile communication terminal 50. In other words, the switch control unit 345 triggers the transmission of the mode switch message to the mobile communication terminal 50.

As an example, any communication node of the mobile communication network 30 (for example, a base station or a core network node) transmits the mode switch message. In this case, the switch control unit 345 triggers the transmission of the mode switch message by the communication node. Specifically, for example, the switch control unit 345 requests switch of the operation mode from the communication node by way of the wireless communication network 40 and the mobile communication network 30 via the first wireless communication unit 310. Then, the communication node approves switch of communication of the wireless communication terminal 300 (i.e., switch to communication using tethering) performed after switch of the operation mode, and transmits the mode switch message to the mobile communication terminal 50. As a result, the mobile communication terminal 50 switches the operation mode from the first mode to the second mode.

Note that the mode switch message is a message that is, for example, transmitted to the mobile communication terminal 50 via the mobile communication network 30.

As described above, the operation mode of the mobile communication terminal 50 is switched from the first mode (for example, the stop mode or the power saving mode) to the second mode (for example, the normal mode). Accordingly, communication can be promptly switched while power consumption of the mobile communication terminal 50 is suppressed. This point is as described in the first embodiment.

Note that, instead of the communication node of the mobile communication network 30 transmitting the mode switch message, the wireless communication terminal 300 may transmit the message to the mobile communication terminal 50 via the wireless communication network 40 and the mobile communication network 30.

Switch of Communication of the Wireless Communication Terminal 60

Furthermore, when the predetermined condition is satisfied, for example, the switch control unit 345 further controls the wireless communication terminal 300 to switch communication from the first communication performed via the wireless communication network 40 to second communication performed via the mobile communication terminal 50 and the mobile communication network 30 (i.e., communication switch control). In other words, the communication switch control is control to cause the wireless communication terminal 300 to switch communication from communication performed via the wireless communication network 40 (first communication) to communication using tethering (second communication).

Specific Control

When the predetermined condition is satisfied, for example, the switch control unit 345 stops communication via the wireless communication network 40, and performs a connection process to be directly connected to the mobile communication terminal 50 in communication of the first wireless communication scheme.

4.3. Process Flow

Next, a communication control process according to the third embodiment will be described with reference to FIG. 16.

(Communication Control Process)

Figure 16:
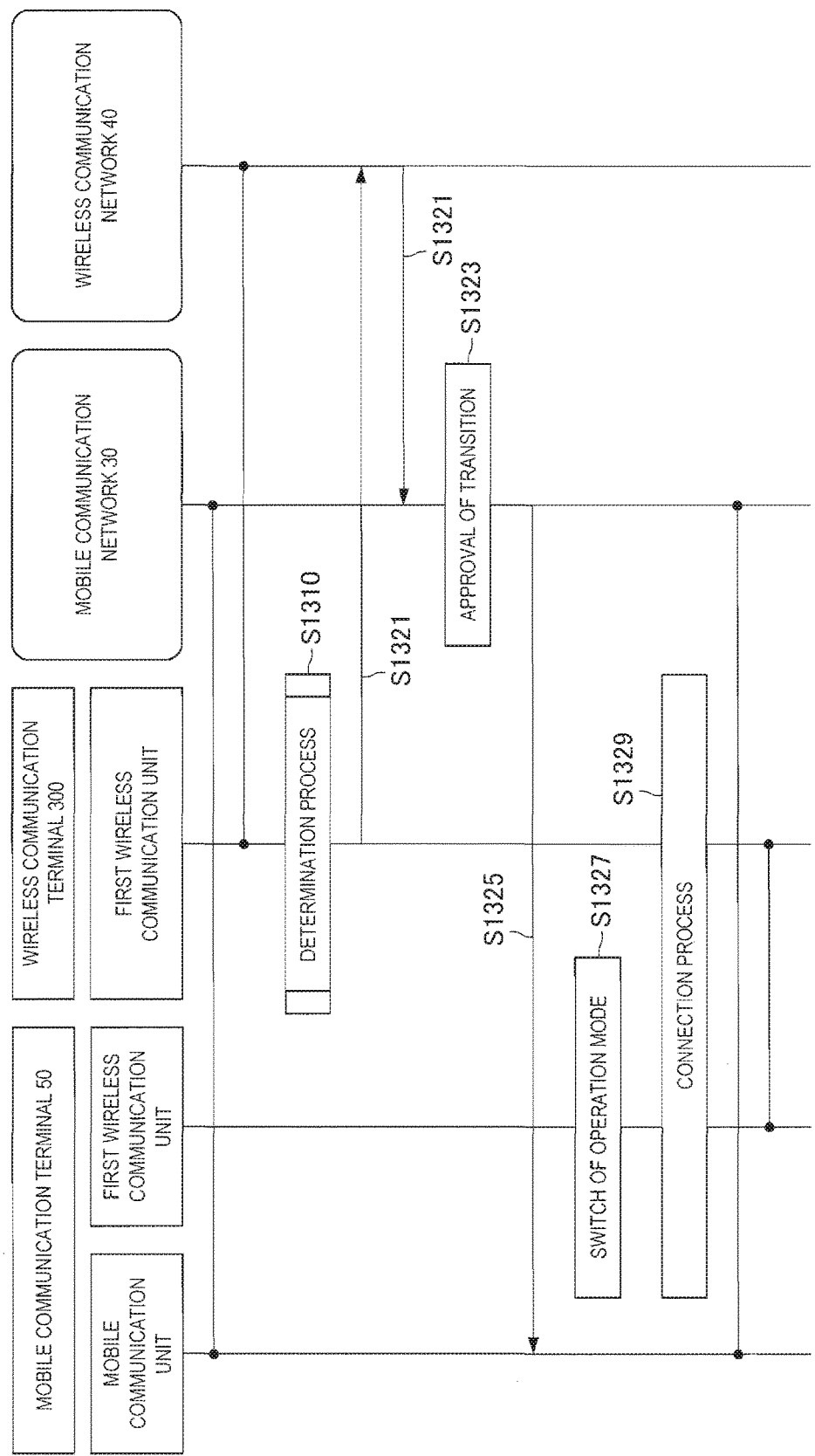
FIG. 16 is a sequence diagram showing an example of a schematic flow of a communication control process according to the third embodiment.

FIG. 16 is a sequence diagram showing an example of a schematic flow of the communication control process according to the third embodiment.

As a premise, the mobile communication terminal 50 is connected to the mobile communication network 30. In addition, the wireless communication terminal 300 is connected to the wireless communication network 40.

First, the wireless communication terminal 300 performs a determination process (S1310). In other words, the wireless communication terminal 300 determines whether the predetermined condition for connection of the wireless communication terminal 300 to the wireless communication network 40 is satisfied. Then, for example, the predetermined condition is determined to be satisfied. Note that the wireless communication terminal 300 can generate information necessary for the determination process by itself.

The wireless communication terminal 300 thereafter requests switch of the operation mode of the mobile communication terminal 50 from the communication node of the mobile communication network 30 via the wireless communication network 40 (S1321). Then, the communication node of the mobile communication network 30 approves switch of communication of the wireless communication terminal 300 (i.e., switch to communication using tethering) performed after the switch of the operation mode (S1323). Then, the communication node transmits a mode switch message to the mobile communication terminal 50 (S1325). The mode switch message is a message requesting switch of the operation mode for communication in the first wireless communication scheme (for example, WLAN communication). Then, the mobile communication terminal 50 switches the operation mode for the communication in the first wireless communication scheme from the first mode (for example, the stop mode or the power saving mode) to the second mode (for example, the normal mode) (S1327).

The mobile communication terminal 50 and the wireless communication terminal 300 thereafter perform a connection process for direct connection in the first wireless communication scheme (S1329) in order to switch communication to the second communication (i.e., communication using tethering). As a result, the mobile communication terminal 50 and the wireless communication terminal 300 are connected to each other in communication of the first wireless communication scheme. In addition, since the mobile communication terminal 50 is connected to the mobile communication network 30 as described above, communication is possible using tethering.

(Determination Process)

Figure 17:
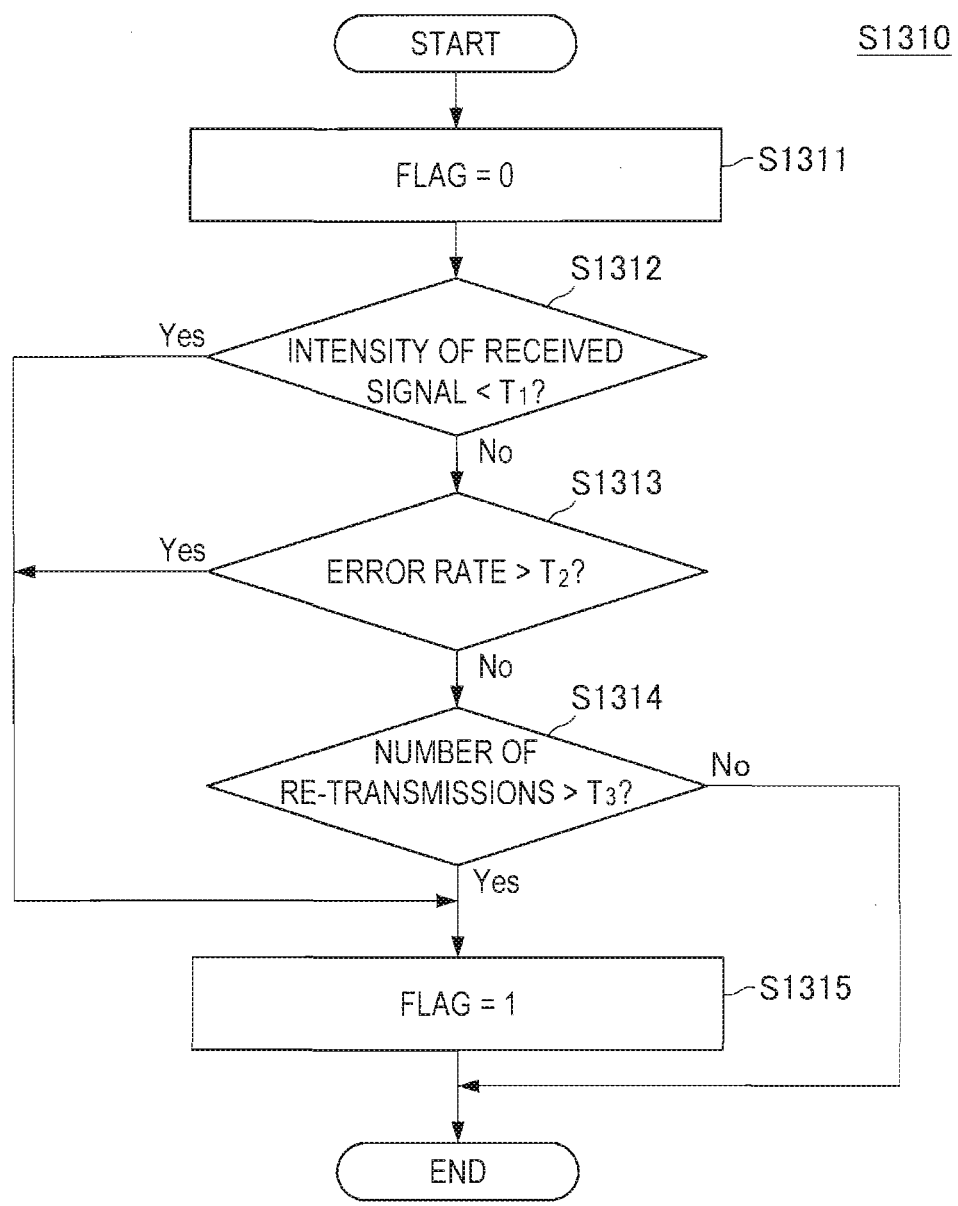
FIG. 17 is a flowchart showing an example of a schematic flow of a determination process according to the third embodiment.

FIG. 17 is a flowchart showing an example of a schematic flow of the determination process according to the third embodiment. The determination process is the process of Step S1310 of FIG. 16.

First, a flag indicating the result of determination is initialized to 0 (S1311).

In addition, the determination unit 341 determines whether reception intensity of a signal that the wireless communication terminal 300 receives on the wireless communication network 40 is lower than a threshold value $T_1$ (S1312). If the reception intensity is lower than the threshold value $T_1$ (YES in S1312), the flag is changed to 1 (S1315). Then, the process ends.

In addition, the determination unit 341 determines whether an error rate of the communication of the wireless communication terminal 300 on the wireless communication network 40 is higher than a threshold value $T_2$ (S1313). If the error rate is higher than the threshold value $T_2$ (YES in S1313), the flag is changed to 1 (S1315). Then, the process ends.

In addition, the determination unit 341 determines whether the number of re-transmissions of the wireless communication terminal 300 in the communication on the wireless communication network 40 is greater than a threshold value $T_3$ (S1314). If the number of re-transmissions is greater than the threshold value $T_3$ (YES in S1314), the flag is changed to 1 (S1315). Then, the process ends.

In addition, if all results of the determinations are negative, the process ends with the flag being 0.

Note that, when the flag is 1, it indicates that the predetermined condition for the connection of the wireless communication terminal 300 to the wireless communication network 40 is satisfied, and when it is 0, it indicates that the predetermined condition is not satisfied.

4.4. Modified Examples

Next, modified examples of the second embodiment will be described with reference to FIGS. 18 and 19. In the modified examples, the mode switch message is transmitted in the third wireless communication scheme (for example, a communication scheme of short-range wireless communication) that the mobile communication terminal 50 and the wireless communication terminal 300 support.

(Wireless Communication Terminal 300: Determination Unit 341)

Connection State

The predetermined condition is a condition determined based on, for example, a connection state of the wireless communication terminal 300 with respect to the wireless communication network 40.

More specifically, the predetermined condition is a condition determined based on, for example, whether or not connection of the wireless communication terminal 300 to the wireless communication network 40 is disconnected. In this case, the predetermined condition is satisfied if, for example, the connection of the wireless communication terminal 300 to the wireless communication network 40 is disconnected. As an example, one of the one or more OR conditions is that the connection of the wireless communication terminal 60 to the wireless communication network 40 be disconnected.

Accordingly, communication can be switched when, for example, connection of the wireless communication terminal 300 to the wireless communication network 40 is disconnected.

(Wireless Communication Terminal 300: Switch Control Unit 345)

Switch of the Operation Mode of the Mobile Communication Terminal 50

Specific Control

Among the modified examples of the third embodiment, a mode switch message is a message transmitted from the wireless communication terminal 60 to the mobile communication terminal 50 in the second wireless communication scheme (for example, a communication scheme of short-range wireless communication).

As an example, the wireless communication terminal 300 transmits the mode switch message to the mobile communication terminal 50 in the second wireless communication scheme.

(Process Flow: Communication Control Process)

Figure 18:
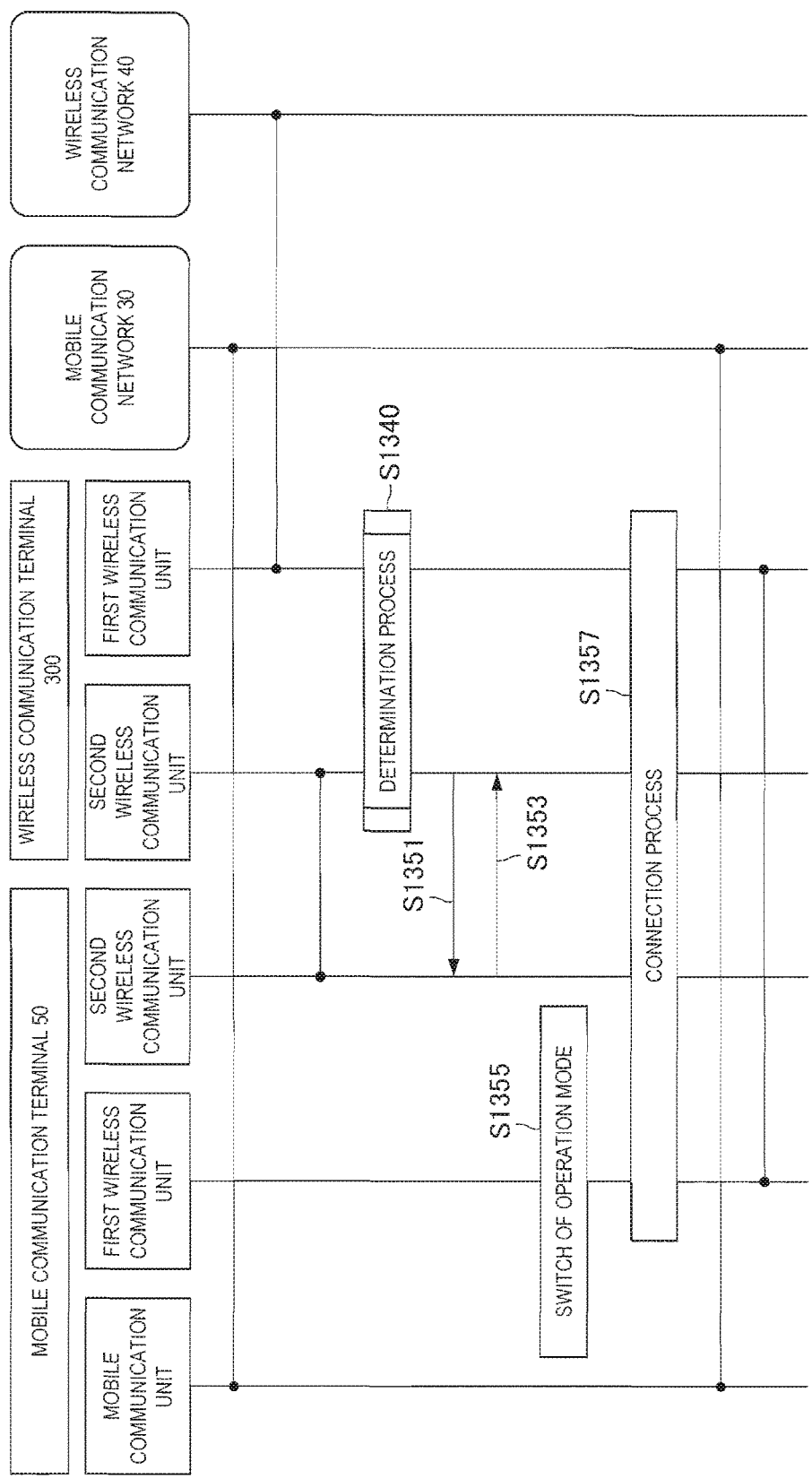
FIG. 18 is a sequence diagram showing an example of a schematic flow of a communication control process according to a modified example of the third embodiment.

FIG. 18 is a sequence diagram showing an example of a schematic flow of a communication control process according to the modified example of the third embodiment.

As a premise, the mobile communication terminal 50 is connected to the mobile communication network 30. In addition, the wireless communication terminal 60 is connected to the wireless communication network 40. In addition, the mobile communication terminal 50 and the wireless communication terminal 60 are connected to each other in the second communication scheme.

First, the wireless communication terminal 300 performs a determination process (S1340). In other words, the wireless communication terminal 300 determines whether the predetermined condition for connection of the wireless communication terminal 300 to the wireless communication network 40 is satisfied. Then, for example, the predetermined condition is determined to be satisfied. Note that the wireless communication terminal 300 can generate information necessary for the determination process by itself.

Then, the wireless communication terminal 300 transmits the mode switch message to the mobile communication terminal 50 in the second wireless communication scheme (for example, Bluetooth) (S1351). Then, the mobile communication terminal 50 responds thereto (S1353). Then, the mobile communication terminal 50 switches the operation mode for communication performed in the first wireless communication scheme from the first mode (for example, the stop mode or the power saving mode) to the second mode (for example, the normal mode) (S1355).

The mobile communication terminal 50 and the wireless communication terminal 300 thereafter perform a connection process for direct connection in the first wireless communication scheme (S1357) in order to switch communication to the second communication (i.e., communication using tethering). As a result, the mobile communication terminal 50 and the wireless communication terminal 300 are connected to each other in communication of the first wireless communication scheme. In addition, since the mobile communication terminal 50 is connected to the mobile communication network 30 as described above, communication is possible using tethering.

(Determination Process)

Figure 19:
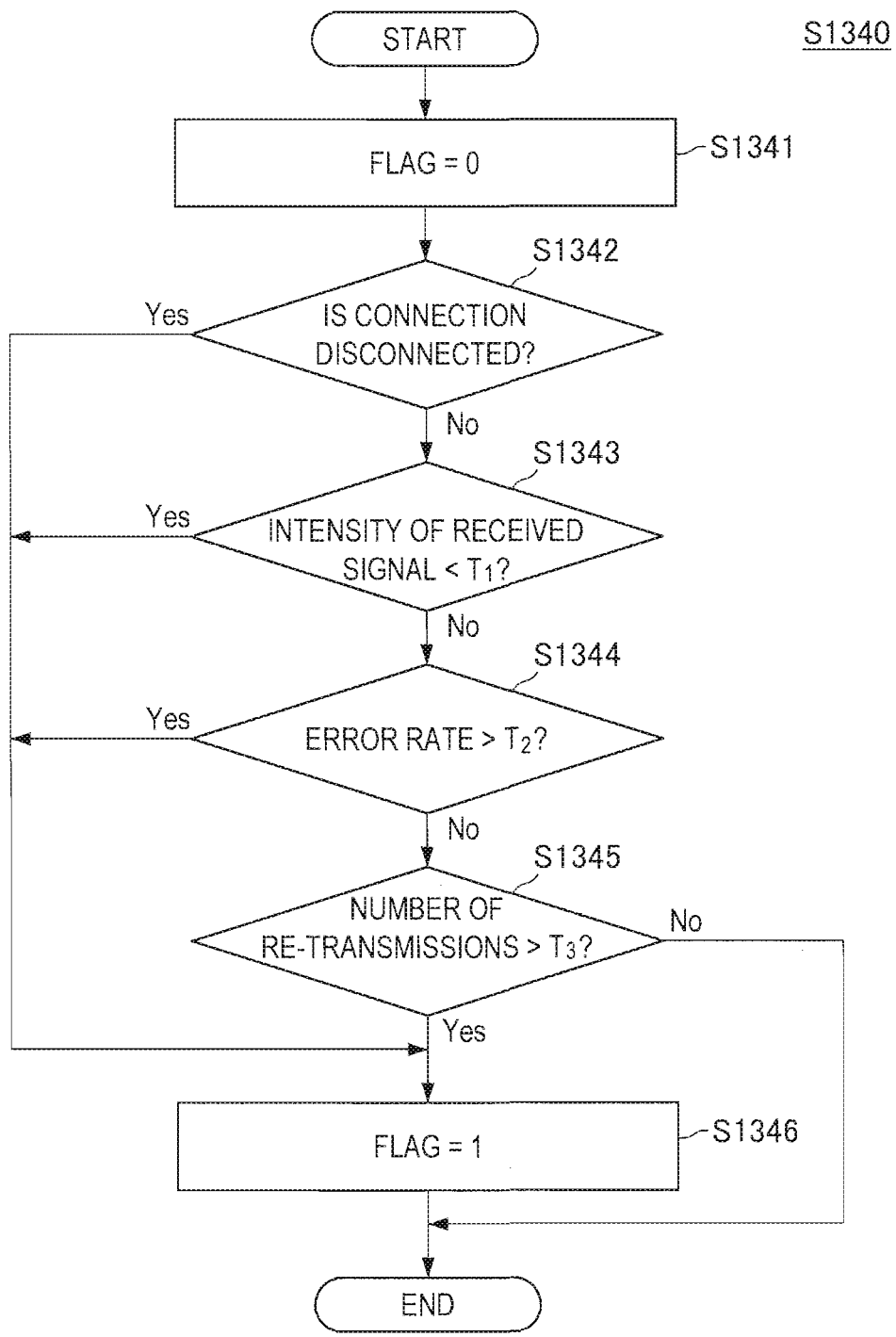
FIG. 19 is a flowchart showing an example of a schematic flow of a determination process according to the modified example of the third embodiment.

FIG. 19 is a flowchart showing an example of a schematic flow of the determination process according to a modified example of the third embodiment. The determination process is the process of Step S1310 of FIG. 16.

First, a flag indicating the result of determination is initialized to 0 (S1341).

Then, the determination unit 341 determines whether connection of the wireless communication terminal 300 to the wireless communication network 40 is disconnected (S1342). If the connection is disconnected (YES in S1342), the flag is changed to 1 (S1346). Then, the process ends.

In addition, the determination unit 341 determines whether reception intensity of a signal that the wireless communication terminal 300 receives on the wireless communication network 40 is lower than a threshold value $T_1$ (S1343). If the reception intensity is lower than the threshold value $T_1$ (YES in S1343), the flag is changed to 1 (S1346). Then, the process ends.

In addition, the determination unit 341 determines whether an error rate of the communication of the wireless communication terminal 300 on the wireless communication network 40 is higher than a threshold value $T_2$ (S1344). If the error rate is higher than the threshold value $T_2$ (YES in S1344), the flag is changed to 1 (S1346). Then, the process ends.

In addition, the determination unit 341 determines whether the number of re-transmissions of the wireless communication terminal 300 in the communication on the wireless communication network 40 is greater than a threshold value $T_3$ (S1345). If the number of re-transmissions is greater than the threshold value $T_3$ (YES in S1345), the flag is changed to 1 (S1346). Then, the process ends.

In addition, if all results of the determinations are negative, the process ends with the flag being 0.

Note that, when the flag is 1, it indicates that the predetermined condition for the connection of the wireless communication terminal 300 to the wireless communication network 40 is satisfied, and when it is 0, it indicates that the predetermined condition is not satisfied.

5. Fourth Embodiment

A fourth embodiment of the present disclosure will be described with reference to FIGS. 20 to 23. In the fourth embodiment, a mobile communication terminal performs control according to an embodiment of the present disclosure. In other words, a communication control device that performs the control according to an embodiment of the present disclosure is a mobile communication terminal.

5.1. Configuration of a Communication System

Figure 20:
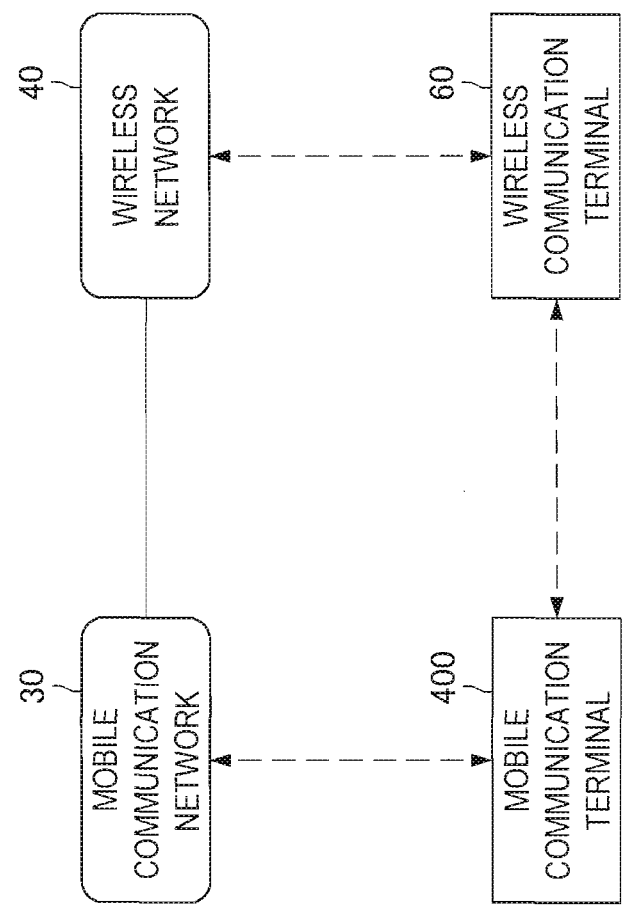
FIG. 20 is an explanatory diagram showing an example of a schematic diagram of a communication system according to a fourth embodiment of the present disclosure.

First, a schematic configuration of a communication system according to the fourth embodiment of the present disclosure will be described with reference to FIG. 20. FIG. 20 is an explanatory diagram showing an example of the schematic configuration of the communication system according to the fourth embodiment of the present disclosure. Referring to FIG. 20, the communication system includes a mobile communication network 30, a wireless communication network 40, a mobile communication terminal 400, and a wireless communication terminal 60.

Note that description with regard to the mobile communication network 30, the wireless communication network 40, and the wireless communication terminal 60 is the same as description of the elements of the first embodiment. Thus, overlapping description will be omitted.

(Mobile Communication Terminal 400)

The mobile communication terminal 400 performs communication via a mobile communication network 30. In other words, the mobile communication terminal 400 performs mobile communication in a service area of the mobile communication network 30. Specifically, when the mobile communication terminal 400 is positioned within the cell of the mobile communication network 30, for example, the terminal communicates with a base station of the cell.

In addition, the mobile communication terminal 400 supports the first wireless communication scheme (for example, a communication scheme for a WLAN) and communicates in the first wireless communication scheme. Furthermore, the mobile communication terminal 400 also supports, for example, the second wireless communication scheme (for example, Bluetooth) and communicates in the second wireless communication scheme.

In the fourth embodiment, in particular, the mobile communication terminal 400 can promptly switch communication while suppressing power consumption of the mobile communication terminal 400.

5.2. Configuration of a Mobile Communication Terminal

Figure 21:
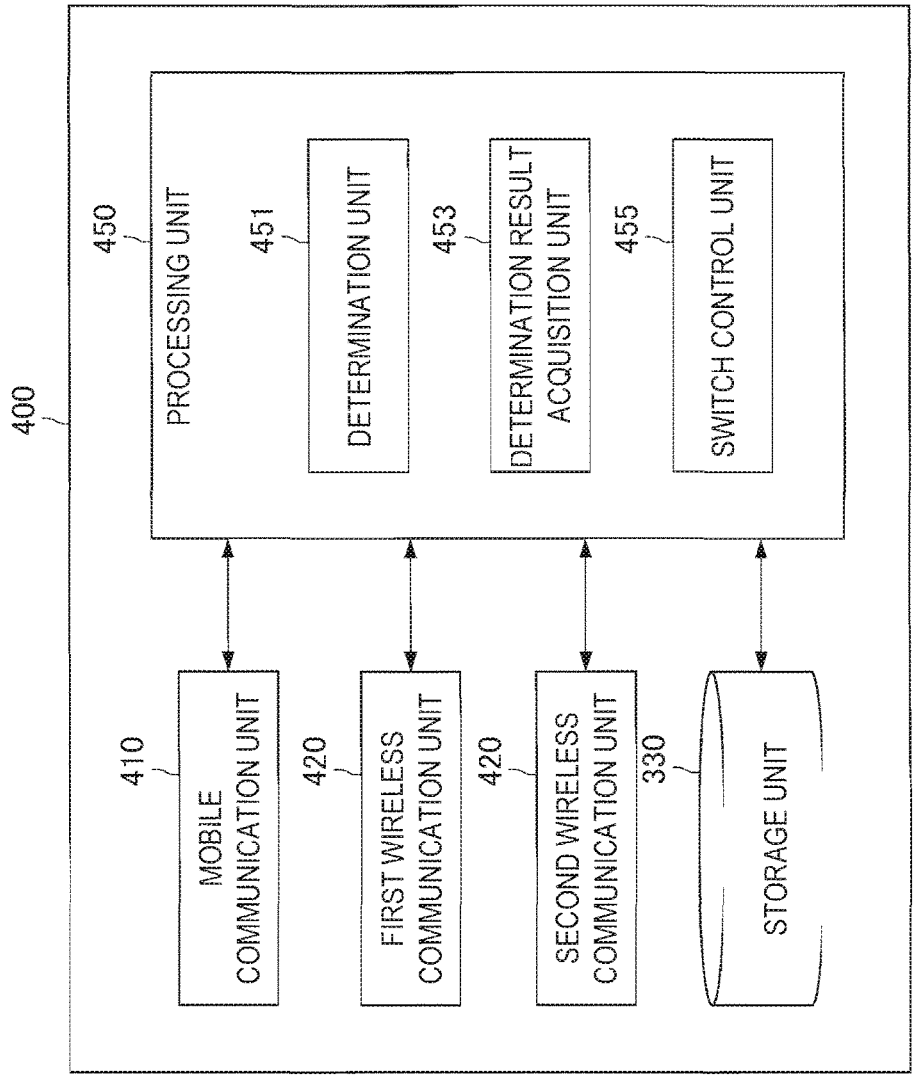
FIG. 21 is a block diagram showing an example of a configuration of a mobile communication terminal according to the fourth embodiment.

An example of a configuration of the mobile communication terminal 400 according to the fourth embodiment will be described with reference to FIG. 21. FIG. 21 is a block diagram showing the example of the configuration of the mobile communication terminal 400 according to the fourth embodiment. Referring to FIG. 21, the mobile communication terminal 400 includes a mobile communication unit 410, a first wireless communication unit 420, a second wireless communication unit 430, a storage unit 440, and a processing unit 450.

(Mobile Communication Unit 410)

The mobile communication unit 410 communicates via the mobile communication network 30. The mobile communication unit 410 communicates with, for example, a base station of the mobile communication network 30.

(First Wireless Communication Unit 420)

The first wireless communication unit 420 communicates in the first wireless communication scheme. For example, the first wireless communication unit 420 communicates with an access point of the wireless communication network 40 (for example, a WLAN) in the first wireless communication scheme. In addition, the first wireless communication unit 420 communicates directly with, for example, the wireless communication terminal 60 in the first wireless communication scheme.

(Second Wireless Communication Unit 430)

The second wireless communication unit 430 communicates in the second wireless communication scheme. For example, the second wireless communication unit 430 communicates directly with the wireless communication terminal 60 in the second wireless communication scheme.

(Storage Unit 440)

The storage unit 440 temporarily or permanently stores a program and data for operations of the mobile communication terminal 400.

(Processing Unit 450)

The processing unit 450 provides various functions of the mobile communication terminal 400. The processing unit 450 includes a determination unit 451, a determination result acquisition unit 453, and a switch control unit 455.

Here, according to the fourth embodiment, the determination unit 451 and the determination result acquisition unit 453 are, for example, functionally the same as the determination unit 131 and the determination result acquisition unit 133 according to the first embodiment. Thus, only the switch control unit 455 will be described here.

(Switch Control Unit 455)

Switch of an Operation Mode of the Mobile Communication Terminal 400

When the predetermined condition is satisfied, the switch control unit 455 controls the mobile communication terminal 50 which communicates via the mobile communication network 30 to switch its operation mode from a first mode to a second mode (i.e., mode switch control).

Note that, as described in the first embodiment, the operation mode is an operation mode for communication performed in the first wireless communication scheme (for example, WLAN communication). In addition, the first mode is a mode in which power consumption is smaller than in the second mode (for example, the stop mode or the power saving mode), and the second mode is a mode in which the mobile communication terminal 400 can transmit or receive data in the first wireless communication scheme (for example, the normal mode).

Specific Control

When the predetermined condition is satisfied, for example, the switch control unit 455 switches the operation mode for communication in the first wireless communication scheme (for example, the operation mode of the first wireless communication unit 420) from the first mode to the second mode.

As described above, the operation mode of the mobile communication terminal 400 is switched from the first mode (for example, the stop mode or the power saving mode) to the second mode (for example, the normal mode). Accordingly, communication can be promptly switched while power consumption of the mobile communication terminal 400 is suppressed. This point is as described in the first embodiment.

Switch of Communication of the Wireless Communication Terminal 60

Furthermore, when the predetermined condition is satisfied, for example, the switch control unit 455 further controls the wireless communication terminal 60 to switch communication from the first communication performed via the wireless communication network 40 to second communication performed via the mobile communication terminal 400 and the mobile communication network 30 (i.e., communication switch control). In other words, the communication switch control is control to cause the wireless communication terminal 60 to switch communication from communication performed via the wireless communication network 40 (first communication) to communication using tethering (second communication).

Specific Control

The communication switch control is, for example, triggering transmission of a message requesting switch of communication from the first communication to the second communication (i.e., communication switch message) to the wireless communication terminal 60. In other words, the switch control unit 455 triggers transmission of the communication switch message to the wireless communication terminal 60.

As an example, the mobile communication terminal 400 transmits the communication switch message. In this case, the switch control unit 455 triggers the transmission of the communication switch message by the mobile communication terminal 400 (the processing unit 450). Then, the mobile communication terminal 400 (the processing unit 450) transmits the communication switch message to the wireless communication terminal 60. As a result, the wireless communication terminal 60 switches communication from communication performed via the wireless network 40 to communication using tethering.

Note that the communication switch message is, for example, a message transmitted to the wireless communication terminal 60 via the wireless communication network 40. The mobile communication terminal 400, for example, transmits the communication switch message to the wireless communication terminal 60 via the mobile communication network 30 and the wireless communication network 40.

As described above, communication of the wireless communication terminal 60 is switched from communication performed via a WLAN to communication using tethering. Accordingly, the communication of the wireless communication terminal 60 can be reliably switched.

Note that, instead of the mobile communication terminal 400 transmitting the communication switch message, a communication node of the mobile communication network 30 may transmit the message to the mobile communication terminal 50 via the wireless communication network 40.

5.3. Process Flow

Next, a communication control process according to the fourth embodiment will be described with reference to FIG. 22.

(Communication Control Process)

Figure 22:
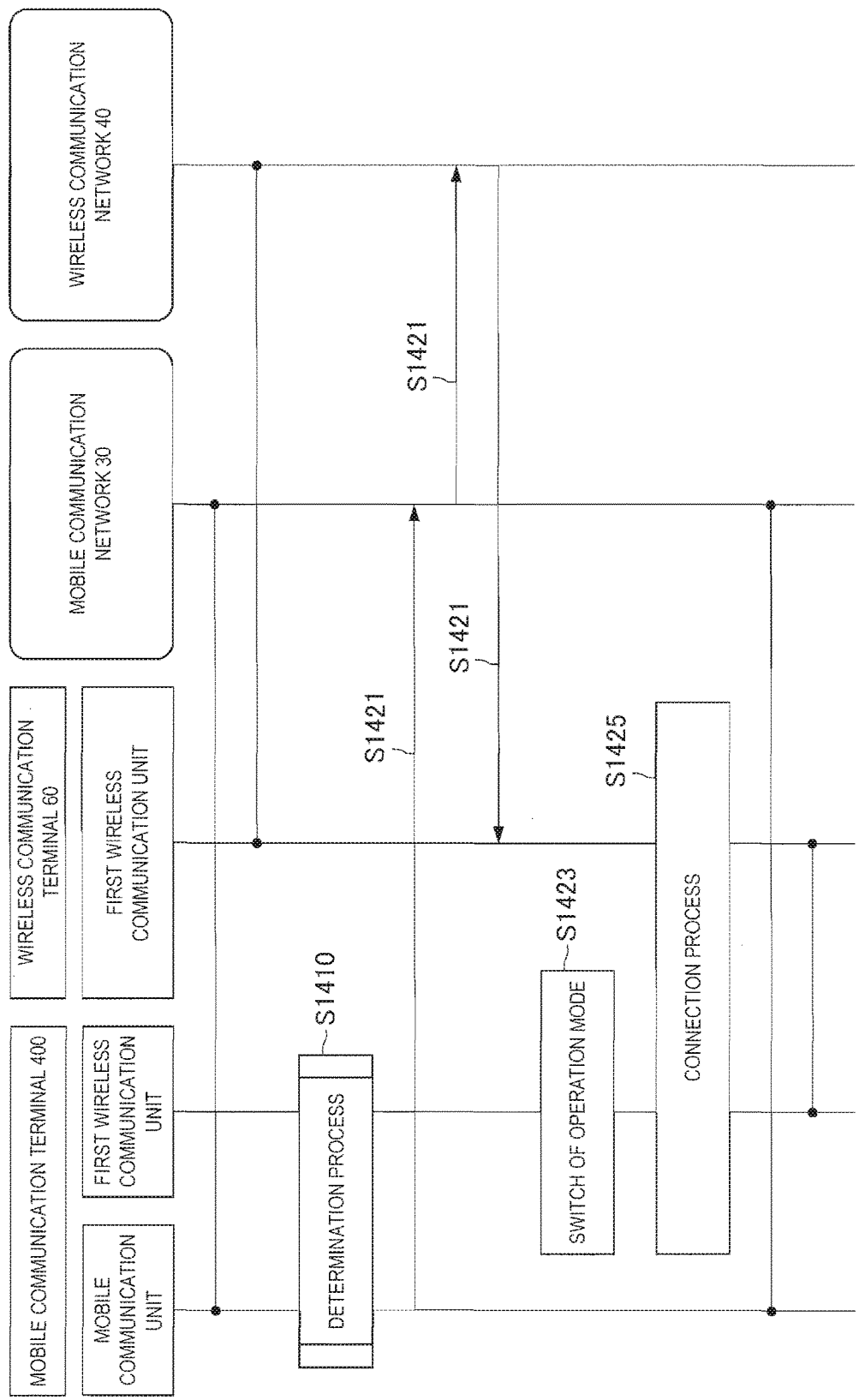
FIG. 22 is a sequence diagram showing an example of a schematic flow of a communication control process according to the fourth embodiment.

FIG. 22 is a sequence diagram showing an example of a schematic flow of the communication control process according to the fourth embodiment.

As a premise, the mobile communication terminal 400 is connected to the mobile communication network 30. In addition, the wireless communication terminal 60 is connected to the wireless communication network 40.

First, the mobile communication terminal 400 performs a determination process (S1410). In other words, the mobile communication terminal 400 determines whether a predetermined condition for connection of the wireless communication terminal 60 to the wireless communication network 40 is satisfied. Then, for example, the predetermined condition is determined to be satisfied. Note that the mobile communication terminal 400 can acquire information necessary for the determination process from a communication node of the wireless communication network 40 and/or a communication node of the mobile communication network 30. In addition, the determination process is the same process as, for example, the determination process (S1110) described with reference to FIG. 6.

The mobile communication terminal 400 thereafter transmits a communication switch message to the wireless communication terminal 60 via the mobile communication network 30 and the wireless communication network 40 (S1421). The communication switch message is a message requesting switch of communication from the first communication (for example, communication via the wireless communication network 40) to the second communication (i.e., communication using tethering).

In addition, the mobile communication terminal 400 switches the operation mode for communication performed in the first wireless communication scheme from the first mode (for example, the stop mode or the power saving mode) to the second mode (for example, the normal mode) (S1423).

The mobile communication terminal 400 and the wireless communication terminal 60 thereafter perform a connection process for direct connection in the first wireless communication scheme (S1425) in order to switch communication to the second communication. As a result, the mobile communication terminal 400 and the wireless communication terminal 60 are connected to each other in communication of the first wireless communication scheme. In addition, since the mobile communication terminal 400 is connected to the mobile communication network 30 as described above, communication is possible using tethering.

5.4. Modified Examples

Next, modified examples of the fourth embodiment will be described with reference to FIG. 23. In the modified examples, the communication switch message is transmitted in the third wireless communication scheme (for example, a communication scheme of short-range wireless communication) that the mobile communication terminal 400 and the wireless communication terminal 60 support.

(Mobile Communication Terminal 400: Determination Unit 451)

The determination unit 451 and the determination result acquisition unit 453 according to a modified example of the fourth embodiment are functionally the same as, for example, the determination unit 131 and the determination result acquisition unit 133 according to the first embodiment. In this case, information necessary for a determination process can be provided by a communication node of the wireless communication network 40 and/or a communication node of the mobile communication network 30, or can be generated by the mobile communication terminal 400.

Note that the determination unit 451 and the determination result acquisition unit 453 may be functionally the same as the determination unit 341 and the determination result acquisition unit 343 according to the third embodiment. In this case, information necessary for a determination process may be provided by the wireless communication terminal 60.

(Mobile Communication Terminal 400: Switch Control Unit 455)

Switch of Communication of the Wireless Communication Terminal 60

Specific Control

According to the modified example of the fourth embodiment, the communication switch message is a message transmitted from the mobile communication terminal 400 to the wireless communication terminal 60 in the second wireless communication scheme (for example, a communication scheme of short-range wireless communication).

As an example, the mobile communication terminal 400 transmits the communication switch message to the wireless communication terminal 60 in the second wireless communication scheme. As a result, the wireless communication terminal 60 switches communication from communication performed via the wireless network 40 to communication using tethering.

(Process Flow: Communication Control Process)

Figure 23:
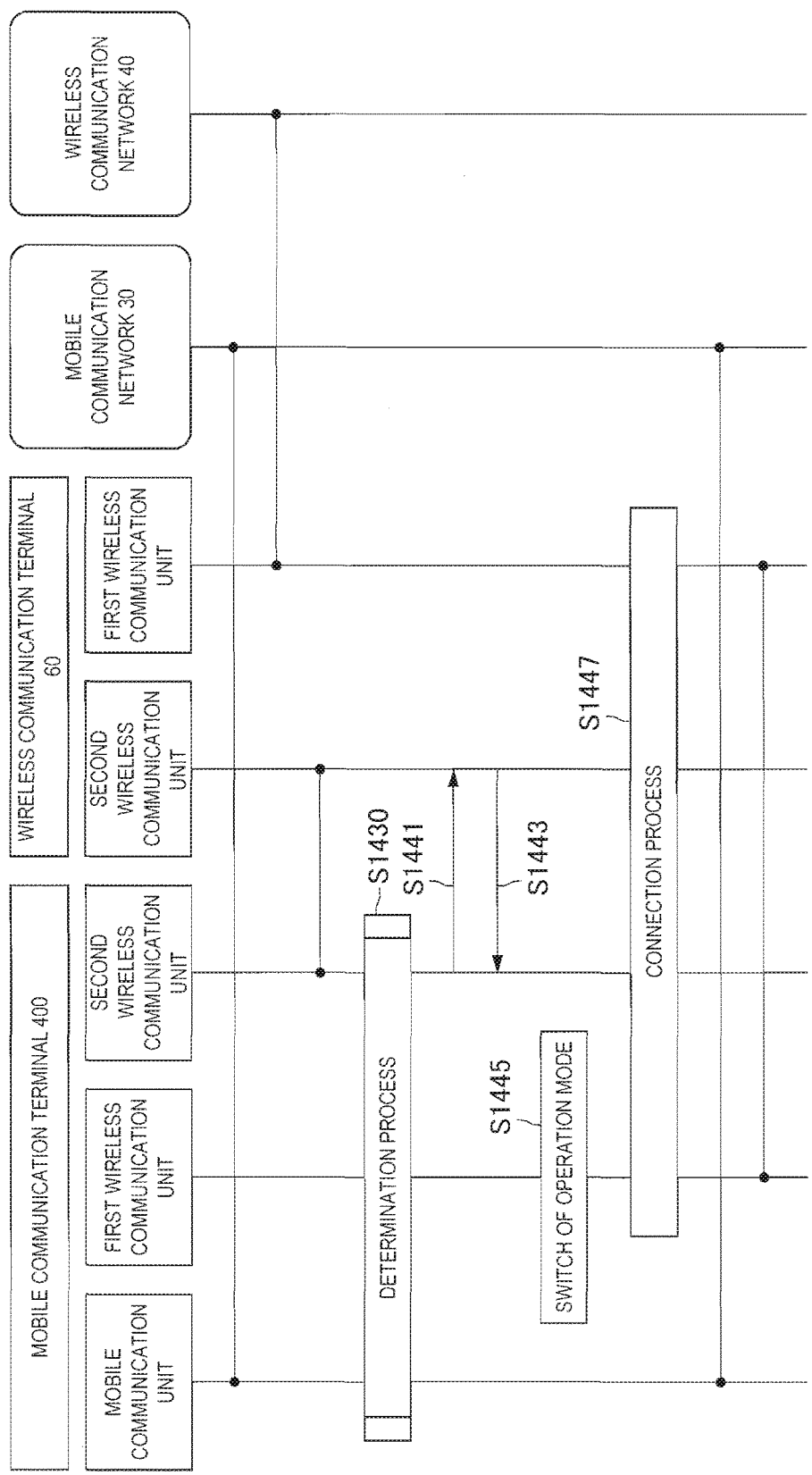
FIG. 23 is a sequence diagram showing an example of a schematic flow of a communication control process according to a modified example of the fourth embodiment.

FIG. 23 is a sequence diagram showing an example of a schematic flow of a communication control process according to the modified example of the fourth embodiment.

As a premise, the mobile communication terminal 50 is connected to the mobile communication network 30. In addition, the wireless communication terminal 60 is connected to the wireless communication network 40. In addition, the mobile communication terminal 50 and the wireless communication terminal 60 are connected to each other in the second communication scheme.

First, the mobile communication terminal 400 performs a determination process (S1430). In other words, the mobile communication terminal 400 determines whether a predetermined condition for connection of the wireless communication terminal 60 to the wireless communication network 40 is satisfied. Note that the determination process is the same process as, for example, the determination process (S1110) described with reference to FIG. 6 or the determination process (S1340) described with reference to FIG. 19.

Then, the mobile communication terminal 400 transmits the communication switch message to the wireless communication terminal 60 in the second wireless communication scheme (for example, Bluetooth) (S1441). Then, the mobile communication terminal 400 responds thereto (S1443).

In addition, the mobile communication terminal 400 switches the operation mode for communication performed in the first wireless communication scheme from the first mode (for example, the stop mode or the power saving mode) to the second mode (for example, the normal mode) (S1445).

The mobile communication terminal 400 and the wireless communication terminal 60 thereafter perform a connection process for direct connection in the first wireless communication scheme (S1447) in order to switch communication to the second communication (i.e., communication using tethering). As a result, the mobile communication terminal 400 and the wireless communication terminal 60 are connected to each other in communication of the first wireless communication scheme. In addition, since the mobile communication terminal 400 is connected to the mobile communication network 30 as described above, communication is possible using tethering.

6. Application Examples

Application examples of the technology according to the present disclosure will be described with reference to FIGS. 24 to 31.

6.1. Application Examples of a Communication Node of a Mobile Communication Network First, application examples of the communication node 100 of the mobile communication network 30 will be described with reference to FIGS. 24 to 26.

The communication node 100 according to the first embodiment (i.e., the communication node 100 of the mobile communication network 30) may be, for example, a node other than a base station (for example, a core network node), or may be realized as any type of server among a tower server, a rack server, a blade server, and the like. In addition, the communication node 100 may be a control module mounted in a server (for example, an integrated circuit module formed in one die, or a card or a blade to be inserted into a slot of a blade server).

In addition, the communication node 100 may be realized as, for example, any type of eNB (evolved Node B) such as a macro eNB or a small eNB. A small eNB may be an eNB which covers a smaller cell than a macro cell, such as a pico eNB, a micro eNB, or a home (femto) eNB. Instead, the communication node 100 may be realized as another type of base station such as a NodeB or a base transceiver station (BTS). The communication node 100 may include a main body (also called a base station device) which controls wireless communication, and one or more remote radio heads (RRHs) disposed at a different place from the main body. In addition, any of various types of terminals to be described below may operate as the communication node 100 by temporarily or semi-permanently executing the function of a base station.

First Application Example

Figure 24:
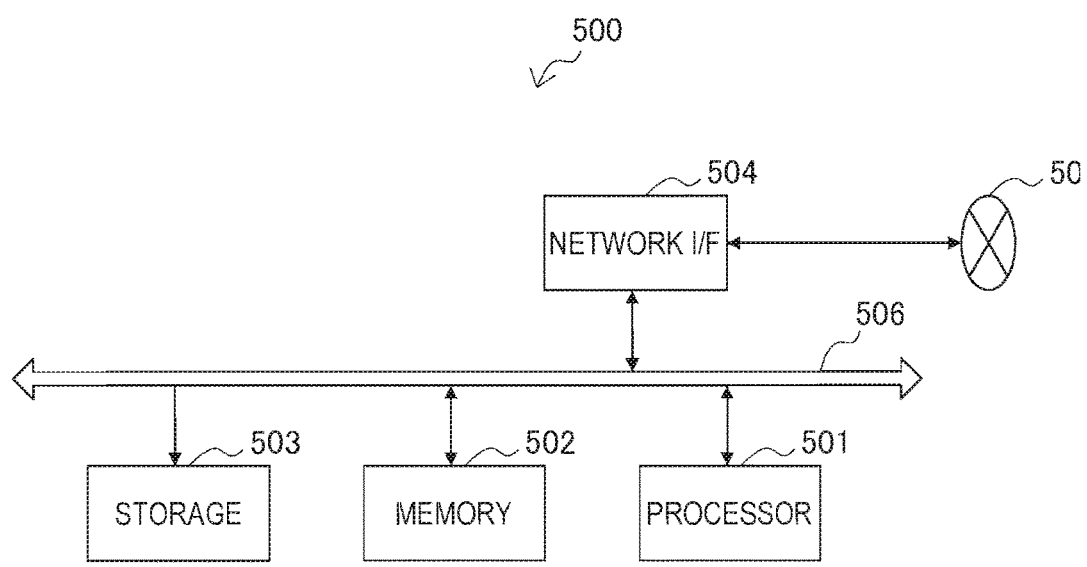
FIG. 24 is a block diagram showing an example of a schematic configuration of a server to which the technology according to the present disclosure can be applied.

FIG. 24 is a block diagram showing an example of a schematic configuration of a server 500 to which the technology according to the present disclosure can be applied. The server 500 includes a processor 501, a memory 502, a storage 503, a network interface 504, and a bus 506.

The processor 501 may be, for example, a central processing unit (CPU) or a digital signal processor (DSP) which controls various functions of the server 500. The memory 502 includes a random access memory (RAM) and a read only memory (ROM), and stores programs executed by the processor 501 and data. The storage 503 can include a storage medium such as a semiconductor memory or a hard disk.

The network interface 504 is a wired communication interface for connecting the server 500 to a wired communication network 505. The wired communication network 505 may be a core network such as an Evolved Packet Core (EPC).

The bus 506 connects the processor 501, the memory 502, the storage 503, and the network interface 504 to one another. The bus 506 may include two or more buses with different speeds (for example, a high-speed bus and a low-speed bus).

The determination result acquisition unit 133 and the switch control unit 135 described with reference to FIG. 4 may be implemented by the processor 501 of the server 500 shown in FIG. 24. More specifically, for example, the determination result acquisition unit 133 and the switch control unit 135 may be implemented by the memory 502 that stores a program executed by the processor 501 and the processor 501. The program may be an operating system (OS) and/or application software.

Likewise, the determination unit 131 described with reference to FIG. 4 may also be implemented by the processor 501.

Second Application Example

Figure 25:
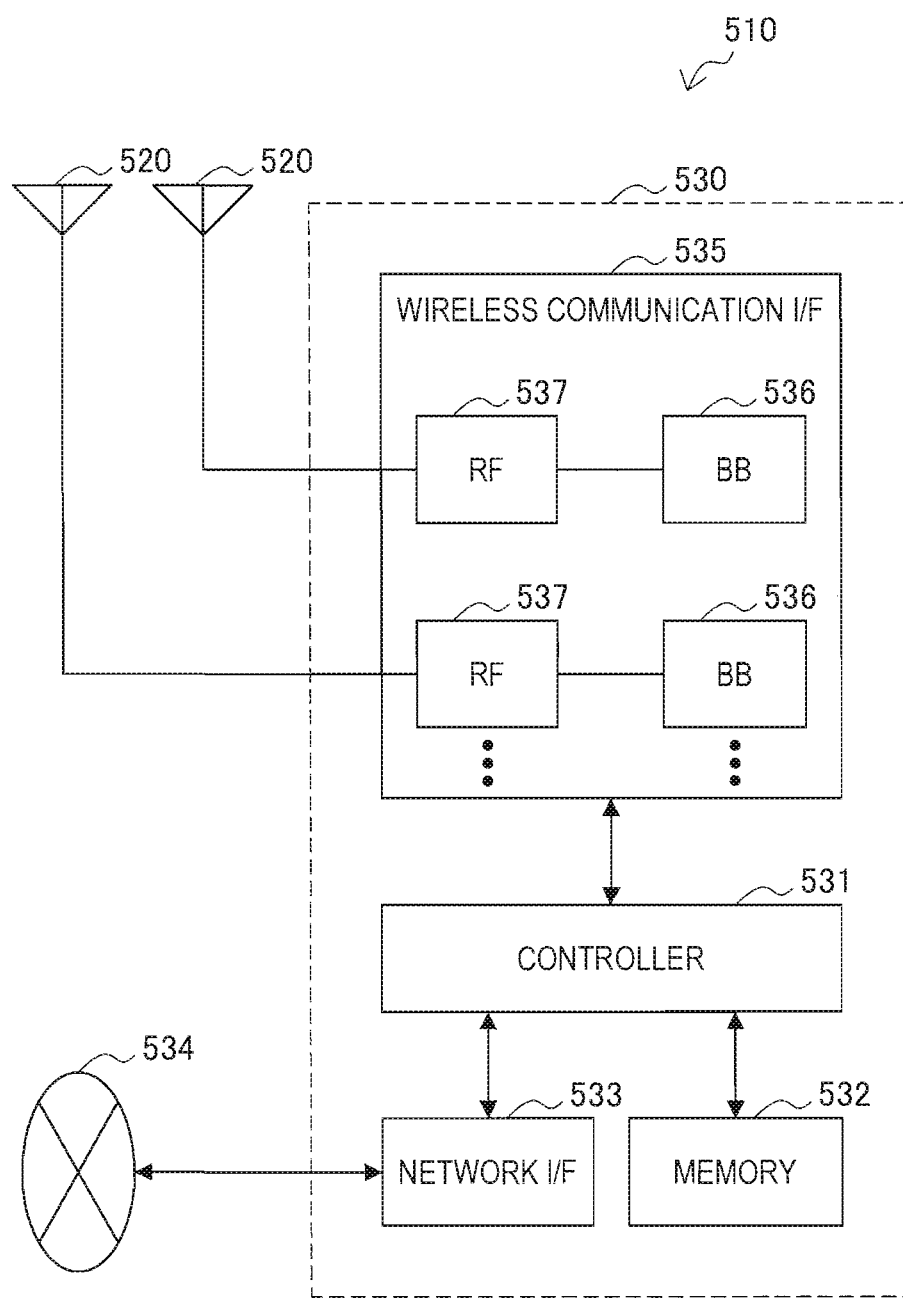
FIG. 25 is a block diagram showing a first example of a schematic configuration of an eNB to which the technology according to the present disclosure can be applied.

FIG. 25 is a block diagram showing a first example of a schematic configuration of an eNB to which the technology according to the present disclosure can be applied. The eNB 510 has one or more antennas 520 and a base station device 530. Each of the antennas 520 and the base station device 530 can be connected to each other via RF cables.

Each of the antennas 520 has a single or a plurality of antenna elements (for example, a plurality of antenna elements constituting a MIMO antenna), and is used for transmission and reception of radio signals by the base station device 530. The eNB 510 may have a plurality of antennas 520 as shown in FIG. 25, and the plurality of antennas 520 may each correspond to, for example, a plurality of frequency bands that the eNB 510 uses. Note that, although the example in which the eNB 510 has the plurality of antennas 520 is shown in FIG. 25, the eNB 510 may have a single antenna 520.

The base station device 530 includes a controller 531, a memory 532, a network interface 533, and a wireless communication interface 535.

The controller 531 may be, for example, a CPU or a DSP, and causes various functions of upper layers of the base station device 530 to be operated. For example, the controller 531 generates data packets from data included in signals processed by the wireless communication interface 535, and transfers the generated packets via the network interface 533. The controller 531 may bundle up data from a plurality of baseband processors to generate a bundled packet, and transfer the generated bundled packet. In addition, the controller 531 may have a logical function to execute control such as radio resource control, radio bearer control, mobility management, admission control, or scheduling. In addition, the control may be executed in association with a peripheral eNB or a core network node. The memory 532 includes a RAM and a ROM, and stores a program executed by the controller 531 and various kinds of control data (for example, a list of terminals, transmission power data, scheduling data, etc.).

The network interface 533 is a communication interface for connecting the base station device 530 to a core network 534. The controller 531 may communicate with a core network node or another eNB via the network interface 533. In this case, the eNB 510 and the core network node or the other eNB may be connected to each other using a logical interface (for example, an S1 interface or an X2 interface). The network interface 533 may be a wired communication interface, or a wireless communication interface for wireless backhaul. When the network interface 533 is a wireless communication interface, the network interface 533 may use a frequency band higher than the frequency band used by the wireless communication interface 535 in wireless communication.

The wireless communication interface 535 supports either cellular communication scheme of Long Term Evolution (LTE) and LTE-Advanced, and provides wireless connection to a terminal positioned within the cell of the eNB 510 via the antennas 520. The wireless communication interface 535 can typically include baseband (BB) processors 536, RF circuits 537, and the like. The BB processors 536 may perform, for example, encoding/decoding, modulation/demodulation, multiplexing/demultiplexing, and the like, and execute various kinds of signal processing of each layer (for example, L1, Medium Access Control (MAC), Radio Link Control (RLC) and Packet Data Convergence Protocol (PDCP)). The BB processors 536 may have some or all of the logical functions described above on behalf of the controller 531. The BB processors 536 may be a module that includes a memory which stores a communication control program, a processor which executes the program, and a relevant circuit, and the function of the BB processors 536 may be set to be changeable by updating the program. In addition, the module may be a card or a blade to be inserted into a slot of the base station device 530, or may be a chip mounted on the card or the blade. Meanwhile, the RF circuits 537 may include a mixer, a filter, an amplifier, and the like, and transmit and receive radio signals via the antennas 520.

The wireless communication interface 535 may include a plurality of BB processors 536 as shown in FIG. 25, and the plurality of BB processors 536 may each correspond to, for example, a plurality of frequency bands used by the eNB 510. In addition, the wireless communication interface 535 may include a plurality of RF circuits 537 as shown in FIG. 25, and the plurality of RF circuits 537 may each correspond to, for example, the plurality of antenna elements. Note that, although the example in which the wireless communication interface 535 includes the plurality of BB processors 536 and the plurality of RF circuits 537 is shown in FIG. 25, the wireless communication interface 535 may include a single BB processor 536 or a single RF circuit 537.

Third Application Example

Figure 26:
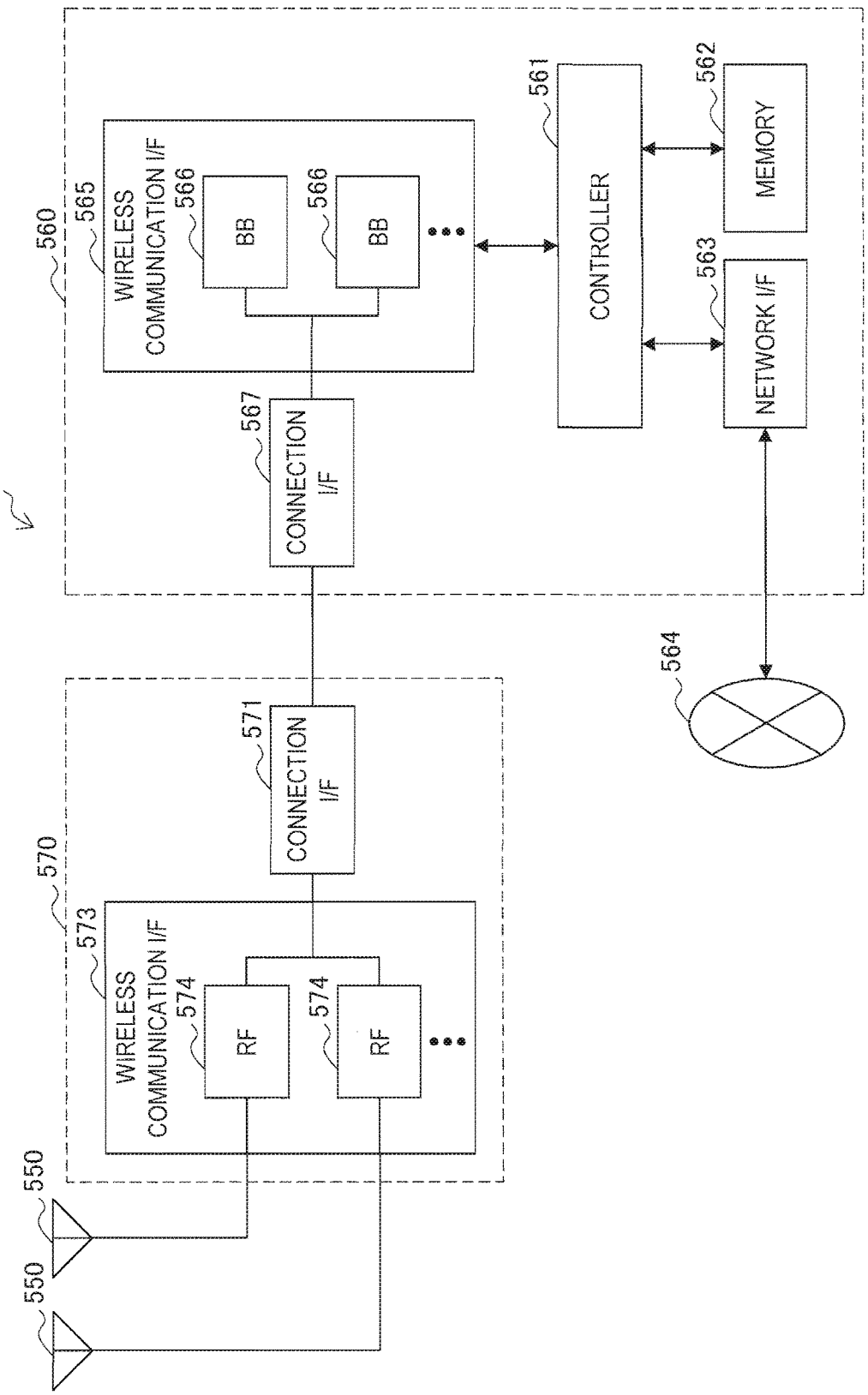
FIG. 26 is a block diagram showing a second example of a schematic configuration of an eNB to which the technology according to the present disclosure can be applied.

FIG. 26 is a block diagram showing a second example of a schematic configuration of an eNB to which the technology according to the present disclosure can be applied. The eNB 540 has one or more antennas 550, a base station device 560, and an RRH 570. Each of the antennas 550 and the RRH 570 can be connected to each other via RF cables. In addition, the base station device 560 and the RRH 570 can be connected to each other using a high-speed line such as an optical fiber cable.

Each of the antennas 550 has a single or a plurality of antenna elements (for example, a plurality of antenna elements constituting a MIMO antenna), and is used for transmission and reception of radio signals by the RRH 570. The eNB 540 may have a plurality of antennas 550 as shown in FIG. 26, and the plurality of antennas 550 may each correspond to, for example, a plurality of frequency bands that the eNB 540 uses. Note that, although the example in which the eNB 540 has the plurality of antennas 550 is shown in FIG. 26, the eNB 540 may have a single antenna 550.

The base station device 560 includes a controller 561, a memory 562, a network interface 563, a wireless communication interface 565, and a connection interface 567. The controller 561, the memory 562, and the network interface 563 are the same as the controller 531, the memory 532, and the network interface 533 described with reference to FIG. 25.

The wireless communication interface 565 supports either cellular communication scheme of LTE and LTE-Advanced, and provides wireless connection to a terminal positioned within the sector of the RRH 570 via the RRH 570 and the antennas 550. The wireless communication interface 565 can typically include BB processors 566 and the like. The BB processors 566 are the same as the BB processors 536 described with reference to FIG. 25 except that the processors are connected to RF circuits 574 of the RRH 570 via the connection interface 567. The wireless communication interface 565 may include a plurality of BB processors 566 as shown in FIG. 26, and the plurality of BB processors 566 may each correspond to, for example, a plurality of frequency bands used by the eNB 540. Note that, although the example in which the wireless communication interface 565 includes the plurality of BB processors 566 is shown in FIG. 26, the wireless communication interface 565 may include a single BB processor 566.

The connection interface 567 is an interface for connecting the base station device 560 (wireless communication interface 565) to the RRH 570. The connection interface 567 may be a communication module for communication on the high-speed line connecting the base station device 560 (wireless communication interface 565) and the RRH 570.

In addition, the RRH 570 includes a connection interface 571 and a wireless communication interface 573.

The connection interface 571 is an interface for connecting the RRH 570 (wireless communication interface 573) to the base station device 560. The connection interface 571 may be a communication module for communication on the high-speed line.

The wireless communication interface 573 transmits and receives radio signals via the antennas 550. The wireless communication interface 573 can typically include the RF circuits 574 and the like. The RF circuits 574 may include a mixer, a filter, an amplifier, and the like, and transmit and receive radio signals via the antennas 550. The wireless communication interface 573 may include a plurality of RF circuits 574 as shown in FIG. 26, and the plurality of RF circuits 574 may each correspond to, for example, a plurality of antenna elements. Note that, although the example in which the wireless communication interface 573 includes the plurality of RF circuits 574 is shown in FIG. 26, the wireless communication interface 573 may include a single RF circuit 574.

The determination result acquisition unit 133 and the switch control unit 135 described with reference to FIG. 4 may be implemented by the controller 531 and the controller 561 of the eNB 510 and the eNB 540 shown in FIGS. 25 and 26. More specifically, for example, the determination result acquisition unit 133 and the switch control unit 135 may be implemented by the memory 532 which stores a program executed by the controller 531 and the controller 531, or may be implemented by the memory 562 which stores a program executed by the controller 561 and the controller 561. In addition, at least some of the functions may be implemented by the wireless communication interface 535 and the wireless communication interface 565 and/or the wireless communication interface 573.

Likewise, the determination unit 131 described with reference to FIG. 4 may also be implemented by the controller 531 and the controller 561. In addition, at least a part of the function may be implemented by the wireless communication interface 535 and the wireless communication interface 565 and/or the wireless communication interface 573.

6.2. Application Examples with Regard to a Communication Node of a Wireless Communication Network Next, application examples of the communication node 200 of the wireless communication network 40 will be described with reference to FIG. 27.

The communication node 200 according to the second embodiment (i.e., the communication node 200 of the wireless communication network 40) may be realized as, for example, a WLAN access point (which is also called a radio base station) with or without a router function. In addition, the communication node 200 may be realized as a mobile WLAN-router. Furthermore, the communication node 200 may be a wireless communication module mounted in such devices (for example, an integrated circuit module formed in one die).

In addition, the communication node 200 may be, for example, a control node other than a WLAN access point, or may be realized as any type of server such as a tower server, a rack server, or a blade server. In addition, the communication node 200 may be a control module mounted in a server (for example, an integrated circuit module formed in one die, or a card or a blade to be inserted into a slot of a blade server).

First Application Example

Figure 27:
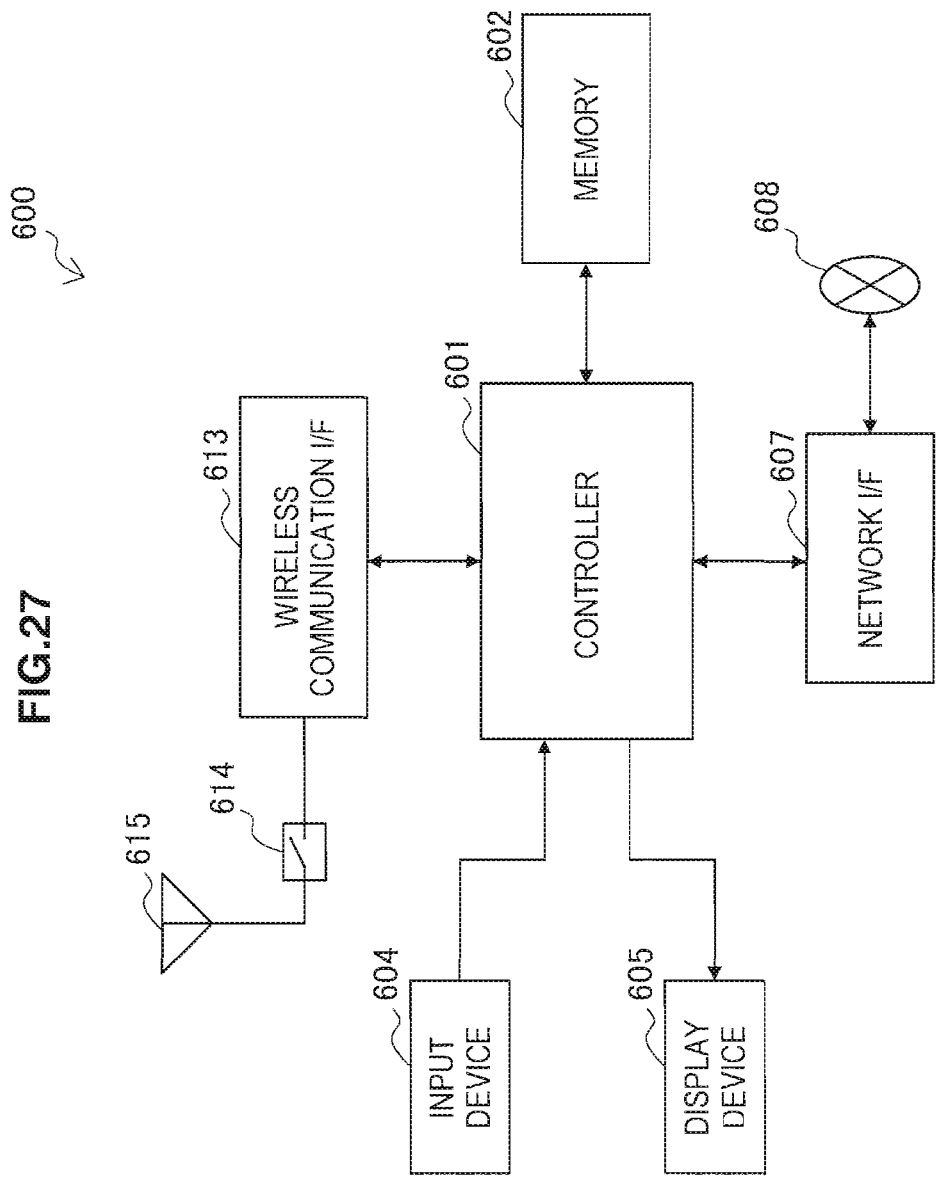
FIG. 27 is a block diagram showing an example of a schematic configuration of a wireless access point to which the technology according to the present disclosure can be applied.

FIG. 27 is a block diagram showing an example of a schematic configuration of a wireless access point 600 to which the technology according to the present disclosure can be applied. The wireless access point 600 includes a controller 601, a memory 602, an input device 604, a display device 605, a network interface 607, a wireless communication interface 613, an antenna switch 614, and an antenna 615.

The controller 601 may be, for example, a CPU or digital signal processor (DSP), and cause various functions of the Internet Protocol (IP) layer and an upper layer of the wireless access point 600 (for example, access restriction, routing, encryption, firewall and log management, and the like) to be operated. The memory 602 includes a RAM and a ROM and stores programs executed by the controller 601 and various kinds of control data (for example, a list of terminals, a routing table, an encryption key, a security setting, a log, and the like).

The input device 604 includes, for example, a button, a switch, or the like to receive operations from a user. The display device 605 includes an LED lamp or the like to display operation statuses of the wireless access point 600.

The network interface 607 is a wired communication interface for connecting the wireless access point 600 to a wired communication network 608. The network interface 607 may have a plurality of connection terminals. The wired communication network 608 may be a LAN such as Ethernet (registered trademark) or a wide area network (WAN).

The wireless communication interface 613 supports one or more of WLAN standards including IEEE 802.11a, 11b, 11g, 11n, 11ac, and 11ad, and provides wireless connection as an access point to a nearby terminal. The wireless communication interface 613 can typically include a baseband processor, an RF circuit, and a power amplifier. The wireless communication interface 613 may be a one-chip module in which a memory that stores a communication control program, a processor that executes the program, and a relevant circuit are integrated. The antenna switch 614 switches a connection destination of the antenna 615 among a plurality of circuits included in the wireless communication interface 613. The antenna 615 has a single or a plurality of antenna elements, and is used for transmission and reception of wireless signals by the wireless communication interface 613.

The determination result acquisition unit 233 and the switch control unit 235 described with reference to FIG. 10 may be implemented by the controller 601 of the wireless access point 600 shown in FIG. 27. More specifically, for example, the determination result acquisition unit 233 and the switch control unit 235 may be implemented by the memory 602 that stores a program executed by the controller 601 and the controller 601. The program may be an OS and/or application software. In addition, at least some of the functions may be implemented by the wireless communication interface 613.

Likewise, the determination unit 231 described with reference to FIG. 10 may also be implemented by the controller 601. In addition, at least a part of the function may be implemented by the wireless communication interface 613.

Second Application Example

The communication node 200 can be realized as, for example, the server 500 described with reference to FIG. 24. In this case, the determination result acquisition unit 233 and the switch control unit 235 described with reference to FIG. 10 may be implemented by the processor 501 of the server 500 shown in FIG. 24. More specifically, for example, the determination result acquisition unit 233 and the switch control unit 235 may be implemented by the memory 502 that stores a program executed by the processor 501 and the processor 501. The program may be an OS and/or application software.

Likewise, the determination unit 231 described with reference to FIG. 10 may also be implemented by the processor 501.

6.3. Application Examples with Regard to a Mobile Communication Terminal

Next, application examples of the mobile communication terminal 400 will be described with reference to FIGS. 28 and 29.

For example, the mobile communication terminal 400 according to the fourth embodiment can be realized as a mobile terminal such as a smartphone, a tablet personal computer (PC), or a portable/dongle-type mobile router, or an in-vehicle terminal such as a car navigation device. In addition, the mobile communication terminal 400 can be realized as a terminal that performs machine-to-machine (M2M) communication (which is also called a machine-type communication (MTC) terminal). Further, the mobile communication terminal 400 can be a wireless communication module (for example, an integrated circuit module formed in one die) mounted in such a terminal.

First Application Example

Figure 28:
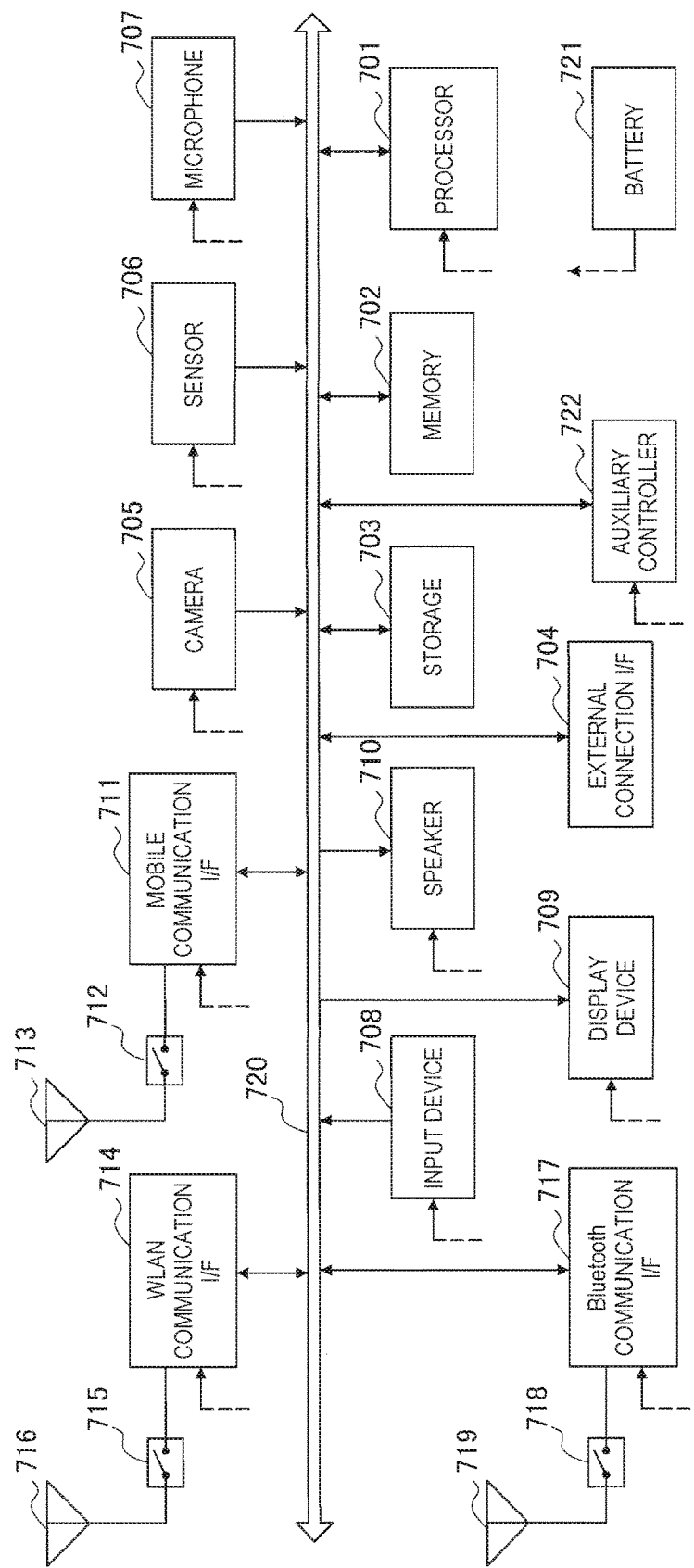
FIG. 28 is a block diagram showing an example of a schematic configuration of a smartphone to which the technology according to the present disclosure can be applied.

FIG. 28 is a block diagram showing an example of a schematic configuration of the smartphone 700 to which the technology according to the present disclosure can be applied. The smartphone 700 includes a processor 701, a memory 702, a storage 703, an external connection interface 704, a camera 705, a sensor 706, a microphone 707, an input device 708, a display device 709, a speaker 710, a mobile communication interface 711, an antenna switch 712, an antenna 713, a WLAN communication interface 714, an antenna switch 715, an antenna 716, a Bluetooth communication interface 717, an antenna switch 718, an antenna 719, a bus 720, a battery 721, and an auxiliary controller 722.

The processor 701 may be, for example, a CPU or a System on Chip (SoC), and controls functions of an application layer and another layer of the smartphone 700. The memory 702 includes a RAM and a ROM, and stores a program that is executed by the processor 701, and data. The storage 703 may include a storage medium such as a semiconductor memory and a hard disk. The external connection interface 704 is an interface for connecting an external device such as a memory card and a universal serial bus (USB) device to the smartphone 700.

The camera 705 includes an image sensor such as a charge coupled device (CCD) and a complementary metal oxide semiconductor (CMOS), and generates a captured image. The sensor 706 may include a group of sensors such as a measurement sensor, a gyro sensor, a geomagnetic sensor, and an acceleration sensor. The microphone 707 converts sounds that are input to the smartphone 700 to audio signals. The input device 708 includes, for example, a touch sensor configured to detect touch onto a screen of the display device 709, a keypad, a keyboard, a button, or a switch, and receives an operation or an information input from a user. The display device 709 includes a screen such as a liquid crystal display (LCD) and an organic light-emitting diode (OLED) display, and displays an output image of the smartphone 700. The speaker 710 converts audio signals that are output from the smartphone 700 to sounds.

The mobile communication interface 711 supports a cellular communication scheme of either LTE or LTE-Advanced to execute wireless communication. The mobile communication interface 711 can typically include a baseband (BB) processor, a radio frequency (RF) circuit, or the like. The BB processor may execute, for example, encoding/decoding, modulation/demodulation, multiplexing/demultiplexing, or the like to execute various kinds of signal processing for wireless communication. Meanwhile, the RF circuit may include a mixer, a filter, an amplifier, or the like to transmit and receive radio signals via the antenna 713. The mobile communication interface 711 may be a one-chip module in which a BB processor and an RF circuit are integrated. The mobile communication interface 711 may include a signal BB processor or a plurality of BB processors. In addition, the mobile communication interface 711 may include a signal RF circuit or a plurality of RF circuits. The antenna switch 712 switches connection destinations of the antenna 713 for a plurality of circuits included in the mobile communication interface 711. The antenna 713 has a single or a plurality of antenna elements (for example, a plurality of antenna elements constituting a multiple-input and multiple-output (MIMO) antenna) and is used by the mobile communication interface 711 to transmit and receive radio signals.

The WLAN communication interface 714 supports one or more WLAN standards such as IEEE 802.11a, 11b, 11g, 11n, 11ac, and 11ad to execute wireless communication. The WLAN communication interface 714 can communicate with another device via a WLAN access point in an infrastructure mode. In addition, the WLAN communication interface 714 can communicate directly with another device in an ad hoc mode. The WLAN communication interface 714 can typically include a BB processor and an RF circuit. The WLAN communication interface 714 may be a one-chip module in which a memory that stores a communication control program, a processor that executes the program, and a relevant circuit are integrated. The antenna switch 715 switches connection destinations of the antenna 716 for a plurality of circuits included in the WLAN communication interface 714. The antenna 716 has a single or a plurality of antenna elements (for example, a plurality of antenna elements constituting a MIMO antenna), and is used by the WLAN communication interface 714 to transmit and receive radio signals.

The Bluetooth communication interface 717 supports one or more Bluetooth standards to execute wireless communication. The Bluetooth communication interface 717 can communicate directly with another device. The Bluetooth communication interface 717 can typically include a BB processor, an RF circuit, and the like. The Bluetooth communication interface 717 may be a one-chip module in which a memory that stores a communication control program, a processor that executes the program, and a relevant circuit are integrated. The antenna switch 718 switches connection destinations of the antenna 719 for a plurality of circuits included in the Bluetooth communication interface 717. The antenna 719 has a single or a plurality of antenna elements, and is used by the Bluetooth communication interface 717 to transmit and receive radio signals.

As shown in FIG. 28, the smartphone 700 may have antennas that correspond to each of the mobile communication interface 711, the WLAN communication interface 714, and the Bluetooth communication interface 717. Note that the configuration is not limited to the example of FIG. 28, and the smartphone 700 may have an antenna shared by two or more of the mobile communication interface 711, the WLAN communication interface 714, and the Bluetooth communication interface 717. As an example, the smartphone 700 may have an antenna and antenna switch shared by the WLAN communication interface 714 and the Bluetooth communication interface 717 instead of including the antenna switch 715 and the antenna 716, and the antenna switch 718 and the antenna 719. In addition, the shared antenna may be connected to either of the WLAN communication interface 714 and the Bluetooth communication interface 717 using the antenna switch.

In addition, the smartphone 700 may have the mobile communication interface 711, the WLAN communication interface 714, and the Bluetooth communication interface 717 as separate modules as shown in FIG. 28. Note that the configuration is not limited to the example of FIG. 28, and the smartphone 700 may have a one-chip module that includes two or more of the mobile communication interface 711, the WLAN communication interface 714, and the Bluetooth communication interface 717. In this case, the smartphone 700 may include an antenna and antenna switch shared between the communication interfaces, or may include antennas corresponding to each of the communication interfaces.

Note that the antenna switch 712, the antenna switch 715, and the antenna switch 718 may be omitted from the configuration of the smartphone 700.

The bus 720 connects the processor 701, the memory 702, the storage 703, the external connection interface 704, the camera 705, the sensor 706, the microphone 707, the input device 708, the display device 709, the speaker 710, the mobile communication interface 711, the WLAN communication interface 714, the Bluetooth communication interface 717, and the auxiliary controller 722 to each other. The battery 721 supplies power to blocks of the smartphone 700 illustrated in FIG. 28 via feeder lines, which are partially shown as dashed lines in the drawing. The auxiliary controller 722 operates a minimum necessary function of the smartphone 700, for example, in a sleep mode.

The determination result acquisition unit 453 and the switch control unit 455 described with reference to FIG. 21 may be implemented by the processor 701 and/or the auxiliary controller 722 of the smartphone 700 shown in FIG. 28. More specifically, for example, the determination result acquisition unit 453 and the switch control unit 455 may be implemented by the memory 702 that stores a program executed by the processor 701 and the processor 701, and/or by the auxiliary controller 722. The program may be an OS, a device driver, and/or application software. In addition, at least some of the functions may be implemented by the mobile communication interface 711, the WLAN communication interface 714, and/or the Bluetooth communication interface 717.

Likewise, the determination unit 451 described with reference to FIG. 21 may also be implemented by the processor 701 and/or the auxiliary controller 722. In addition, at least a part of the function may be implemented by the mobile communication interface 711, the WLAN communication interface 714, and/or the Bluetooth communication interface 717.

Second Application Example

Figure 29:
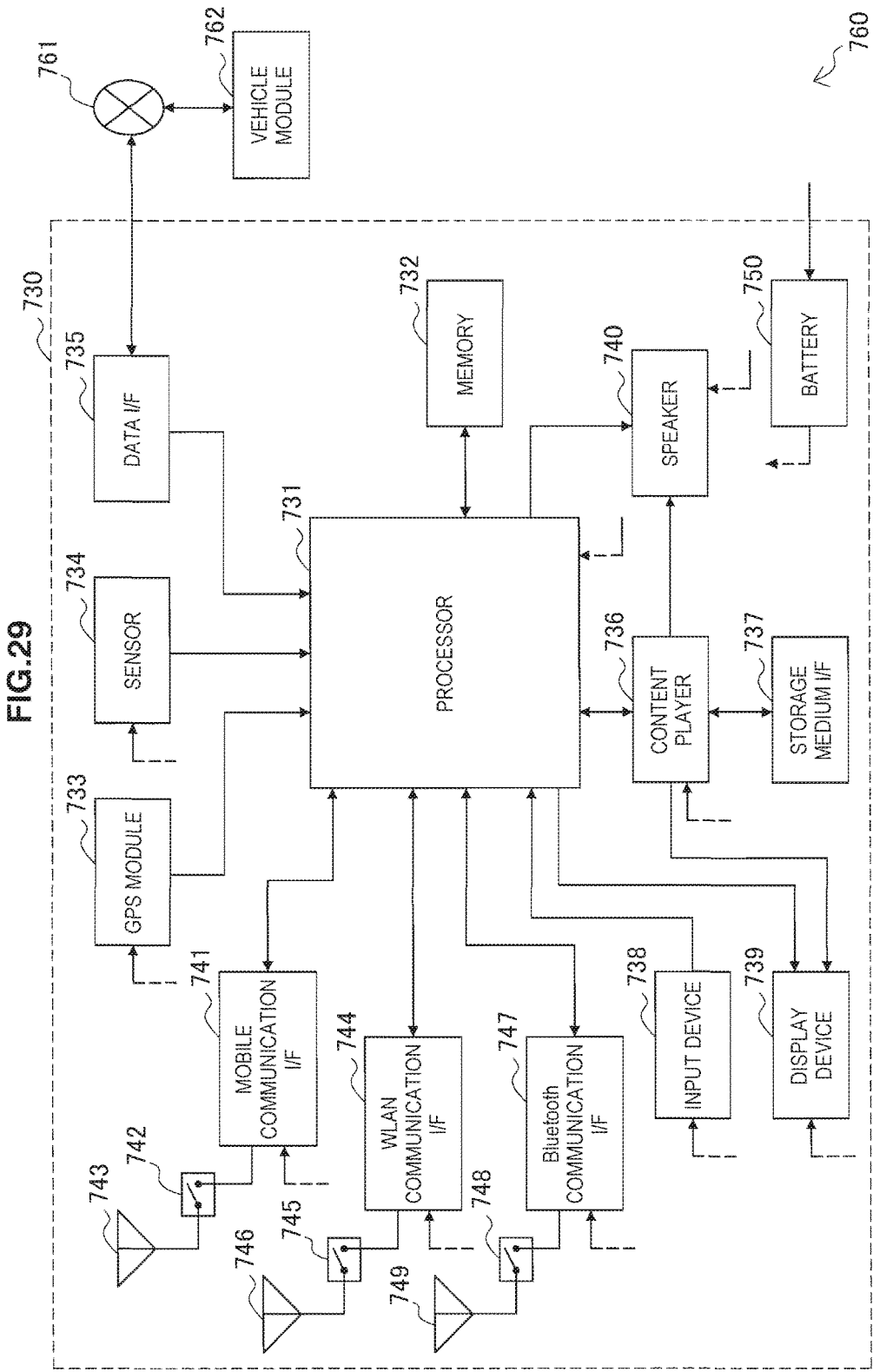
FIG. 29 is a block diagram showing an example of a schematic configuration of a car navigation device to which the technology according to the present disclosure can be applied.

FIG. 29 is a block diagram showing an example of a schematic configuration of the car navigation device 730 to which the technology according to the present disclosure can be applied. The car navigation device 730 includes a processor 731, a memory 732, a Global Positioning System (GPS) module 733, a sensor 734, a data interface 735, a content player 736, a storage medium interface 737, an input device 738, a display device 739, a speaker 740, a mobile communication interface 741, an antenna switch 742, an antenna 743, a WLAN communication interface 744, an antenna switch 745, an antenna 746, a Bluetooth communication interface 747, an antenna switch 748, an antenna 749, and a battery 750.

The processor 731 may be, for example, a CPU or a SoC, and controls a navigation function and another function of the car navigation device 730. The memory 732 includes a RAM and a ROM, and stores a program that is executed by the processor 731, and data.

The GPS module 733 uses GPS signals received from a GPS satellite to measure a position (for example, latitude, longitude, and altitude) of the car navigation device 730. The sensor 734 may include a group of sensors such as a gyro sensor, a geomagnetic sensor, and an air pressure sensor. The data interface 735 is connected to, for example, an in-vehicle network 761 via a terminal that is not shown, and acquires data generated by the vehicle, such as vehicle speed data.

The content player 736 reproduces content stored in a storage medium (such as a CD and a DVD) that is inserted into the storage medium interface 737. The input device 738 includes, for example, a touch sensor configured to detect touch onto a screen of the display device 739, a button, or a switch, and receives an operation or an information input from a user. The display device 739 includes a screen such as a LCD or an OLED display, and displays an image of the navigation function or content that is reproduced. The speaker 740 outputs sounds of the navigation function or the content that is reproduced.

The mobile communication interface 741 supports a cellular communication scheme of either LTE or LTE-Advanced to execute wireless communication. The mobile communication interface 741 can typically include a BB processor, a RF circuit, or the like. The BB processor may execute, for example, encoding/decoding, modulation/demodulation, multiplexing/demultiplexing, or the like to execute various kinds of signal processing for wireless communication. Meanwhile, the RF circuit may include a mixer, a filter, an amplifier, or the like to transmit and receive radio signals via the antenna 743. The mobile communication interface 741 may be a one-chip module in which a BB processor and an RF circuit are integrated. The mobile communication interface 741 may include a signal BB processor or a plurality of BB processors. In addition, the mobile communication interface 741 may include a signal RF circuit or a plurality of RF circuits. The antenna switch 742 switches connection destinations of the antenna 743 for a plurality of circuits included in the mobile communication interface 741. The antenna 743 has a single or a plurality of antenna elements (for example, a plurality of antenna elements constituting a MIMO antenna) and is used by the mobile communication interface 741 to transmit and receive radio signals.

The WLAN communication interface 744 supports one or more WLAN standards such as IEEE 802.11a, 11 b, 11g, 11n, 11ac, and 11ad to execute wireless communication. The WLAN communication interface 744 can communicate with another device via a WLAN access point in an infrastructure mode. In addition, the WLAN communication interface 744 can communicate directly with another device in an ad hoc mode. The WLAN communication interface 744 can typically include a BB processor and an RF circuit. The WLAN communication interface 744 may be a one-chip module in which a memory that stores a communication control program, a processor that executes the program, and a relevant circuit are integrated. The antenna switch 745 switches connection destinations of the antenna 746 for a plurality of circuits included in the WLAN communication interface 744. The antenna 746 has a single or a plurality of antenna elements (for example, a plurality of antenna elements constituting a MIMO antenna), and is used by the WLAN communication interface 744 to transmit and receive radio signals.

The Bluetooth communication interface 747 supports one or more Bluetooth standards to execute wireless communication. The Bluetooth communication interface 747 can communicate directly with another device. The Bluetooth communication interface 747 can typically include a BB processor, an RF circuit, and the like. The Bluetooth communication interface 747 may be a one-chip module in which a memory that stores a communication control program, a processor that executes the program, and a relevant circuit are integrated. The antenna switch 748 switches connection destinations of the antenna 749 for a plurality of circuits included in the Bluetooth communication interface 747. The antenna 749 has a single or a plurality of antenna elements, and is used by the Bluetooth communication interface 747 to transmit and receive radio signals.

As shown in FIG. 29, the car navigation device 730 may have antennas that correspond to each of the mobile communication interface 741, the WLAN communication interface 744, and the Bluetooth communication interface 747. Note that the configuration is not limited to the example of FIG. 29, and the car navigation device 730 may have an antenna shared by two or more of the mobile communication interface 741, the WLAN communication interface 744, and the Bluetooth communication interface 747. As an example, the car navigation device 730 may have an antenna and antenna switch shared by the WLAN communication interface 744 and the Bluetooth communication interface 747 instead of including the antenna switch 745 and the antenna 746, and the antenna switch 748 and the antenna 749. In addition, the shared antenna may be connected to either of the WLAN communication interface 744 and the Bluetooth communication interface 747 using the antenna switch.

In addition, the car navigation device 730 may have the mobile communication interface 741, the WLAN communication interface 744, and the Bluetooth communication interface 747 as separate modules as shown in FIG. 29. Note that the configuration is not limited to the example of FIG. 29, and the car navigation device 730 may have a one-chip module that includes two or more of the mobile communication interface 741, the WLAN communication interface 744, and the Bluetooth communication interface 747. In this case, the car navigation device 730 may include an antenna and antenna switch shared between the communication interfaces, or may include antennas corresponding to each of the communication interfaces.

Note that the antenna switch 742, the antenna switch 745, and the antenna switch 748 may be omitted from the configuration of the car navigation device 730.

The battery 750 supplies power to blocks of the car navigation device 730 shown in FIG. 29 via feeder lines that are partially shown as dashed lines in the drawing. The battery 750 accumulates power supplied form the vehicle.

The determination result acquisition unit 453 and the switch control unit 455 described with reference to FIG. 21 may be implemented by the processor 731 of the car navigation device 730 shown in FIG. 29. More specifically, for example, the determination result acquisition unit 453 and the switch control unit 455 may be implemented by the memory 732 that stores a program executed by the processor 731 and the processor 731. The program may be an OS, a device driver, and/or application software. In addition, at least some of the functions may be implemented by the mobile communication interface 741, the WLAN communication interface 744, and/or the Bluetooth communication interface 747.

Likewise, the determination unit 451 described with reference to FIG. 21 may also be implemented by the processor 731. In addition, at least a part of the function may be implemented by the mobile communication interface 741, the WLAN communication interface 744, and/or the Bluetooth communication interface 747.

In addition, the technology of the present disclosure may also be realized as an in-vehicle system (or a vehicle) 760 including one or more blocks of the car navigation device 730, the in-vehicle network 761, and a vehicle module 762. The vehicle module 762 generates vehicle data such as vehicle speed, engine speed, and trouble information, and outputs the generated data to the in-vehicle network 761.

6.4. Application Examples with Regard to a Wireless Communication Terminal

Next, application examples of the wireless communication terminal 300 will be described with reference to FIGS. 30 and 31.

The wireless communication terminal 300 may be realized as, for example, a mobile terminal such as a tablet PC, a notebook PC, a portable game terminal, or a digital camera, a fixed-type terminal such as a television receiver set, a printer, a digital scanner, or a network storage, or an in-vehicle terminal such as a car navigation device. In addition, the wireless communication terminal 300 may be realized as a terminal that performs M2M communication (which is also called an MTC) such as a smart meter, a vending machine, a remote monitoring device, or a point-of-sale (POS) terminal. Further, the wireless communication terminal 300 may be a wireless communication module (for example, an integrated circuit module formed in one die) mounted in such a terminal.

First Application Example

Figure 30:
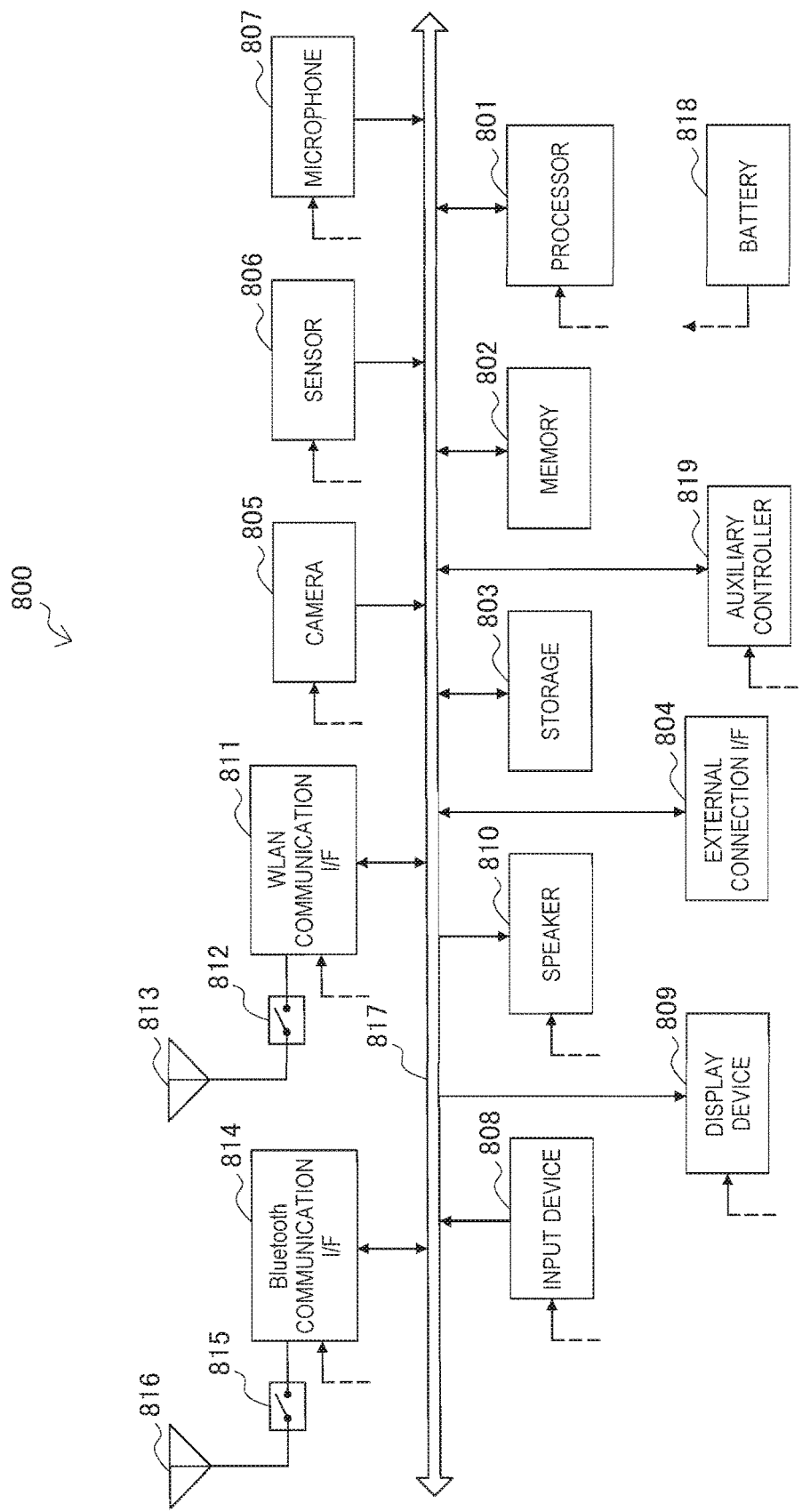
FIG. 30 is a block diagram showing an example of a schematic configuration of a tablet terminal to which the technology according to the present disclosure can be applied.

FIG. 30 is a block diagram showing an example of a schematic configuration of the tablet terminal 800 to which the technology according to the present disclosure can be applied. The tablet terminal 800 includes a processor 801, a memory 802, a storage 803, an external connection interface 804, a camera 805, a sensor 806, a microphone 807, an input device 808, a display device 809, a speaker 810, a WLAN communication interface 811, an antenna switch 812, an antenna 813, a Bluetooth communication interface 814, an antenna switch 815, an antenna 816, a bus 817, a battery 818, and an auxiliary controller 819.

The processor 801 may be, for example, a CPU or a SoC, and controls functions of an application layer and another layer of the tablet terminal 800. The memory 802 includes a RAM and a ROM, and stores a program that is executed by the processor 801, and data. The storage 803 may include a storage medium such as a semiconductor memory and a hard disk. The external connection interface 804 is an interface for connecting an external device such as a memory card and a USB device to the tablet terminal 800.

The camera 805 includes an image sensor such as a CCD and a CMOS, and generates a captured image. The sensor 806 may include a group of sensors such as a measurement sensor, a gyro sensor, a geomagnetic sensor, and an acceleration sensor. The microphone 807 converts sounds that are input to the tablet terminal 800 to audio signals. The input device 808 includes, for example, a touch sensor configured to detect touch onto a screen of the display device 809, a keypad, a keyboard, a button, or a switch, and receives an operation or an information input from a user. The display device 809 includes a screen such as a liquid crystal display (LCD) and an organic light-emitting diode (OLED) display, and displays an output image of the tablet terminal 800. The speaker 810 converts audio signals that are output from the tablet terminal 800 to sounds.

The WLAN communication interface 811 supports one or more WLAN standards such as IEEE 802.11a, 11b, 11g, 11n, 11ac, and 11ad to execute wireless communication. The WLAN communication interface 811 can communicate with another device via a WLAN access point in an infrastructure mode. In addition, the WLAN communication interface 811 can communicate directly with another device in an ad hoc mode. The WLAN communication interface 811 can typically include a BB processor and an RF circuit. The WLAN communication interface 811 may be a one-chip module in which a memory that stores a communication control program, a processor that executes the program, and a relevant circuit are integrated. The antenna switch 812 switches connection destinations of the antenna 813 for a plurality of circuits included in the WLAN communication interface 811. The antenna 813 has a single or a plurality of antenna elements (for example, a plurality of antenna elements constituting a MIMO antenna), and is used by the WLAN communication interface 811 to transmit and receive radio signals.

The Bluetooth communication interface 814 supports one or more Bluetooth standards to execute wireless communication. The Bluetooth communication interface 814 can communicate directly with another device. The Bluetooth communication interface 814 can typically include a BB processor, an RF circuit, and the like. The Bluetooth communication interface 814 may be a one-chip module in which a memory that stores a communication control program, a processor that executes the program, and a relevant circuit are integrated. The antenna switch 815 switches connection destinations of the antenna 816 for a plurality of circuits included in the Bluetooth communication interface 814. The antenna 816 has a single or a plurality of antenna elements, and is used by the Bluetooth communication interface 814 to transmit and receive radio signals.

As shown in FIG. 30, the tablet terminal 800 may have antennas that correspond to each of the WLAN communication interface 811, and the Bluetooth communication interface 814. Note that the configuration is not limited to the example of FIG. 30, and the tablet terminal 800 may have an antenna shared by the WLAN communication interface 811, and the Bluetooth communication interface 814. Specifically, the tablet terminal 800 may have an antenna and antenna switch shared by the WLAN communication interface 811 and the Bluetooth communication interface 814 instead of including the antenna switch 812 and the antenna 813, and the antenna switch 815 and the antenna 816. In addition, the shared antenna may be connected to either of the WLAN communication interface 811 and the Bluetooth communication interface 814 using the antenna switch.

In addition, the tablet terminal 800 may have the WLAN communication interface 811, and the Bluetooth communication interface 814 as separate modules as shown in FIG. 30. Note that the configuration is not limited to the example of FIG. 30, and the tablet terminal 800 may have a one-chip module that includes the WLAN communication interface 811, and the Bluetooth communication interface 814. In this case, the tablet terminal 800 may include an antenna and antenna switch shared between the communication interfaces, or may include antennas corresponding to each of the communication interfaces.

Note that the antenna switch 812, the antenna switch 815, and the antenna switch 718 may be omitted from the configuration of the tablet terminal 800.

The bus 820 connects the processor 801, the memory 802, the storage 803, the external connection interface 804, the camera 805, the sensor 806, the microphone 807, the input device 808, the display device 809, the speaker 810, the WLAN communication interface 811, the Bluetooth communication interface 814, and the auxiliary controller 819 to each other. The battery 818 supplies power to blocks of the tablet terminal 800 illustrated in FIG. 30 via feeder lines, which are partially shown as dashed lines in the drawing. The auxiliary controller 819 operates a minimum necessary function of the tablet terminal 800, for example, in a sleep mode.

The determination result acquisition unit 343 and the switch control unit 345 described with reference to FIG. 15 may be implemented by the processor 801 and/or the auxiliary controller 819 of the tablet terminal 800 shown in FIG. 30. More specifically, for example, the determination result acquisition unit 343 and the switch control unit 345 may be implemented by the memory 802 that stores a program executed by the processor 801 and the processor 801, and/or by the auxiliary controller 819. The program may be an OS, a device driver, and/or application software. In addition, at least some of the functions may be implemented by the WLAN communication interface 811, and/or the Bluetooth communication interface 814.

Likewise, the determination unit 341 described with reference to FIG. 15 may also be implemented by the processor 801 and/or the auxiliary controller 819. In addition, at least a part of the function may be implemented by the WLAN communication interface 811, and/or the Bluetooth communication interface 814.

Note that the tablet terminal 800 may operate as a wireless access point (software AP) as the processor 801 executes an access point function at an application level. In addition, the WLAN communication interface 811 may have a wireless access point function.

Second Application Example

Figure 31:
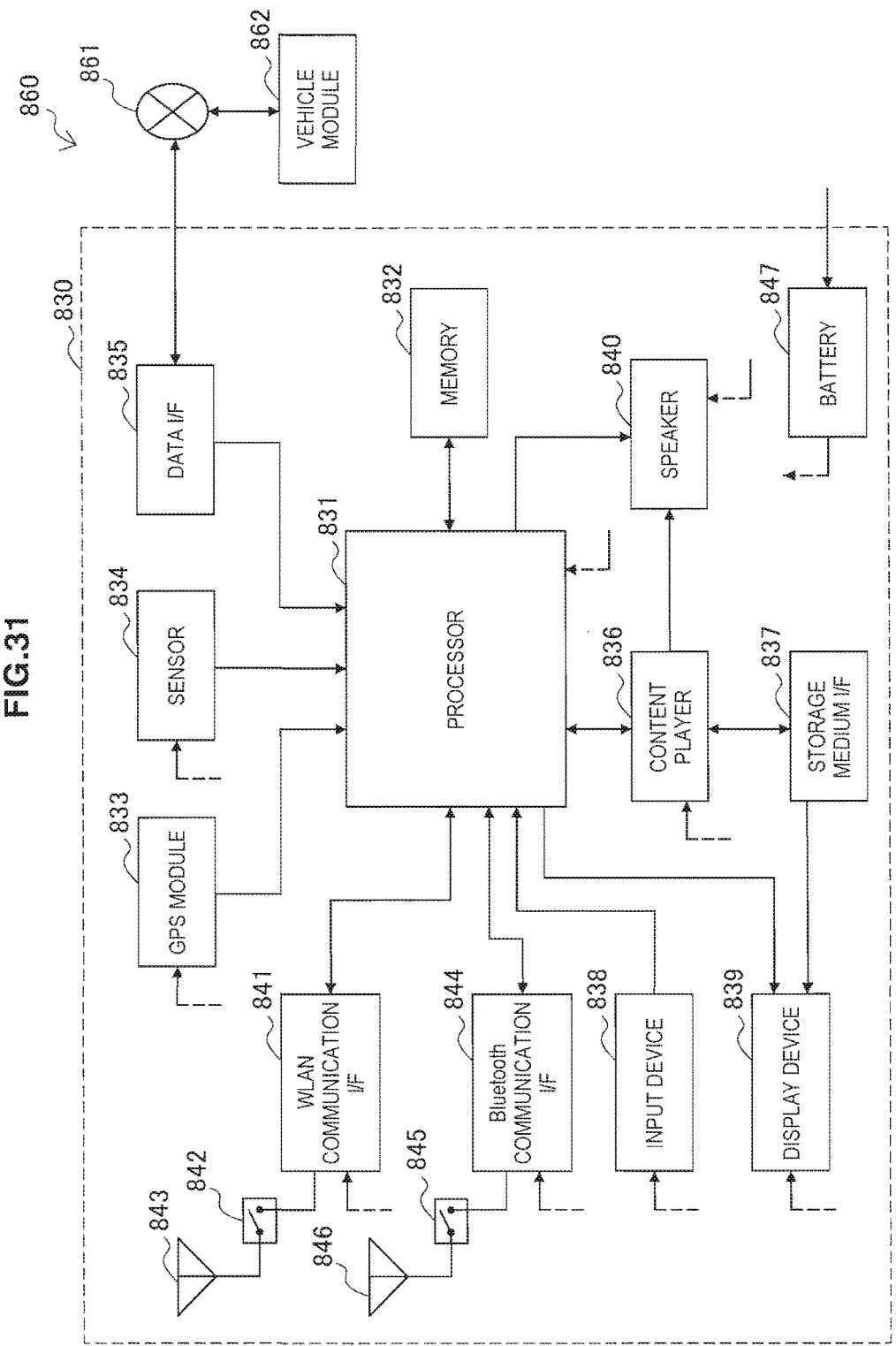
FIG. 31 is a block diagram showing an example of a schematic configuration of another car navigation device to which the technology according to the present disclosure can be applied.

FIG. 31 is a block diagram showing an example of a schematic configuration of the car navigation device 830 to which the technology of the present disclosure can be applied. The car navigation device 830 includes a processor 831, a memory 832, a GPS module 833, a sensor 834, a data interface 835, a content player 836, a storage medium interface 837, an input device 838, a display device 839, a speaker 840, a WLAN communication interface 841, an antenna switch 842, an antenna 843, a Bluetooth communication interface 844, an antenna switch 845, an antenna 846 and a battery 847.

The processor 831 may be, for example, a CPU or a SoC, and controls a navigation function and another function of the car navigation device 730. The memory 832 includes a RAM and a ROM, and stores a program that is executed by the processor 831, and data.

The GPS module 833 uses GPS signals received from a GPS satellite to measure a position (for example, latitude, longitude, and altitude) of the car navigation device 830. The sensor 834 may include a group of sensors such as a gyro sensor, a geomagnetic sensor, and an air pressure sensor. The data interface 835 is connected to, for example, an in-vehicle network 861 via a terminal that is not shown, and acquires data generated by the vehicle, such as vehicle speed data.

The content player 836 reproduces content stored in a storage medium (such as a CD and a DVD) that is inserted into the storage medium interface 837. The input device 838 includes, for example, a touch sensor configured to detect touch onto a screen of the display device 839, a button, or a switch, and receives an operation or an information input from a user. The display device 839 includes a screen such as a LCD or an OLED display, and displays an image of the navigation function or content that is reproduced. The speaker 840 outputs sounds of the navigation function or the content that is reproduced.

The WLAN communication interface 841 supports one or more WLAN standards such as IEEE 802.11a, 11b, 11g, 11n, 11ac, and 11ad to execute wireless communication. The WLAN communication interface 841 can communicate with another device via a WLAN access point in an infrastructure mode. In addition, the WLAN communication interface 841 can communicate directly with another device in an ad hoc mode. The WLAN communication interface 841 can typically include a BB processor and an RF circuit. The WLAN communication interface 841 may be a one-chip module in which a memory that stores a communication control program, a processor that executes the program, and a relevant circuit are integrated. The antenna switch 842 switches connection destinations of the antenna 843 for a plurality of circuits included in the WLAN communication interface 841. The antenna 843 has a single or a plurality of antenna elements (for example, a plurality of antenna elements constituting a MIMO antenna), and is used by the WLAN communication interface 811 to transmit and receive radio signals.

The Bluetooth communication interface 844 supports one or more Bluetooth standards to execute wireless communication. The Bluetooth communication interface 844 can communicate directly with another device. The Bluetooth communication interface 844 can typically include a BB processor, an RF circuit, and the like. The Bluetooth communication interface 844 may be a one-chip module in which a memory that stores a communication control program, a processor that executes the program, and a relevant circuit are integrated. The antenna switch 845 switches connection destinations of the antenna 846 for a plurality of circuits included in the Bluetooth communication interface 844. The antenna 846 has a single or a plurality of antenna elements, and is used by the Bluetooth communication interface 844 to transmit and receive radio signals.

As shown in FIG. 31, the tablet terminal 800 may have antennas that correspond to each of the WLAN communication interface 841, and the Bluetooth communication interface 844. Note that the configuration is not limited to the example of FIG. 31, and the car navigation device 830 may have an antenna shared by the WLAN communication interface 841, and the Bluetooth communication interface 844. Specifically, the car navigation device 830 may have an antenna and antenna switch shared by the WLAN communication interface 841 and the Bluetooth communication interface 844 instead of including the antenna switch 842 and the antenna 843, and the antenna switch 845 and the antenna 846. In addition, the shared antenna may be connected to either of the WLAN communication interface 841 and the Bluetooth communication interface 844 using the antenna switch.

In addition, the car navigation device 830 may have the WLAN communication interface 841, and the Bluetooth communication interface 844 as separate modules as shown in FIG. 31. Note that the configuration is not limited to the example of FIG. 31, and the car navigation device 830 may have a one-chip module that includes the WLAN communication interface 841, and the Bluetooth communication interface 844. In this case, the car navigation device 830 may include an antenna and antenna switch shared between the communication interfaces, or may include antennas corresponding to each of the communication interfaces.

Note that the antenna switch 842, the antenna switch 845, and the antenna switch 748 may be omitted from the configuration of the car navigation device 830.

The battery 847 supplies power to blocks of the car navigation device 830 illustrated in FIG. 31 via feeder lines that are partially shown as dashed lines in the drawing. The battery 847 accumulates power supplied form the vehicle.

The determination result acquisition unit 343 and the switch control unit 345 described with reference to FIG. 15 may be implemented by the processor 831 of the car navigation device 830 shown in FIG. 31. More specifically, for example, the determination result acquisition unit 343 and the switch control unit 345 may be implemented by the memory 832 that stores a program executed by the processor 831 and the processor 831. The program may be an OS, a device driver, and/or application software. In addition, at least some of the functions may be implemented by the WLAN communication interface 841, and/or the Bluetooth communication interface 844.

Likewise, the determination unit 341 described with reference to FIG. 15 may also be implemented by the processor 831. In addition, at least a part of the function may be implemented by the WLAN communication interface 841, and/or the Bluetooth communication interface 844.

In addition, the technology of the present disclosure may also be realized as an in-vehicle system (or a vehicle) 860 including one or more blocks of the car navigation device 830, the in-vehicle network 861, and a vehicle module 862. The vehicle module 862 generates vehicle data such as vehicle speed, engine speed, and trouble information, and outputs the generated data to the in-vehicle network 861.

7. Reference Example

Next, a reference example of the present disclosure will be described with reference to FIGS. 32 to 38.

According to the reference example of the present disclosure, a mobile communication terminal decides a cycle of a power saving mode for communication performed in a wireless communication scheme that the mobile communication terminal and a wireless communication terminal support based on density information indicating density of service areas of a wireless communication network. Accordingly, for example, it is possible to promptly switch communication while power consumption of the mobile communication terminal is suppressed. More specifically, while the mobile communication terminal suppresses its power consumption, the wireless communication terminal can promptly switch communication to communication using tethering.

7.1. Configuration of a Communication System

Figure 32:
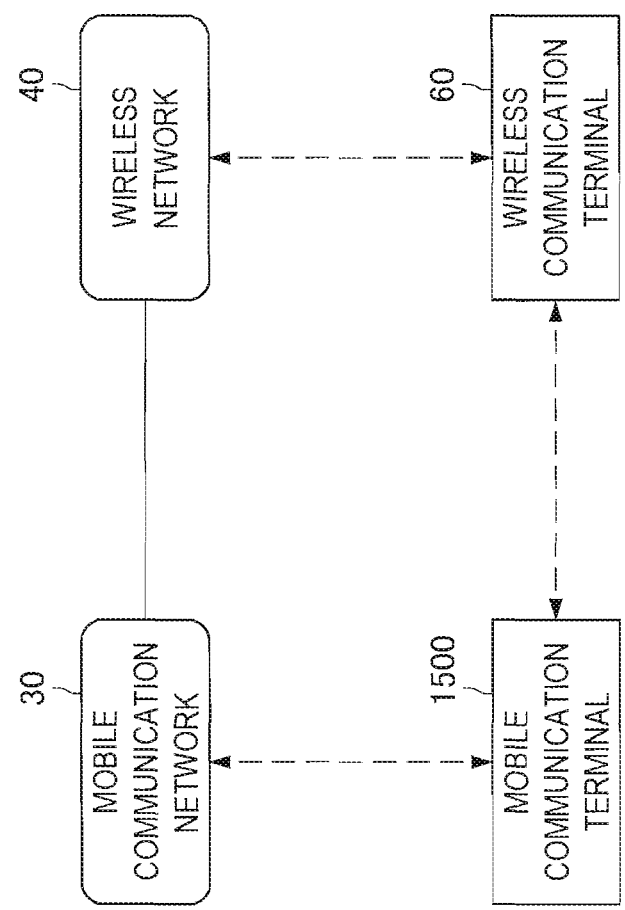
FIG. 32 is an explanatory diagram showing an example of a schematic configuration of a communication system according to a reference example of the present disclosure.

First, a schematic configuration of a communication system according to the reference example of the present disclosure will be described with reference to FIG. 32. FIG. 32 is an explanatory diagram showing an example of the schematic configuration of the communication system according to the reference example of the present disclosure.

Referring to FIG. 32, the communication system includes a mobile communication network 30, a wireless communication network 40, a mobile communication terminal 1500, and a wireless communication terminal 60.

Note that description with regard to the mobile communication network 30, the wireless communication network 40, and the wireless communication terminal 60 is the same as description of the elements of the first embodiment of the present disclosure. Thus, overlapping description will be omitted.

(Mobile Communication Terminal 1500)

The mobile communication terminal 1500 performs communication via a mobile communication network 30. In other words, the mobile communication terminal 1500 performs mobile communication in a service area of the mobile communication network 30. Specifically, when the mobile communication terminal 1500 is positioned within the cell of the mobile communication network 30, for example, the terminal communicates with a base station of the cell.

In addition, the mobile communication terminal 1500 supports the first wireless communication scheme (for example, a communication scheme for a WLAN) and communicates in the first wireless communication scheme.

In the reference example, in particular, the mobile communication terminal 1500 can promptly switch communication while suppressing power consumption of the mobile communication terminal 1500.

7.2. Configuration of a Mobile Communication Terminal

Figure 33:
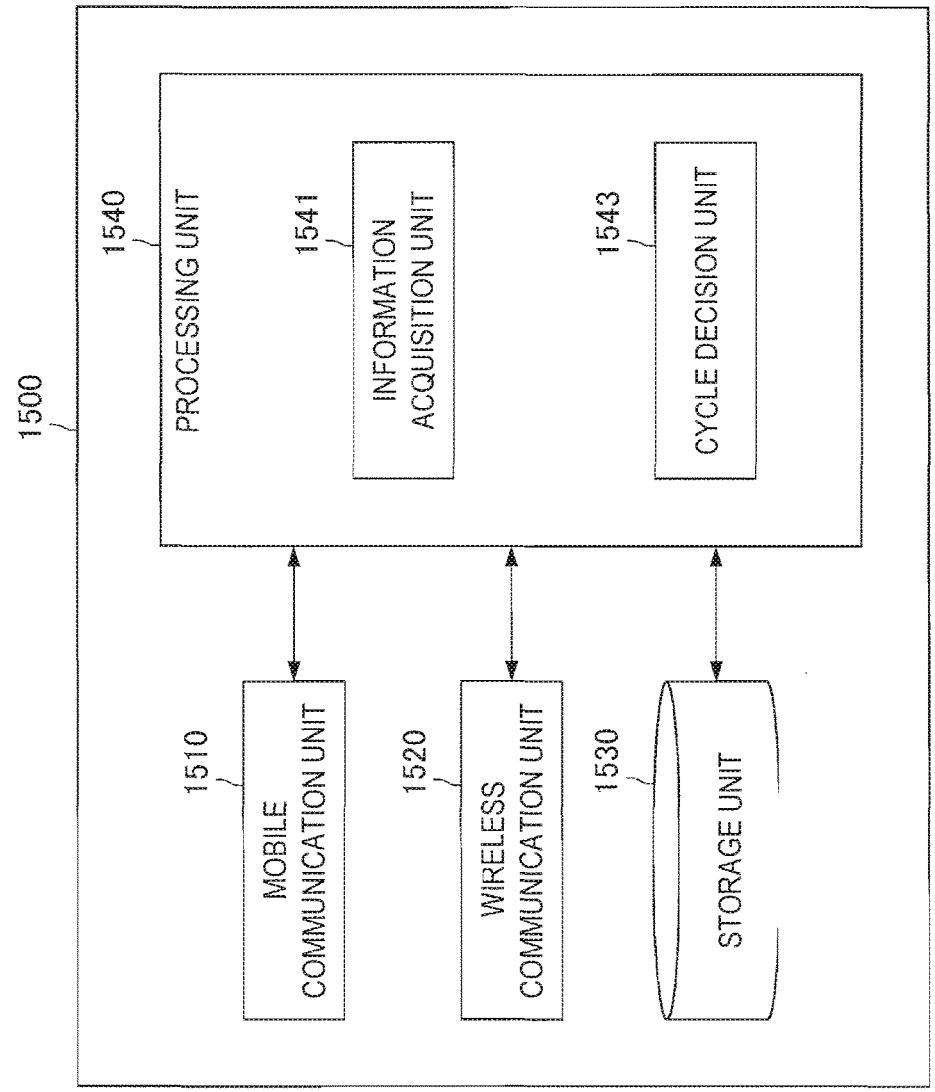
FIG. 33 is a block diagram showing an example of a configuration of a mobile communication terminal according to the reference example.

Next, an example of the mobile communication terminal 1500 according to the reference example will be described with reference to FIGS. 33 to 35. FIG. 33 is a block diagram showing an example of a configuration of the mobile communication terminal 1500 according to the reference example. Referring to FIG. 33, the mobile communication terminal 1500 includes a mobile communication unit 1510, a wireless communication unit 1520, a storage unit 1530, and a processing unit 1540.

(Mobile Communication Unit 1510)

The mobile communication unit 1510 communicates via the mobile communication network 30. The mobile communication unit 1510 communicates with, for example, a base station of the mobile communication network 30.

(Wireless Communication Unit 1520)

The wireless communication unit 1520 communicates in a first wireless communication scheme that the mobile communication terminal 1500 and the wireless communication terminal 60 support. The first wireless communication scheme is, for example, a communication scheme for a WLAN. The wireless communication unit 1520 communicates with, for example, an access point of the wireless communication network 40 (for example, a WLAN) in the first wireless communication scheme. In addition, the wireless communication unit 1520 communicates directly with, for example, the wireless communication terminal 60 in the first wireless communication scheme.

(Storage Unit 1530)

The storage unit 1530 temporarily or permanently stores a program and data for operations of the mobile communication terminal 1500.

(Processing Unit 1540)

The processing unit 1540 provides various functions of the mobile communication terminal 1500. The processing unit 1530 includes an information acquisition unit 1541 and a cycle decision unit 1543.

(Information Acquisition Unit 1541)

The information acquisition unit 1541 acquires density information indicating density of service areas of the wireless communication network 40. Note that the density of the service areas of the wireless communication network 40 can also refer to density of the wireless communication network 40, or density of access points of the wireless communication network 40.

For example, the wireless communication network 40 is, for example, a WLAN. In this case, the density information is information indicating density of service areas of the WLAN.

Content of Density Information

In addition, the density information is, for example, information indicating the density of service areas of each area that is greater than the service area of the wireless communication network 40. As an example, the area is the cell of the mobile communication network 30. Specific examples of density of service areas and density information will be described with reference FIGS. 34 and 35.

Figure 34:
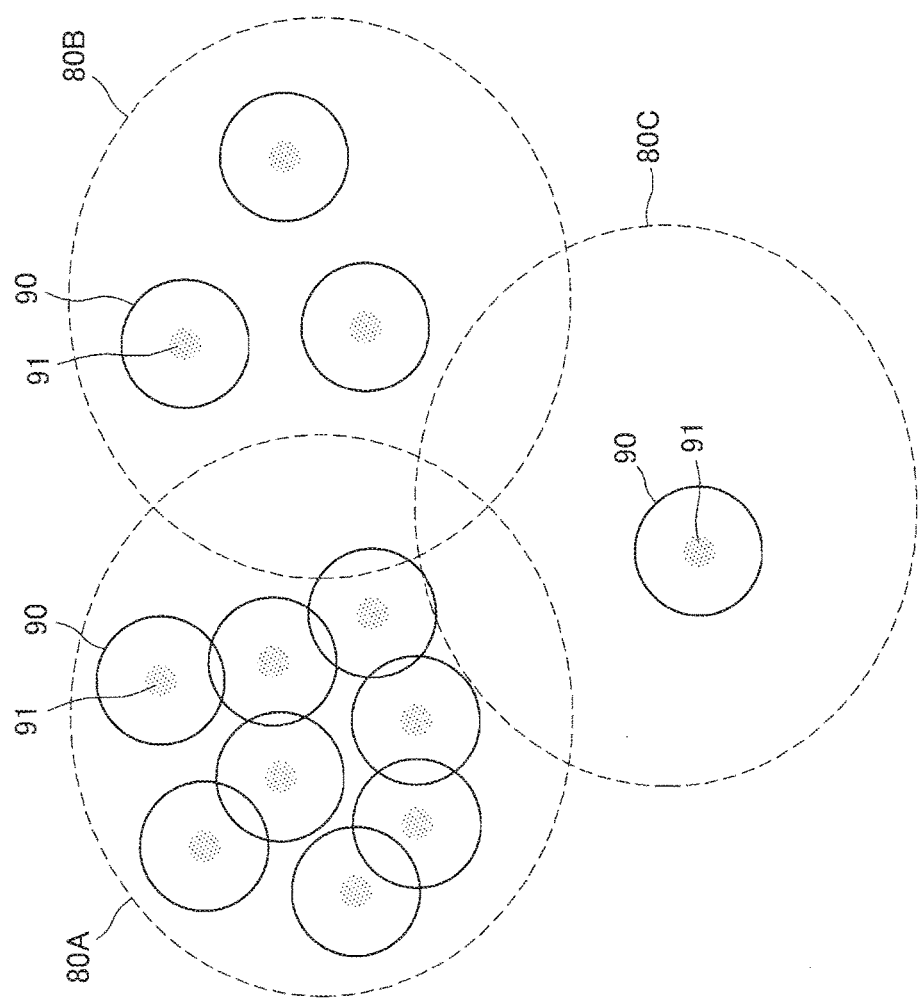
FIG. 34 is an illustrative diagram for describing an example of density of service areas of wireless networks of respective areas.

FIG. 34 is an illustrative diagram for describing an example of density of service areas of wireless networks of respective areas. Referring to FIG. 34, three areas 80A to 80C are shown. In addition, in each of the areas 80A to 80C, service areas 90 of the wireless communication network 40 (for example, a WLAN) are shown. The service areas are areas in which wireless communication with access points 91 is possible. The diameter of each of the service areas 90 is, for example, about 10 to 100 meters. Since each of the service areas 90 is small in this way, if the access points 91 are to be disposed to cover the entire areas 80, an enormous amount of costs is necessary. Thus, a number of access points 91 are disposed in, for example, the area 80A in which an amount of traffic is large or the number of terminals is large. In addition, a smaller number of access points 91 are disposed in the area 80B in which an amount of traffic is smaller or the number of terminals is smaller. Furthermore, an even smaller number of access points 91 are disposed in the area 80C in which an amount of traffic is even smaller or the number of terminals is even smaller. As a result, the density of the service areas 90 is the highest in the area 80A, and the density of the service areas 90 is the next highest in the area 80B. In addition, the density of the service areas 90 is the lowest in the area 80C.

FIG. 35 is an explanatory diagram for describing an example of the density information. Referring to FIG. 35, area position information and density information are shown for each area. The area A, the area B, and the area C respectively indicate the area 80A, the area 80B, and the area 80C of FIG. 34. Since the density of the service areas 90 is high in the area 80A as described with reference to FIG. 34, density information of the area 80A is "high." In addition, since the density of the service areas 90 is low in the area 80C, density information of the area 80C is "low." In addition, density information of the area 80B is "intermediate." Such density information and position information are provided to, for example, the mobile communication terminal 1500.

The information acquisition unit 1541 acquires, for example, such density information. Note that the density of the service areas of the wireless communication network 40 can serve as an index for deducing whether connection of the wireless communication terminal 60 to the wireless communication network 40 is possible. For example, referring to FIG. 34 again, since the density of the service areas 90 is high in the area 80A, there is a high possibility of the wireless communication terminal 60 being within the service areas 90 in the area 80A even if the terminal moves. For this reason, there is a high possibility of the wireless communication terminal 60 being capable of communicating via the wireless communication network 40 in the area 80A. On the other hand, since the density of the service areas 90 is low in the area 80C, there is a high possibility of the wireless communication terminal 60 not being positioned within the service areas 90 in the area 80C if the terminal moves. For this reason, there is a low possibility of the wireless communication terminal 60 being capable of communicating via the wireless communication network 40 in the area 80C.

Technique of Acquiring Density Information

The density information is provided to, for example, the mobile communication terminal 1500 via the mobile communication network 30, and stored in the storage unit 1530. In addition, the information acquisition unit 1541 acquires the density information stored in the storage unit 1530.

Specifically, for example, the mobile communication terminal 1500 requests density information from a communication node retaining the density information via the mobile communication network 30. Then, the communication node provides the density information to the mobile communication terminal 1500. As an example, the communication node is a communication node of the wireless communication network 40 (for example, the WLAN) (for example, a control node).

Note that the communication node that provides the density information may be a communication node of the mobile communication network 30 (for example, a core network node or a base station) or another node, instead of being a communication node of the wireless communication network 40 (for example, the WLAN).

In addition, the communication node may provide the density information to the mobile communication terminal 1500 without a request made by the mobile communication terminal 1500. For example, the communication node may provide the density information to the mobile communication terminal 1500 according to handover of the mobile communication terminal 1500 or the like.

In addition, the density information may be generated by the mobile communication terminal 1500, instead of being provided by the communication node. Specifically, for example, the mobile communication terminal 1500 may detect an access point of the wireless communication network 40 and generate density information based on the result of the detection.

(Cycle Decision Unit 1543)

The cycle decision unit 1543 decides a cycle of the power saving mode for communication performed in the first wireless communication scheme based on the density information.

Power Saving Mode and Cycle

The power saving mode is a mode in which communication of the first wireless communication scheme is performed in each cycle and communication of the first wireless communication scheme is not performed in other periods. In other words, the cycle is a cycle in which communication of the first wireless communication scheme is performed in the power saving mode. As an example, in the power saving mode, the mobile communication terminal 1500 transmits a signal in an interval of 10 ms, awaits a signal (for example, a signal for connection) in an interval of 10 ms, and does not transmit or receive a signal in an interval of 80 ms.

Technique of Deciding a Cycle

The cycle decision unit 1543 decides the cycle based on, for example, information indicating a position of the mobile communication terminal 1500 or the wireless communication terminal 60 and the density information (i.e., information indicating density of service areas of the wireless communication network 40).

When a position of the mobile communication terminal 1500 or the wireless communication terminal 60 is within an area having higher density of the service areas of the wireless communication network 40, for example, the cycle decision unit 1543 decides a longer cycle as the cycle of the power saving mode. In addition, when a position of the mobile communication terminal 1500 or the wireless communication terminal 60 is within an area having lower density of the service areas of the wireless communication network 40, the cycle decision unit 1543 decides a shorter cycle as the cycle of the power saving mode.

Referring to FIGS. 34 and 35 again, when a position of the mobile communication terminal 1500 or the wireless communication terminal 60 is within the area 80A, the cycle decision unit 1543 decides a longer cycle as the cycle of the power saving mode. On the other hand, when a position of the mobile communication terminal 1500 or the wireless communication terminal 60 is within the area 80C, the cycle decision unit 1543 decides a shorter cycle as the cycle of the power saving mode.

Accordingly, while the mobile communication terminal 1500 suppresses its power consumption, the wireless communication terminal 60 can promptly switch communication to communication using tethering.

More specifically, for example, when the density of the service areas of the wireless communication network 40 is low, there is a high possibility of the wireless communication terminal 60 not being capable of communicating via the wireless communication network 40. In such a case, for example, the mobile communication terminal 1500 decides a short cycle as the cycle of the power saving mode, and performs communication in the first wireless communication scheme in the short cycle. As a result, for example, the wireless communication terminal 60 can promptly switch communication from communication performed via the wireless communication network 40 to communication using tethering.

In addition, for example, when the density of the service areas of the wireless communication network 40 is high, there is a high possibility of the wireless communication terminal 60 being capable of communicating via the wireless communication network 40. In such a case, for example, the mobile communication terminal 1500 decides a long cycle as the cycle of the power saving mode, and performs communication in the first wireless communication scheme in the long cycle. As a result, for example, the mobile communication terminal 1500 can suppress power consumption in communication performed in the first wireless communication scheme.

7.3. Process Flow

Next, each process according to the reference example will be described with reference to FIGS. 36 to 38.

(Provision of Density Information)

First Example

Figure 36:
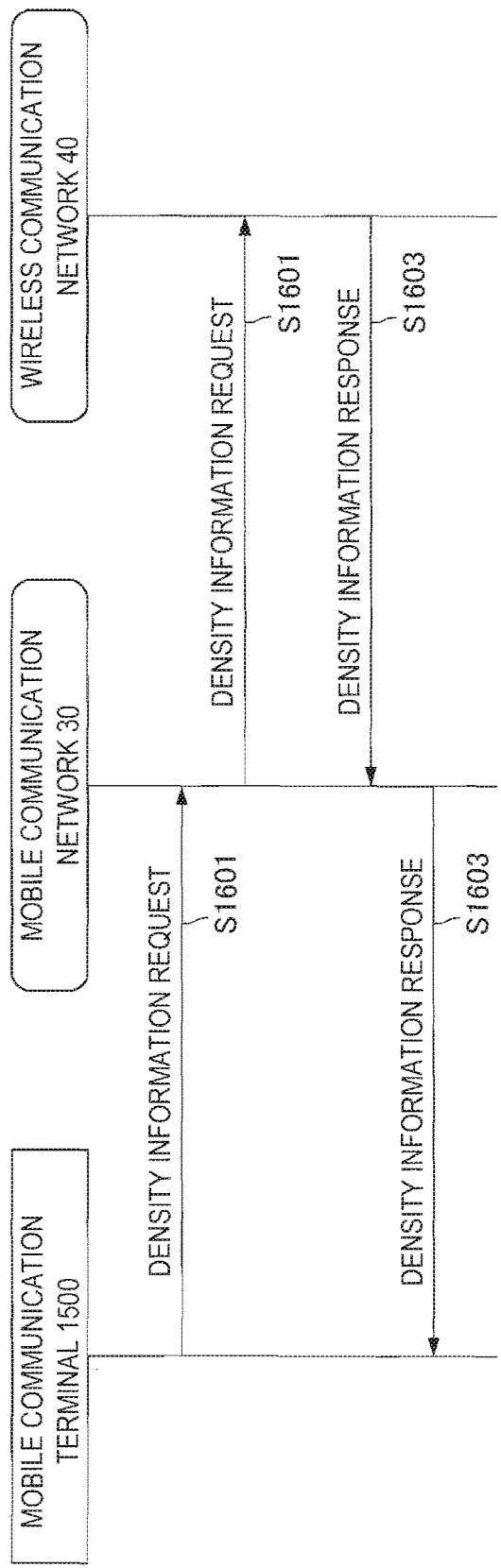
FIG. 36 is a sequence diagram showing a first example of a schematic flow of a process relating to provision of density information.

FIG. 36 is a sequence diagram showing a first example of a schematic flow of a process relating to provision of density information.

The mobile communication terminal 1500 transmits a density information requesting message for requesting density information to a communication node of the wireless communication network 40 (for example, a WLAN) via the mobile communication network 30 (S1601). Then, the communication node transmits a density information responding message including the density information to the mobile communication terminal 1500 via the mobile communication network 30 (S1603). Note that the density information responding message includes, for example, position information indicating a position of an area corresponding to each density in addition to the density information.

Second Example

Figure 37:
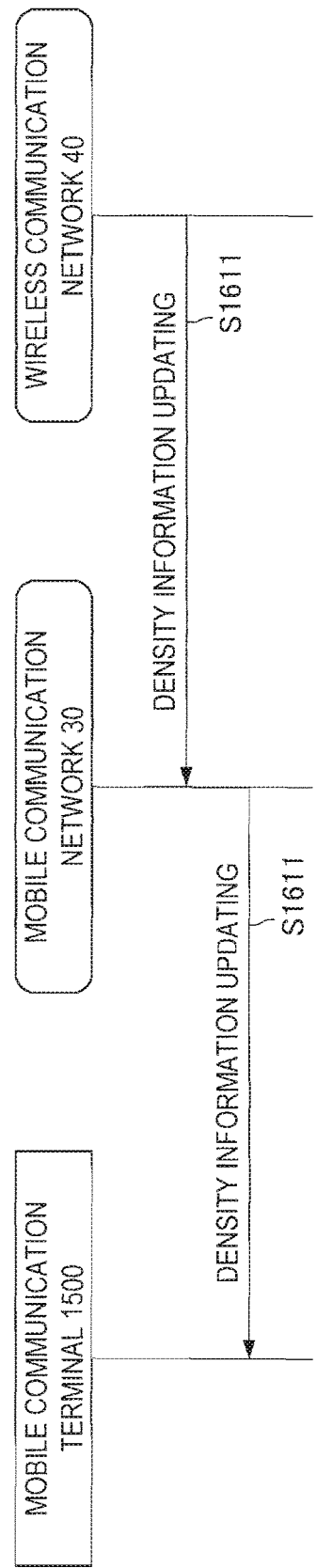
FIG. 37 is a sequence diagram showing a second example of a schematic flow of the process relating to provision of density information.

FIG. 37 is a sequence diagram showing a second example of a schematic flow of a process relating to provision of density information.

The communication node of the wireless communication network 40 (for example, the WLAN) transmits a density information updating message including density information to the mobile communication terminal 1500 via the mobile communication network 30 (S1611). An example, in addition, the density information updating message is provided to the mobile communication terminal 1500 according to handover of the mobile communication terminal 1500. Note that the density information updating message includes, for example, position information indicating a position of an area corresponding to each density, in addition to the density information.

(Decision of a Cycle)

Figure 38:
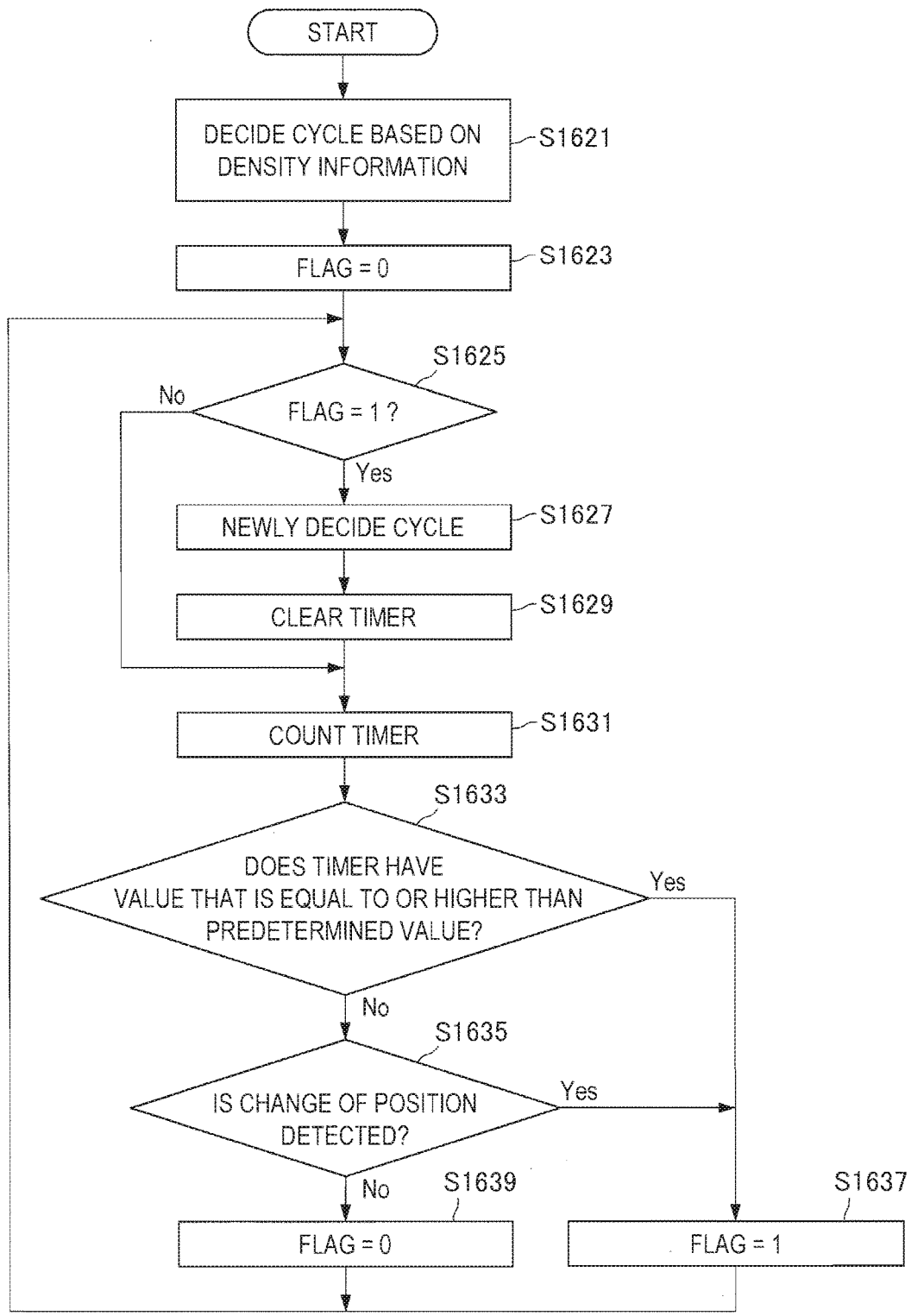
FIG. 38 is a flowchart showing an example of a schematic flow of a process relating to decision of a cycle of a power saving mode.

FIG. 38 is a flowchart showing an example of a schematic flow of a process relating to decision of a cycle of the power saving mode. The process is a process executed by the mobile communication terminal 1500 when an operation mode of the mobile communication terminal 1500 is the power saving mode.

First, the cycle decision unit 1543 decides a cycle of the power saving mode for communication performed in the first wireless communication scheme based on density information indicating density of the service areas of the wireless communication network 40 (S1621). Then, the cycle decision unit 1543 sets the flag for updating of a cycle to 0 (S1623).

If the flag is 1 (YES in S1625), the cycle decision unit 1543 newly decides the cycle of the power saving mode based on the density information (S1627). In other words, the cycle is updated. Then, the cycle decision unit 1543 clears a timer (S1629).

If the flag is 0 (NO in S1625) or after the timer is cleared (S1629), the cycle decision unit 1543 counts the timer (S1631).

If the timer has a value that is equal to or higher than a predetermined value (YES in S1633), or if a change of a position of the mobile communication terminal 1500 or the wireless communication terminal 60 is detected (YES in S1635), the cycle decision unit 1543 sets the flag to 1 (S1637). Then, the process returns to Step S1625.

Otherwise (NO in S1633 and NO in S1635), the cycle decision unit 1543 sets the flag to 0 (S1639). Then, the process returns to Step S1625.

Note that, when the operation mode of the mobile communication terminal 1500 switches from the power saving mode to the normal mode, the process ends.

7.4. Application Example of a Mobile Communication Terminal

For example, the mobile communication terminal 1500 according to the reference example can be realized as a mobile terminal such as a smartphone, a tablet PC, or a portable/dongle-type mobile router, or an in-vehicle terminal such as a car navigation device. In addition, the mobile communication terminal 1500 can be realized as a terminal that performs M2M communication (which is also called a MTC terminal). Further, the mobile communication terminal 1500 can be a wireless communication module (for example, an integrated circuit module formed in one die) mounted in such a terminal.

The mobile communication terminal 1500 may be implemented as, for example, the smartphone 700 shown in FIG. 28. In this case, the information acquisition unit 1541 and the cycle decision unit 1543 described with reference to FIG. 33 may be implemented by the processor 701 and/or the auxiliary controller 722 of the smartphone 700 shown in FIG. 28. More specifically, for example, the information acquisition unit 1541 and the cycle decision unit 1543 may be implemented by the memory 702 that stores a program executed by the processor 701 and the processor 701, and/or the auxiliary controller 722. The program may be an OS, a device driver, and/or application software. In addition, at least some of the functions may be implemented by the mobile communication interface 711, the WLAN communication interface 714, and/or the Bluetooth communication interface 717.

The mobile communication terminal 1500 may be implemented as, for example, the car navigation device 730 shown in FIG. 29. In this case, the information acquisition unit 1541 and the cycle decision unit 1543 described with reference to FIG. 33 may be implemented by the processor 731 of the car navigation device 730 shown in FIG. 29. More specifically, for example, the information acquisition unit 1541 and the cycle decision unit 1543 may be implemented by the memory 732 that stores a program executed by the processor 731 and the processor 731. The program may be an OS, a device driver, and/or application software. In addition, at least some of the functions may be implemented by the mobile communication interface 741, the WLAN communication interface 744, and/or the Bluetooth communication interface 747.

8. Conclusion

So far, respective devices and processes according to the embodiments of the present disclosure have been described with reference to FIGS. 3 to 31. In addition, devices and processes according to the reference example of the present disclosure have been described with reference to FIGS. 32 to 38.

As described above, a communication control device according to an embodiment of the present disclosure can be any of various devices, for example, a device that configures the communication node 100 of the mobile communication network 30, a device that configures the communication node 200 of the wireless communication network 40, the wireless communication terminal 300, the mobile communication terminal 400, and the like.

Mode Switch Control

According to an embodiment of the present disclosure, a communication control device includes: an information acquisition unit configured to acquire a result of determination of whether a predetermined condition for connection of a wireless communication terminal to a wireless communication network 40 that is different from a mobile communication network 30 is satisfied; and a switch control unit configured to control a mobile communication terminal that communicates via the mobile communication network 30 to switch an operation mode from a first mode to a second mode when the predetermined condition is satisfied. The operation mode is an operation mode for communication performed in a first wireless communication scheme that the wireless communication terminal and the mobile communication terminal support. The first mode is a mode in which power consumption is smaller than in the second mode. The second mode is a mode in which the mobile communication terminal is capable of transmitting or receiving data in the first wireless communication scheme.

This makes it possible to promptly switch communication while power consumption of a mobile communication terminal is suppressed. Specifically, for example, when connection of the wireless communication terminal to the wireless communication network 40 is disconnected or when the connection is likely to be disconnected, the operation mode of the mobile communication terminal for communication in the first wireless communication scheme becomes the normal mode. Thus, the wireless communication terminal can promptly switch its communication to communication using tethering. In addition, when connection of the wireless communication terminal to the wireless communication network 40 is not disconnected or when the connection is not likely to be disconnected, the operation mode of the mobile communication terminal for communication in the first wireless communication scheme may be the stop mode or the power saving mode. Thus, while power consumption of the mobile communication terminal is suppressed, the communication of the wireless communication terminal can be promptly switched from communication performed via the wireless communication network 40 to communication using tethering.

Communication Switch Control

Furthermore, when the predetermined condition is satisfied, for example, the switch control unit further controls the wireless communication terminal to switch communication from the first communication performed via the wireless communication network 40 to second communication performed via the mobile communication terminal 50 and the mobile communication network 30.

Accordingly, the communication of the wireless communication terminal can be reliably switched.

Predetermined Condition

The predetermined condition is a condition determined based on, for example, a connection state of the wireless communication terminal with respect to the wireless communication network 40.

Accordingly, communication can be switched when, for example, connection of the wireless communication terminal to the wireless communication network 40 is disconnected.

The predetermined condition is a condition determined based on, for example, communication quality of communication of the wireless communication terminal on the wireless communication network 40.

Accordingly, it is possible, for example, to switch communication according to deterioration of the communication quality of the wireless communication terminal on the wireless communication network 40. In other words, communication can be switched when the connection of the wireless communication terminal to the wireless communication network 40 is likely to be disconnected.

In addition, for example, the mobile communication terminal 50 is associated with the wireless communication terminal 60, and the predetermined condition is a condition determined based on a movement situation of the mobile communication terminal 50.

Accordingly, communication can be switched according to, for example, movement of the mobile communication terminal. In other words, when connection of the wireless communication terminal 60 to the wireless communication network 40 is likely to be disconnected, communication can be switched.

It should be understood by those skilled in the art that various modifications, combinations, sub-combinations and alterations may occur depending on design requirements and other factors insofar as they are within the scope of the appended claims or the equivalents thereof.

Although the example in which, if the predetermined condition includes one or more OR conditions and any of the one or more OR conditions is satisfied, for example, the predetermined condition is satisfied has been described, the present disclosure is not limited thereto. The predetermined condition may include, for example, one or more AND conditions, and if all of the one or more AND conditions are satisfied, the predetermined condition may be satisfied. In addition, each of the one or more OR conditions may be a condition including one or more AND conditions.

In addition, although the example in which, for example, the same device performs determination of whether the predetermined condition is satisfied and control of switching the operation mode has been described, the present disclosure is not limited thereto. For example, the determination and the control of switching may be performed by separate devices.

In addition, for example, although a WLAN is exemplified as a wireless communication network that is different from a mobile communication network, the present disclosure is not limited thereto. For example, the wireless communication network may be a network other than a WLAN.

In addition, although the example in which, for example, the first wireless communication scheme is a wireless communication scheme for a WLAN (i.e., a WLAN communication scheme) has been described, the present disclosure is not limited thereto. For example, the first wireless communication scheme may be a wireless communication scheme other than the WLAN communication scheme. Likewise, although the example in which the second wireless communication scheme is Bluetooth has been described, the present disclosure is not limited thereto. For example, the second wireless communication scheme may be another wireless communication scheme of short-range wireless communication, or may be a wireless communication scheme of communication other than short-range wireless communication.

In addition, although the example in which, for example, the mobile communication network is a network that conforms with LTE or LTE-Advanced has been described, the present disclosure is not limited thereto. The mobile communication network may be a network that conforms with another communication standard (for example, another communication standard of the 3GPP).

In addition, although the example in which, for example, the communication control device according to the embodiments is a device that configures a communication node of the mobile communication network, a device that configures a communication node of a wireless communication network, a wireless communication terminal, or a mobile communication terminal has been described, the present disclosure is not limited thereto. For example, the communication control device may be another device.

In addition, processing steps in the communication control processes of the present specification are not necessarily executed in the orders described in the flowcharts in a time-series manner. The processing steps in the communication control processes may be executed, for example, in a different order from the orders described in the flowcharts or may be executed in parallel.

In addition, a computer program for causing hardware such as a CPU, a ROM, and a RAM installed in a communication control device to exhibit the same function as each configuration of the communication control device can also be created. In addition, a storage medium to store the computer program may also be provided. In addition, an information processing device (for example, a processing circuit or a chip) that includes a memory (for example, a ROM and a RAM) that stores the computer program and one or more processors (for example, a CPU, a DSP, etc.) that can execute the computer program may also be provided.

In addition, the effects described in the present specification are merely illustrative or exemplary, and are not limitative. In other words, the technology according to the present disclosure can exhibit, along with or instead of the effects, other effects that are apparent to those skilled in the art based on the present specification.

Additionally, the present technology may also be configured as below.

(1)

A communication control device including:

an acquisition unit configured to acquire a result of determination of whether a predetermined condition for connection of a wireless communication terminal to a wireless communication network that is different from a mobile communication network is satisfied; and a control unit configured to control a mobile communication terminal that communicates via the mobile communication network to switch an operation mode from a first mode to a second mode when the predetermined condition is satisfied, wherein the operation mode is an operation mode for communication performed in a first wireless communication scheme that the wireless communication terminal and the mobile communication terminal support, wherein the first mode is a mode in which power consumption is smaller than in the second mode, and wherein the second mode is a mode in which the mobile communication terminal is capable of transmitting or receiving data in the first wireless communication scheme.

(2)

The communication control device according to (1), wherein the control is triggering transmission of a message requesting switch of the operation mode from the first mode to the second mode to the mobile communication terminal.

(3)

The communication control device according to (2), wherein the message is a message to be transmitted to the mobile communication terminal via the mobile communication network.

(4)

The communication control device according to (2), wherein the mobile communication terminal and the wireless communication terminal also support a second wireless communication scheme that is different from the first wireless communication scheme, and wherein the message is a message to be transmitted to the mobile communication terminal from the wireless communication terminal in the second wireless communication scheme.

(5)

The communication control device according to (4), wherein the second wireless communication scheme is a communication scheme of short-range wireless communication.

(6)

The communication control device according to any one of (1) to (5), wherein, when the predetermined condition is satisfied, the control unit further controls the wireless communication terminal to switch communication from first communication performed via the wireless communication network to second communication performed via the mobile communication terminal and the mobile communication network.

(7)

The communication control device according to (6), wherein the further control is triggering transmission of a message requesting switch of communication from the first communication to the second communication to the wireless communication terminal.

(8)

The communication control device according to any one of (1) to (7), wherein the communication control device is a device that constitutes a communication node of the mobile communication network.

(9)

The communication control device according to any one of (1) to (7), wherein the communication control device is a device that constitutes a communication node of the wireless communication network.

(10)

The communication control device according to any one of (1) to (6), wherein the communication control device is the wireless communication terminal.

(11)

The communication control device according to any one of (1) to (7), wherein the communication control device is the mobile communication terminal.

(12)

The communication control device according to any one of (1) to (11), wherein the predetermined condition is a condition determined based on a state of connection of the wireless communication terminal to the wireless communication network.

(13)

The communication control device according to any one of (1) to (12), wherein the predetermined condition is a condition determined based on communication quality of communication of the wireless communication terminal on the wireless communication network.

(14)

The communication control device according to (13), wherein the communication quality includes at least one of reception intensity of a signal transmitted or received by the wireless communication terminal on the wireless communication network, an error rate of communication of the written wireless communication terminal on the wireless communication network, and the number of re-transmissions of the wireless communication terminal in communication on the wireless communication network.

(15)

The communication control device according to any one of (1) to (14), wherein the mobile communication terminal is associated with the wireless communication terminal, and wherein the predetermined condition is a condition determined based on a movement situation of the mobile communication terminal.

(16)

The communication control device according to any one of (1) to (15), wherein the wireless communication network is a wireless local area network (WLAN).

(17)

The communication control device according to any one of (1) to (16), wherein the first wireless communication scheme is a wireless communication scheme for a wireless local area network (WLAN).

(18)

A communication control method including:

acquiring a result of determination of whether a predetermined condition for connection of a wireless communication terminal to a wireless communication network that is different from a mobile communication network is satisfied; and controlling, by a processor, a mobile communication terminal that communicates via the mobile communication network to switch an operation mode from a first mode to a second mode when the predetermined condition is satisfied, wherein the operation mode is an operation mode for communication performed in a first wireless communication scheme that the wireless communication terminal and the mobile communication terminal support, wherein the first mode is a mode in which power consumption is smaller than in the second mode, and wherein the second mode is a mode in which the mobile communication terminal is capable of transmitting or receiving data in the first wireless communication scheme.

(19)

An information processing device including:

a memory that stores a program; and one or more processors that are capable of executing the program, wherein the program causes execution of acquiring a result of determination of whether a predetermined condition for connection of a wireless communication terminal to a wireless communication network that is different from a mobile communication network is satisfied, and controlling a mobile communication terminal that communicates via the mobile communication network to switch an operation mode from a first mode to a second mode when the predetermined condition is satisfied, wherein the operation mode is an operation mode for communication performed in a first wireless communication scheme that the wireless communication terminal and the mobile communication terminal support, wherein the first mode is a mode in which power consumption is smaller than in the second mode, and wherein the second mode is a mode in which the mobile communication terminal is capable of transmitting or receiving data in the first wireless communication scheme.

REFERENCE SIGNS LIST 30 mobile communication network
40 wireless communication network
50 mobile communication terminal
60 wireless communication terminal
100 communication node
131 determination unit
133 information acquisition unit
135 switch control unit
200 communication node
231 determination unit
233 information acquisition unit
235 switch control 300 wireless communication terminal
341 determination unit
343 information acquisition unit
345 switch control
400 mobile communication terminal
451 determination unit
453 information acquisition unit
455 switch control

The invention claimed is:

1. A communication control device comprising:
circuitry configured to:
determine whether a predetermined condition for a connection of a wireless communication terminal to a wireless communication network is satisfied;
control a mobile communication terminal via a mode switch message sent to the mobile communication terminal via a mobile communication network to switch an operation mode of the mobile communication terminal from a first mode to a second mode when the predetermined condition is satisfied, the wireless communication network being different from the mobile communication network,
control the wireless communication terminal via a communication switch message sent via the wireless communication network to inform the wireless communication terminal to stop communicating on the wireless communication network and start communicating on the mobile communication network by using the mobile communication terminal as a relay, wherein
the first mode is a mode in which power consumption of the mobile communication terminal is smaller than when the mobile communication terminal is in the second mode,
the second mode is a different mode in which the mobile communication terminal is capable of transmitting or receiving data using a first wireless communication scheme with the wireless communication terminal and the wireless communication terminal relaying the data via the mobile communication network, and
the predetermined condition being determined based on whether the mobile communication terminal has changed a movement state from not moving to moving as an indication that the connection of the wireless communication terminal with the wireless communication network will become disconnected and so communication of additional data is to be relayed via the mobile communication terminal over the mobile communication network.

2. The communication control device according to claim 1, wherein the control of the mobile communication terminal is triggering transmission of the mode switch message requesting switch of the operation mode from the first mode to the second mode to the mobile communication terminal.

3. The communication control device according to claim 2, wherein the mode switch message is transmitted to the mobile communication terminal via the mobile communication network.

4. The communication control device according to claim 2,
wherein the mobile communication terminal and the wireless communication terminal also support a second wireless communication scheme that is different from the first wireless communication scheme, and wherein the mode switch message is transmitted to the mobile communication terminal from the wireless communication terminal in the second wireless communication scheme.

5. The communication control device according to claim 4, wherein the second wireless communication scheme is a communication scheme of short-range wireless communication.

6. The communication control device according to claim 1, wherein, when the predetermined condition is satisfied, the circuitry further controls the wireless communication terminal to switch communication from first communication performed via the wireless communication network to second communication performed via the mobile communication terminal and the mobile communication network.

7. The communication control device according to claim 6, wherein the control of the wireless communication terminal is triggering transmission of the communication switch message requesting switch of communication from the first communication to the second communication to the wireless communication terminal.

8. The communication control device according to claim 1, wherein the communication control device is a device that constitutes a communication node of the mobile communication network.

9. The communication control device according to claim 1, wherein the communication control device is a device that constitutes a communication node of the wireless communication network.

10. The communication control device according to claim 1, wherein the communication control device is the wireless communication terminal.

11. The communication control device according to claim 1, wherein the communication control device is the mobile communication terminal.

12. The communication control device according to claim 1, wherein the predetermined condition comprises a condition determined based on a state of connection of the wireless communication terminal to the wireless communication network.

13. The communication control device according to claim 1, wherein the predetermined condition comprises a condition determined based on communication quality of communication of the wireless communication terminal on the wireless communication network.

14. The communication control device according to claim 13, wherein the communication quality includes at least one of reception intensity of a signal transmitted or received by the wireless communication terminal on the wireless communication network, an error rate of communication of the wireless communication terminal on the wireless communication network, and a number of re-transmissions of the wireless communication terminal in communication on the wireless communication network.

15. The communication control device according to claim 1, wherein the wireless communication network is a wireless local area network (WLAN).

16. The communication control device according to claim 1, wherein the first wireless communication scheme is a wireless communication scheme for a wireless local area network (WLAN).

17. A communication control method comprising:
determining whether a predetermined condition for a connection of a wireless communication terminal to a wireless communication network is satisfied;
controlling, using circuitry, a mobile communication terminal via a mode switch message sent to the mobile communication terminal via a mobile communication network to switch an operation mode of the mobile communication terminal from a first mode to a second mode when the predetermined condition is satisfied, the wireless communication network being different from the mobile communication network,
controlling, using the circuitry, the wireless communication terminal via a communication switch message sent via the wireless communication network to inform the wireless communication terminal to stop communicating on the wireless communication network and start communicating on the mobile communication network by using the mobile communication terminal as a relay, wherein
the first mode is a mode in which power consumption of the mobile communication terminal is smaller than when the mobile communication terminal is in the second mode,
the second mode is a different mode in which the mobile communication terminal is capable of transmitting or receiving data using a first wireless communication scheme with the wireless communication terminal and the wireless communication terminal relaying the data via the mobile communication network, and
the predetermined condition being determined based on whether the mobile communication terminal has changed a movement state from not moving to moving as an indication that the connection of the wireless communication terminal with the wireless communication network will become disconnected and so communication of additional data is to be relayed via the mobile communication terminal over the mobile communication network.

18. A non-transitory computer readable medium including executable instructions, which when executed by a computer cause the computer to:
determine whether a predetermined condition for a connection of a wireless communication terminal to a wireless communication network is satisfied;
control a mobile communication terminal via a mode switch message sent to the mobile communication terminal via a mobile communication network to switch an operation mode of the mobile communication terminal from a first mode to a second mode when the predetermined condition is satisfied, the wireless communication network being different from the mobile communication network,
control the wireless communication terminal via a communication switch message sent via the wireless communication network to inform the wireless communication terminal to stop communicating on the wireless communication network and start communicating on the mobile communication network by using the mobile communication terminal as a relay, wherein
the first mode is a mode in which power consumption of the mobile communication terminal is smaller than when the mobile communication terminal is in the second mode,
the second mode is a different mode in which the mobile communication terminal is capable of transmitting or receiving data using a first wireless communication scheme with the wireless communication terminal and the wireless communication terminal relaying the data via the mobile communication network, and
the predetermined condition being determined based on whether the mobile communication terminal has chanced a movement state from not moving to moving as an indication that the connection of the wireless communication terminal with the wireless communication network will become disconnected and so communication of additional data is to be relayed via the mobile communication terminal over the mobile communication network.

19. The communication control device according to claim 1, wherein whether or not the mobile communication terminal is moving is determined based on position information of Global Positioning System (GPS) of the mobile communication terminal.

20. The communication control device according to claim 1, wherein whether or not the mobile communication terminal is moving is determined based on reception intensity of a transmission signal from the mobile communication terminal at a plurality of base stations, a timing advance (TA) value, or a measured value of angle of arrival (AoA).

* * * * *